(12) United States Patent
Turchi et al.

(10) Patent No.: US 12,486,246 B2
(45) Date of Patent: Dec. 2, 2025

(54) REPLICATION PROTEIN A (RPA)-DNA INTERACTION INHIBITORS

(71) Applicant: THE TRUSTEES OF INDIANA UNIVERSITY, Bloomington, IN (US)

(72) Inventors: John J. Turchi, Indianapolis, IN (US); Navnath Gavande, Indianapolis, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 709 days.

(21) Appl. No.: 17/782,876

(22) PCT Filed: Dec. 10, 2020

(86) PCT No.: PCT/US2020/064191
§ 371 (c)(1),
(2) Date: Jun. 6, 2022

(87) PCT Pub. No.: WO2021/119242
PCT Pub. Date: Jun. 17, 2021

(65) Prior Publication Data
US 2023/0056729 A1 Feb. 23, 2023

Related U.S. Application Data

(60) Provisional application No. 62/946,100, filed on Dec. 10, 2019.

(51) Int. Cl.
| | | |
|---|---|---|
| *C07D 401/04* | (2006.01) | |
| *A61P 35/00* | (2006.01) | |
| *C07D 401/14* | (2006.01) | |
| *C07D 405/14* | (2006.01) | |
| *C07D 413/14* | (2006.01) | |

(52) U.S. Cl.
CPC ........... *C07D 401/04* (2013.01); *A61P 35/00* (2018.01); *C07D 401/14* (2013.01); *C07D 405/14* (2013.01); *C07D 413/14* (2013.01)

(58) Field of Classification Search
CPC .................................................. C07D 401/04
USPC ...................................................... 514/341
See application file for complete search history.

(56) References Cited

U.S. PATENT DOCUMENTS

| | | |
|---|---|---|
| 8,513,266 B2 | 8/2013 | Lamb et al. |
| 8,697,359 B1 | 4/2014 | Zhang |
| 8,980,955 B2 | 3/2015 | Turchi et al. |
| 10,774,063 B2 * | 9/2020 | Turchi ................. C07D 403/04 |
| 11,098,033 B2 | 8/2021 | Turchi et al. |
| 11,207,296 B2 | 12/2021 | Turchi et al. |
| 2007/0196395 A1 | 8/2007 | MacKerell et al. |
| 2010/0216853 A1 | 8/2010 | Marmorstein et al. |
| 2010/0249165 A1 | 9/2010 | Gether et al. |
| 2013/0028989 A1 | 1/2013 | Turchi et al. |
| 2013/0142887 A1 | 6/2013 | Alani et al. |
| 2014/0242702 A1 | 8/2014 | Chen et al. |
| 2015/0024500 A1 | 1/2015 | Yu et al. |
| 2015/0031134 A1 | 1/2015 | Zhang et al. |
| 2015/0044772 A1 | 2/2015 | Zhao |
| 2015/0064790 A1 | 3/2015 | Gupta et al. |
| 2015/0071906 A1 | 3/2015 | Liu et al. |
| 2015/0093802 A1 | 4/2015 | McCray et al. |
| 2015/0274674 A1 | 10/2015 | Almstead et al. |
| 2018/0305330 A1 | 10/2018 | Turchi |

FOREIGN PATENT DOCUMENTS

| | | | |
|---|---|---|---|
| EP | 1905762 A1 | 4/2008 | |
| WO | 2006129583 A1 | 12/2006 | |
| WO | 2007120842 A2 | 10/2007 | |
| WO | 2008045663 A2 | 4/2008 | |
| WO | 2009145829 A1 | 12/2009 | |
| WO | 2011097545 A1 | 8/2011 | |
| WO | 2015028929 A1 | 3/2015 | |
| WO | WO-2016077752 A2 * | 5/2016 | ............. A61K 45/06 |

OTHER PUBLICATIONS

Mishra et al., Chemical inhibitor targeting the replication protein A-DNA interaction increases the efficacy of Pt-based chemotherapy in lung and ovarian cancer, Biochemical Pharmacology, 2015, vol. 93, pp. 25-33 (Year: 2015).*
Anciano Granadillo, V.J. et al., "Targeting the OB-folds of replication protein A with small molecules", Journal of Nucleic Acids, 2010, vol. 2010, Article ID 304035, pp. 1-11.
Mishra, A.K. et al., "Chemical inhibitor targeting the replication protein A-DNA interaction increases the efficacy of Pt-based chemotherapy in lung and ovarian cancer", Biochemical Pharmacology, 2015, vol. 93, No. 1, pp. 25-33 ([E-pub.] Nov. 4, 2014).
Park, H. et al., "A novel class of Hsp90 inhibitors isolated by structure-based virtual screening", Bioorganic & Medicinal Chemistry Letters, 2007, vol. 17, No. 22, pp. 6345-6349.
Raghav, Neera et al., "SAR studies of differently functionalized chalcones based hydrazones and their cyclized derivatives as inhibitors of mammalian cathepsin B and cathepsin H", Bioorganic & Medicinal Chemistry, 2014, vol. 22, pp. 4233-4245 ([E-pub.] May 24, 2014).
Shuck, S.C. et al., "Targeted inhibition of replication protein A reveals cytotoxic activity, synergy with chemotherapeutic DNA-damaging agents, and insight into cellular function", Cancer Res., 2010, vol. 70, No. 8, pp. 3189-3198.
STN Registry Database entry for CAS RN 1311879-37-4; Entered STN Jul. 7, 2011.
Wang, Xu et al., "A novel methodology for synthesis of dihydropyrazole derivatives as potential anticancer agents", Organic & Biomolecular Chemistry, 2014, vol. 12, No. 13, pp. 2028-2032 ([E-pub.] Jan. 22, 2014).

(Continued)

*Primary Examiner* — Jeffrey H Murray
*Assistant Examiner* — Rilla Marie Samsell
(74) *Attorney, Agent, or Firm* — Barnes & Thornburg

(57) ABSTRACT

This invention relates to RPA compounds or pharmaceutically acceptable salts thereof, and for the use of the compounds to treat cancer.

16 Claims, 10 Drawing Sheets

(56) References Cited

OTHER PUBLICATIONS

PCT International Search Report and Written Opinion completed by the ISA/US on Feb. 3, 2021 and issued in connection with PCT/US2020/064191.
(PUBCHEM) Oprea1_266901; CID 48272669. Pubchem Entry (online). National Center for Biotechnology Information. Jun. 20, 2015 [retrieved on Feb. 3, 2021]. Retrieved from the Internet: [URL: https,//pubchem.ncbi.nlm.nih.gov/substance/48272669 ]; p. 2.
Supplementary European Search Report for counterpart EP patent application No. 20897908.8 dated Oct. 27, 2023.
Pawelczak et al., Differential activation of DNA-PK based on DNA strand orientation and sequence bias. Nucleic Acids Res., (2005), vol. 33, pp. 152-161.
Pawelczak et al., A mechanism for DNA-PK activation requiring unique contributions from each strand of a DNA terminus and implications for microhomology-mediated nonhomologous DNA end joining. Nucleic Acids Res., (2008), vol. 36, pp. 4022-4031.
Pierce et al., "Ku DNA end-binding protein modulates homologous repair of double-strand breaks in mammalian cells." 2001, Genes & Development, 15, pp. 3237-3242.
Sears et al. "Complex Cisplatin-Double Strand Break (DSB) Lesions Directly Impair Cellular Non-Homologous End-Joining (NHEJ) Independent of Downstream Damage Response (DDR) Pathways." 2012. J Biol Chem, 287(29), pp. 24263-24272.
Seluanov et al., "Analysis of DNA double-strand break (DSB) repair in mammalian cells." 2010, Journal of Visualized Experiments, 43, pp. 1-6.
Woods et al. "Recognition of DNA Termini by the C-Temunal Region of the Ku80 and the DNA-Dependent Protein Kinase Catalytic Subunit." 2015, PLoS One, 10(5), e0127321.
Gavande, N.S. et al., Structure-Guided Optimization of Replication Protein A (RPA)-DNA Interaction Inhibitors. ACS Medicinal Chemistry Letters. Jan. 2, 2020, vol. 11, No. 6; pp. 1118-1124; DOI: 10.1021/acsmedchemlett.9b00440.
PCT Search Report and Written Opinion prepared for PCT/US2017/034254, completed Aug. 24, 2017.
Anonymous, Pubchem, NCBI, National Center for Biotechnology Information. PubChem Compound Database; CID=50885097, https://pubchem.ncbi.nlm.nih.gov/compound/50885097. create date Feb. 22, 2011.
Moreau, F., et al.: "Discovery of new Gram-negative antivirulence drugs: Structure and properties of novel *E. coli* WaaC inhibitors", Biorganic & Medicinal Chemistry Letters, Elsevier, Amsterdam , NL, vol. 18, No. 14, Jul. 15, 2008 (Jul. 15, 2008), pp. 4022-4026 XP022852889, Issn: 0960-894X.
Pawelczak, K.S., et al. "Coordination of DNA-PK Activation and Nuclease Processing of DNA Termini in NHEJ" Antioxidants & Redox Signaling, vol. 14; No. 12; pp. 2531-2543 (2011).
Grundy, G.J., et al., "One ring to bring them all—The role of Ku in mammalian non-homologous end joining," DNA Repair, 2014, vol. 17, pp. 30-38.
Hammel, M., et al. "Ku and DNA-dependent Protein Kinase Dynamic Conformations and Assembly Regulate DNA Binding and the Initial Non-homologous End Joining Complex" The Journal of Biological Chemistry, vol. 285; No. 2, pp. 1414-1423 (2010).
Cox, et al. "Therapeutic Genome Editing: Prospects and Challenges" Nature Medicine, vol. 21, No. 2, pp. 121-131 (2015).
Pauli, G.F., et al. "Importance of Purity Evaluation and the Potential of Quantitative 1H NMR as a Purity Assay" Journal of Medicinal Chemistry, 2014, 57(2), 9220-9231.
"Absolute Quanititative 1H NMR Spectroscopy for Compound Purity Determination" Journal of Medicinal Chemistry, 2014, 57(22), p. 9219, Cushman, et al. (Eds).
Gaj, T. et al., "ZFN, TALEN, and CRISPR/Cas-based methods for genome engineering," Trends in Biotechnology, 2013, 31(7) pp. 397-405.
Dorjsuren et al. 2012, PLOS ONE, 7(10), e47974, 1-12. (Year: 2012).
Doudna & Charpentier 2014, Science, 346(6213), 1077-1086. (Year: 2014).
Ogiwara et al. 2016, Cancer Discovery, 6(4), 430-445, ePub Nov. 24, 2015. (Year: 2015).
Robert et al. 2015, Genome Medicine, 7(93), 1-11. (Year: 2015).
Vidigal & Ventura 2015, Nature Communications, 6, 8083, 1-7. (Year: 2015).
Horizon Discovery, Dharmacon TM Edit-RTM CRISPR Cas9 gene engineering with Lentiviral Cas9 and sgRNA, published Jul. 2015 retrieved on Dec. 14, 2024 from the Internet: < https://horizondiscovery.com/-/media/Files/Horizon/resources/ Technical-manuals/edit-r-lentiviral-sgrna-manual.pdf> (Year: 2015).
Robert F et al, "Pharmacological inhibition of DNA-PK stimulates Cas9-mediated genome editing", Genome Medicine, (Aug. 27, 2015), vol. 7, No. 1, doi:10.1186/S13073-015-0215-6, ISSN 1756-994X, pp. 1-11, XP002769169.
Rongxue Peng et al, "Potential pitfalls of CRISPR/Cas9-mediated genome editing", FEBS Journal, GB, (Nov. 27, 2015), vol. 283, No. 7, doi:10.1111/febs.13586, ISSN 1742-464X, pp. 1218-1231, XP055377561.
Neher et al.: "Identification of Novel Small Molecule Inhibitors of the XPA Protein Using in Silico Based Screening", ACS Chemical Biology, vol. 5, No. 10, Oct. 15, 2010 (Oct. 15, 2010), pp. 953-965, XP055159629, ISSN: 1554-8929, DOI: 10.1021 /cb1000444.
Bowers et al.: "Virtual Ligand Screening of the p300/CBP HistoneAcetyltransferase: Identification of a Selective Small Molecule Inhibitor", Chemistry & Biology, vol. 17, No. 5, May 1, 2010 (May 1, 2010), pp. 471-482, XP055575681, GB ISSN: 1074-5521, DOI: 10.1016/j.chembiol.2010.03.006.
Gavande, N. S. et al.: "Design and Structure-Guided Development of Novel Inhibitors of the Xeroderma Pigmentosum Group A (XPA) Protein-DNA Interaction", Journal of Medicinal Chemistry, vol. 60, No. 19, Sep. 21, 2017 (Sep. 21, 2017), pp. 8055-8070, XP055796870, US ISSN: 0022-2623.
Fadda E. "Role of the XPA protein in the NER pathway: A perspective on the function of structural disorder in macromolecular assembly." Comput Struct Biotechnol J. Dec. 8, 2015;14:78-85. doi: 10.1016/j.csbj.2015.11.007. PMID: 26865925; PMCID: PMC4710682.
Buchko et al. Structural features of the minimal DNA binding domain (M98-F219) of human nucleotide excision repair protein XPA; Neucleic Acids Research, 1998, vol. 26, (pp. 2779-2788).
Hilton, B., et al. "A new structural insight into XPA-DNA interactions" Biosci. Rep. 34(6), 831-40 (2014).
Ikegami, T., et al. "Solution structure of the DNA- and RPA-binding domain of the human repair factor XPA" Nat. Struct. Bio., vol. 5, No. Aug. 8, 1998 (pp. 701-706).
Koch, S.C., et al. "Structural insights into the recognition of cisplatin and AAF-dG lesion by Rad14 (XPA)" Proc. Natl. Acad. Sci. U. S. A. 2015, 112, 8272-8277.
Patrick, S.M., et al. "Xeroderma Pigmentosum Complementation Group A Protein (XPA) Modulates RPA-DNA Interactions via Enhanced Complex Stability and Inhibition of Strand Separation Activity" J. Biol. Chem. v. 277, No. 18, pp. 16096-16101, May 3, 2002.
PCT International Search Report and Written Opinion completed Dec. 12, 2019 and issued in connection with PCT/US2018/051416.
Saijo, M., et al. "Nucleotide Excision Repair by Mutant Xeroderma Pigmentosum Group A (XPA) Proteins with Deficiency in Interaction with RPA" J. Biol. Chern, v. 286, No. 7, pp. 5476-5483, Feb. 18, 2011.
Sugitani, N. et al. "Redefining the DNA-Binding Domain of Human XPA" Journal of the American Chemical Society, 2014, 136, 10830-10833.
Sugitani, N. et al. "XPA: A key scaffold for human nucleotide excision repair." DNA Repair (Amst). Aug. 2016, 44:123-135. doi: 10.1016/j.dnarep.2016.05.018. Epub May 20, 2016. PMID: 27247238; PMCID: PMC4958585.
Yang, Z. "Specific and Efficient Binding of Xeroderma Pigmentosum Complementation Group A to Double-Strand/ Single-Strand DNA Junctions with 3' and/or 5'-ssDNA Branches" Biochemistry 2006, 45, 15921-15930.
PCT International Search Report and Written Opinion issued in connection with PCT/US2015/060675, dated Jun. 29, 2016.

(56) References Cited

OTHER PUBLICATIONS

Patrick SM, Turchi JJ. "Replication Protein A (RPA) Binding to Duplex Cisplatin-damaged DNA is Mediated through the Generation of Single-stranded DNA," J. Biol. Chem., 1999, 274, 14972-14978.
Patrick SM, Turchi JJ, "Stopped-flow kinetic analysis of replication protein A-binding DNA—Damage recognition and affinity for single-stranded DNA reveal differential contributions of k(on) and k(off) rate constants," J. Biol. Chem., 2001, 276.22630-22637.
Turchi J et al., "Targeting Nucleotide Excision Repair as a Mechanism to Increase Cisplatain Efficacy," In: Bonetti A, Leone R, Muggia FM, Howell SB, editors. Platinum and Other Heavy Metal Compounds in Cancer Chemotherapy. New York: Humana Press; 2009, 177-187, published Dec. 18, 2008.
Wold MS, "Replication protein A: a heterotrimeric, single-stranded DNA—binding protein required for eukaryotic DNA metabolism," Annual Review of Biochemistry, 1997, 66, 61-92.
Shuck et al., "Abstract #5545: The effect of a small molecule inhibitor of Replication Protein A (TDRL-505) on DNA binding, cellular function and platinum sensitivity." Cancer Research, May 1, 2009, 69, 5545.
Vidal. D. et al., "Structure-based discovery of new small molecule inhibitors of low molecular weight protein tyrosine phosphatase," European Journal of Medicinal Chemistry, 2007, 42, 1102-1108.
CAS RN: 131645-11-9 (entered Jan. 25, 1991).
Extended European Search Report for application No. EP11740474.9, dated Aug. 5, 2013.
PubChem CID 3153480, 4-(3,5-diphenyl-4,5-dihydro-1H-pyrazol-1-yl)-4-oxobutanoic acid <available at https://pubchem.ncbi.nlm.nih.gov/compound/3153480>.
Andrews, "Development of a high-throughput screen for inhibitors of replication protein A and its role in nucleotide excision repair," Mol. Cancer Ther., 2004, 3, 385-391.
Deng, "Structure of the Full-length Human RPA 14/32 Complex Gives Insights into the Mechanism of DNA Binding and Complex Formation," J. Mol. Biol., 2007, 374, 865-876.
Sharp, "In vitro Biological Characterization of a Novel, Synthetic Inhibitors Diaryl Pyrazole Resorcinol Class of Heat Shock Protein 90," Cancer Res., 2007, 67, 2206-2216.
Shuck, "Identification of Novel Small Molecule Inhibitors of Proteins Required for Genomic Maintenance and Stability," Doctoral thesis, Indiana University. Jun. 2010, pp. 1-131 <available at https://scholarworks.iupui.edu/bitstream/handle/1805/2233/Final%20thesis%2003.pdf?sequence=1 >.
PCT International Search Report and Written Opinion for PCT/US2011/023838, May 2011.
International Preliminary Report on Patentability of the International Searching Authority for PCT/US2011/023838, dated Aug. 2012.
Bernhardt et al., Terpene conjugates of diaminedichloridoplatinum (II) complexes: antiproliferative effects in HL-60 leukemia, 518A2 melanoma, and HT-29 colon cancer cells. Chemistry & Biodiversity, Aug. 2008, vol. 5, No. 8, p. 1645-1659. abstract, p. 1645, para 1, p. 1647, Scheme 1, p. 1649Table 1.
Lehman, J. et al., DNA-Dependent Conformational Changes in the Ku Heterodimer. Biochemistry, (2008), vol. 47, pp. 4359-4368.

\* cited by examiner

REPLICATION PROTEIN A (RPA)-DNA INTERACTION INHIBITORS

CROSS-REFERENCE TO RELATED APPLICATIONS

This application is a U.S. national counterpart application of international application serial No. PCT/US2020/064191 filed Dec. 10, 2020, which claims the benefit of U.S. Provisional Patent Application No. 62/946,100, filed Dec. 10, 2019, the entire disclosures of which are hereby incorporated by reference in their entireties.

GOVERNMENT RIGHTS

This invention was made with government support under CA180710 awarded by the National Institutes of Health. The government has certain rights in the invention.

BACKGROUND

The clinical efficacy of numerous DNA damaging cancer chemotherapeutics and radiotherapy is inducing sufficient DNA damage to push cancer cells into apoptosis. DNA damage is normally recognized and repaired by the numerous intrinsic DNA repair pathways and is coordinated by DNA damage response (DDR) pathway that serve to limit therapeutic efficacy. One mechanism to explain the limited therapeutic window associated with these therapies is the intrinsic DNA repair deficiencies associated with many cancers. These DNA repair deficiencies have also been exploited in synthetic lethal strategies to develop safe and effective treatments. Following the success of PARP inhibitors in the clinics, over 50 clinical trials are currently enrolling patients to assess the safety and efficacy in combination with other targeted inhibitors that are involved in the DNA repair and DDR pathways. With an appropriately selected target, there is the potential to enhance therapeutic efficacy for both single agent anti-cancer activity and synergy with DNA damaging therapeutics in a single molecule. Therefore, targeting DNA repair and the DDR deficiencies to preferentially increase cytotoxicity, while minimizing the impact on normal cells, has potential for more selective, better tolerated therapies to improve cancer patient survival in multiple cancers.

Replication protein A (RPA) is the major human ssDNA binding protein and plays an integral role in both nucleotide excision repair (NER) and homologous recombination (HR) DNA repair pathways in addition to its essential role in DNA replication and DNA damage checkpoint activation. DNA repair and DNA damage checkpoint regulators are inherently interlinked in the DDR process. More recently, RPA has been implicated as a critical regulator of replication catastrophe (RC) with depletion of RPA or "RPA exhaustion" resulting in DNA strand breaks at replication forks, RC and cell death. The RPA heterotrimer consists of 70 kDa (RPA70), 32 kDa (RPA32) and 14 kDa (RPA14) subunits with the 70-kDa subunit containing the two major high affinity DNA binding domains A and B that dictate binding to single-stranded DNA and duplex-damaged DNA. The RPA70 subunit also contains domains C and F while domains D and E are located in the 32-kDa and 14-kDa subunit, respectively. The RPA protein participates in a series of essential interactions with DNA to support NER catalyzed repair of bulky adduct DNA damage. Platinum-based chemotherapeutics impart their therapeutic efficacy via the formation of bulky DNA adducts which interfere with DNA replication, transcription and cell division and ultimately induce cell death. Repair and tolerance of these Pt-DNA lesions by NER and HR are directly linked to platinum resistance which ultimately hampers the efficacy of platinum-based therapy. RPA is also overexpressed in a number of cancers including lung, ovarian, breast, colon and esophageal and retrospective analysis of clinical data demonstrate that RPA is predictive of response to therapy in lung and ovarian cancer with high RPA expression portending a worse outcome. Each of these critical roles of RPA and its binding to ssDNA make the RPA-DNA interaction a promising target to develop further anti-cancer monotherapy. Additionally, in combination with platinum drugs or with other DDR inhibitors, RPA inhibition is likely to increase therapeutic efficacy.

SUMMARY

In one aspect, the disclosure relates to a compound of the formula

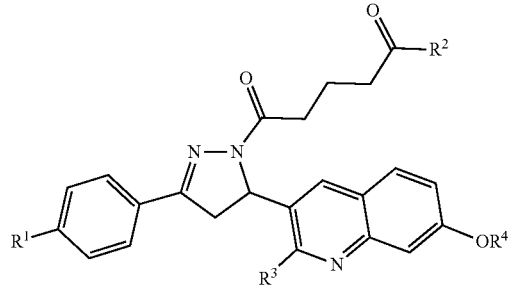

wherein
$R^1$ is selected from the group consisting of bromo, chloro, iodo, trifluoromethyl, —OC(O)-morpholinyl, morpholinyl, furanyl, phenyl, pyridinyl, and isoxazolyl, wherein each hydrogen atom in furanyl, phenyl, pyridinyl, and isoxazolyl is independently optionally substituted with chloro, fluoro, bromo, iodo, $C_1$-$C_6$ haloalkyl, $C_1$-$C_6$ alkyl, or morpholinyl;
$R^2$ is —OH, —NH—OH, —NH—$SO_2$—$R^5$, —NH($CH_2$)$_n$-morpholinyl, —NH($CH_2$)$_n$-piperazinyl, or —NH($CH_2$)$_n$—(N-methyl-piperazinyl);
$R^3$ is chloro, fluoro, bromo, or iodo;
$R^4$ is $C_1$-$C_6$ alkyl;
$R^5$ is $C_1$-$C_6$ haloalkyl, $C_1$-$C_6$ alkyl, or $C_3$-$C_6$ cycloalkyl, and
n is 1, 2, 3, or 4;
or a pharmaceutically acceptable salt thereof; and
with the proviso that the compound is not of the formula

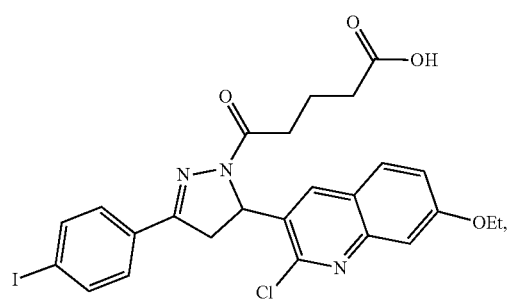

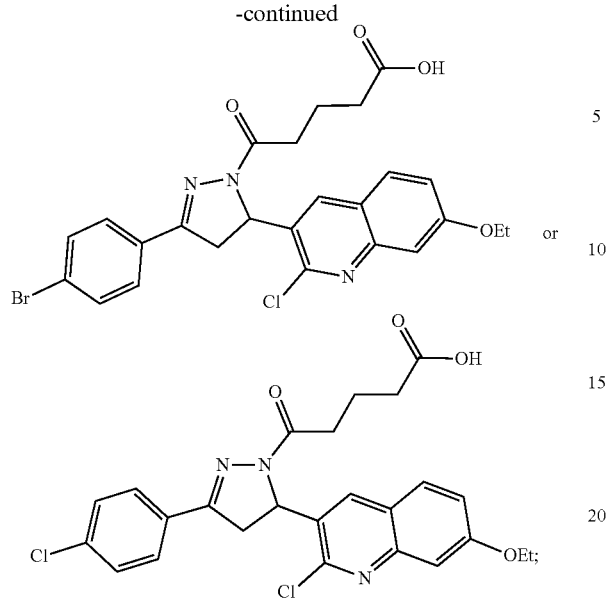
or a pharmaceutically acceptable salt thereof.
In another aspect, the disclosure relates to a compound or a pharmaceutically acceptable salt thereof, of the formula
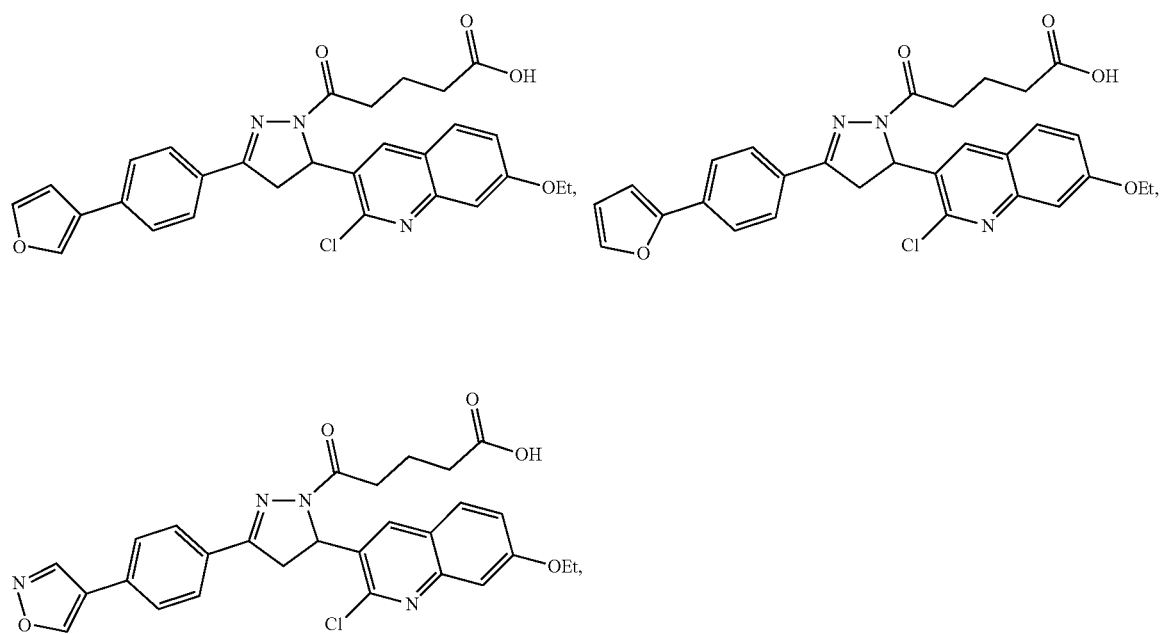
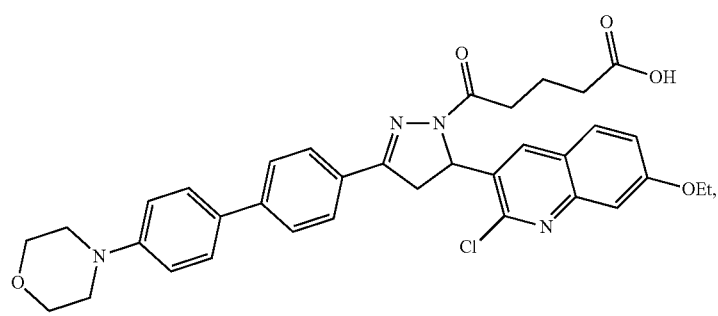

-continued
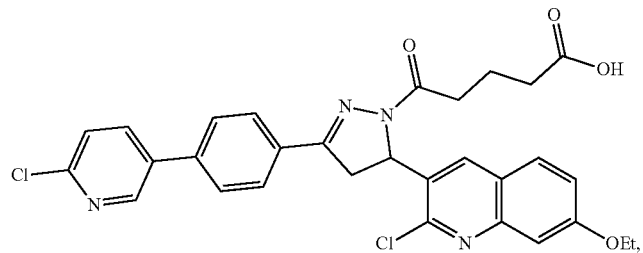
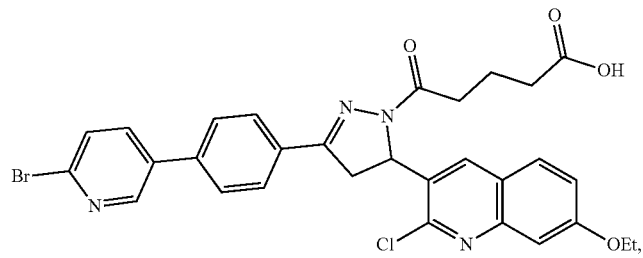
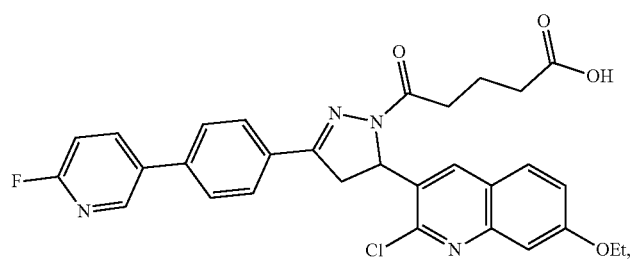
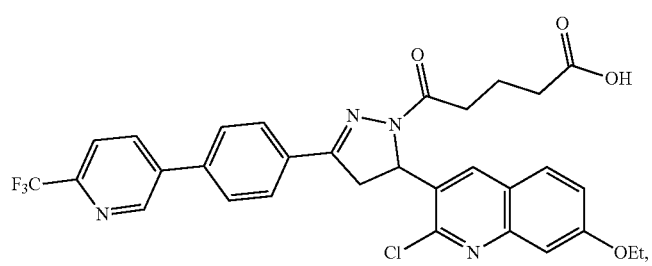
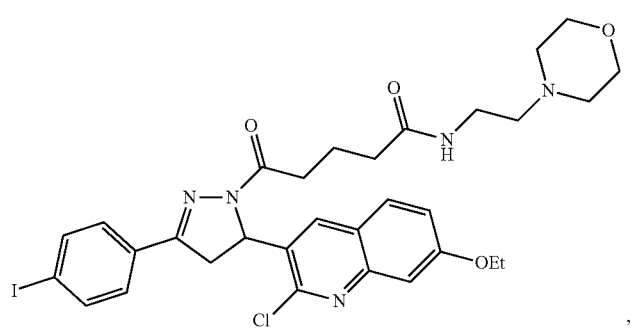
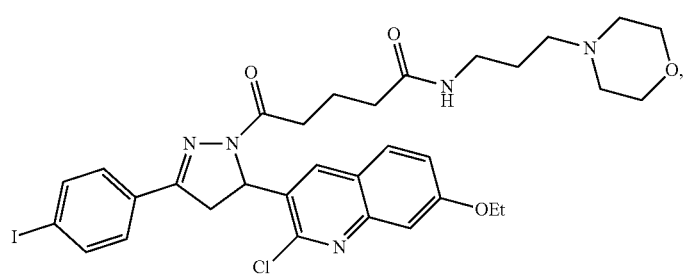

-continued

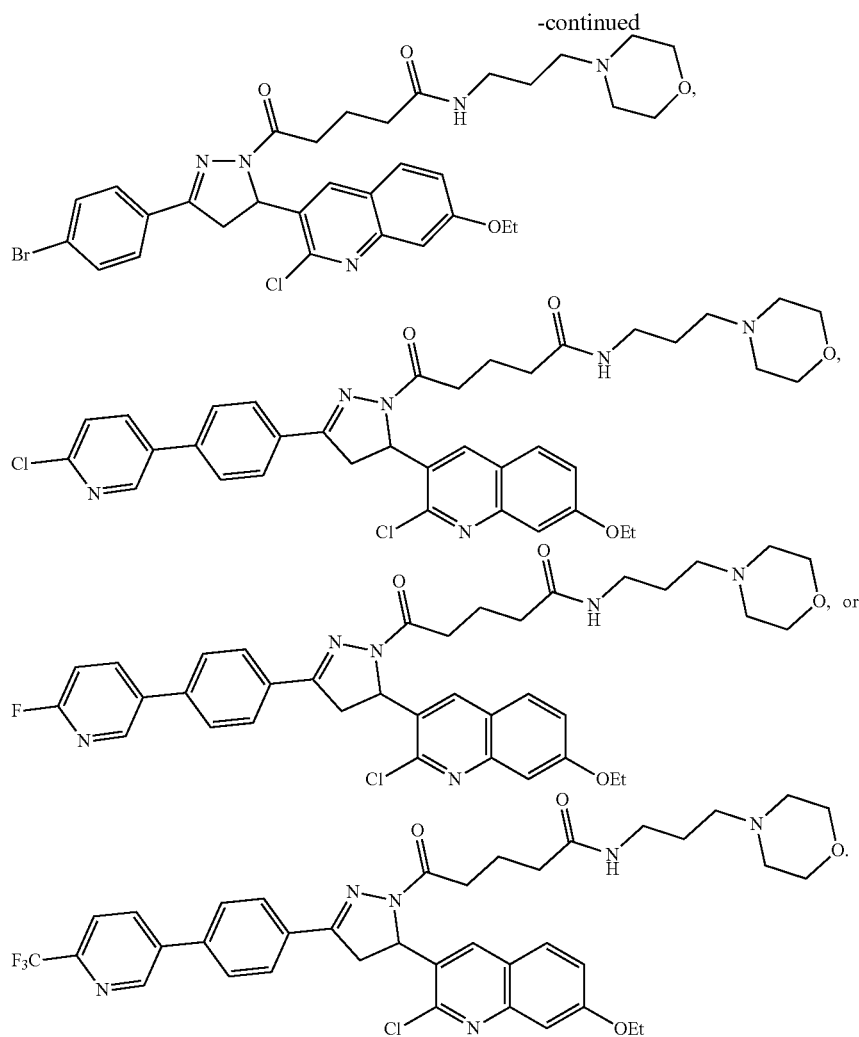

Additional embodiments, features, and advantages of the disclosure will be apparent from the following detailed description and through practice of the disclosure. The compounds of the present disclosure can be described as embodiments in any of the following enumerated clauses. It will be understood that any of the embodiments described herein can be used in connection with any other embodiments described herein to the extent that the embodiments do not contradict one another.

1. A compound of the formula

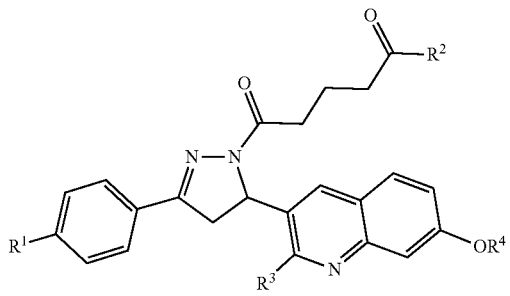

wherein $R^1$ is selected from the group consisting of bromo, chloro, iodo, trifluoromethyl, —OC(O)-morpholinyl, morpholinyl, furanyl, phenyl, pyridinyl, and isoxazolyl, wherein each hydrogen atom in furanyl, phenyl, pyridinyl, and isoxazolyl is independently optionally substituted with chloro, fluoro, bromo, iodo, $C_1$-$C_6$ haloalkyl, $C_1$-$C_6$ alkyl, or morpholinyl;

$R^2$ is —OH, —NH—OH, —NH—SO$_2$—$R^5$, —NH(CH$_2$)$_n$-morpholinyl, —NH(CH$_2$)$_n$-piperazinyl, or —NH(CH$_2$)$_n$—(N-methyl-piperazinyl);

$R^3$ is chloro, fluoro, bromo, or iodo;

$R^4$ is $C_1$-$C_6$ alkyl;

$R^5$ is $C_1$-$C_6$ haloalkyl, $C_1$-$C_6$ alkyl, or $C_3$-$C_6$ cycloalkyl, and n is 1, 2, 3, or 4;

or a pharmaceutically acceptable salt thereof; and with the proviso that the compound is not of the formula

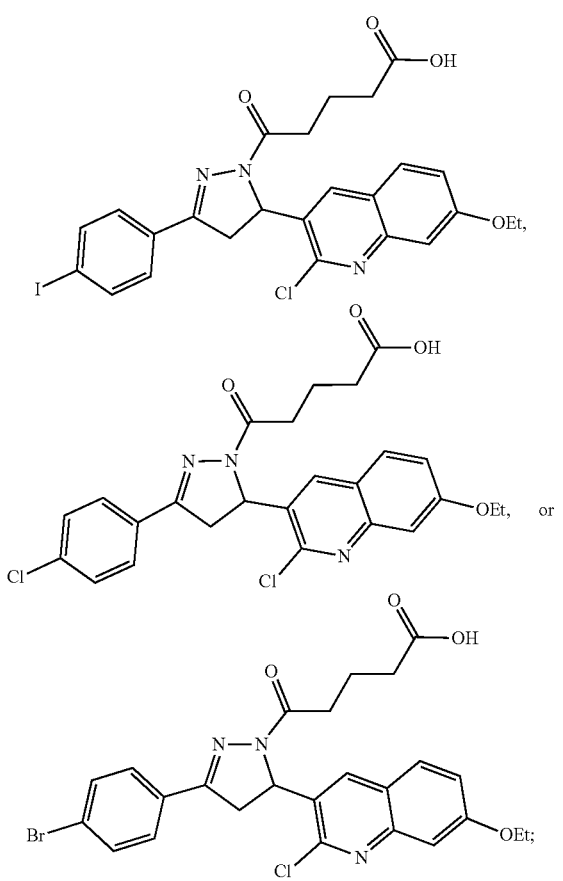

or a pharmaceutically acceptable salt thereof.

2. The compound of clause 1, or a pharmaceutically acceptable salt thereof, wherein $R^1$ is pyridinyl having one hydrogen atom substituted with chloro, fluoro, bromo, iodo, $C_1$-$C_6$ haloalkyl, or $C_1$-$C_6$ alkyl.

3. The compound of clause 1 or 2, or a pharmaceutically acceptable salt thereof, wherein $R^1$ is pyridinyl having one hydrogen atom in the para position relative to the point of attachment of $R^1$ to the compound substituted with chloro, fluoro, bromo, iodo, $C_1$-$C_6$ haloalkyl, or $C_1$-$C_6$ alkyl.

4. The compound of clause 1, or a pharmaceutically acceptable salt thereof, wherein $R^1$ is furanyl or isoxazolyl.

5. The compound of any one of the preceding clauses, or a pharmaceutically acceptable salt thereof, wherein $R^2$ is —OH.

6. The compound of any one of clauses 1-4, or a pharmaceutically acceptable salt thereof, wherein $R^2$ is —NH(CH$_2$)$_3$-morpholinyl.

7. The compound of clause 1, or a pharmaceutically acceptable salt thereof, wherein $R^1$ is bromo or iodo.

8. The compound of clause 1 or 7, or a pharmaceutically acceptable salt thereof, wherein $R^1$ is bromo.

9. The compound of clause 1 or 7, or a pharmaceutically acceptable salt thereof, wherein $R^1$ is iodo.

10. The compound of clause 1 or 7-9, or a pharmaceutically acceptable salt thereof, wherein $R^2$ is —NH(CH$_2$)$_3$-morpholinyl.

11. A compound of the formula

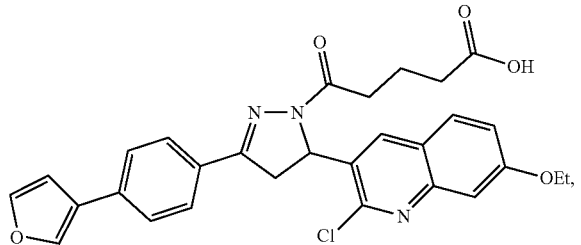

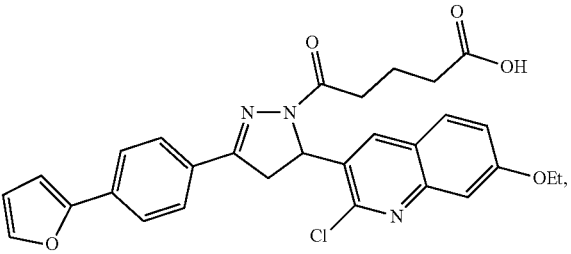

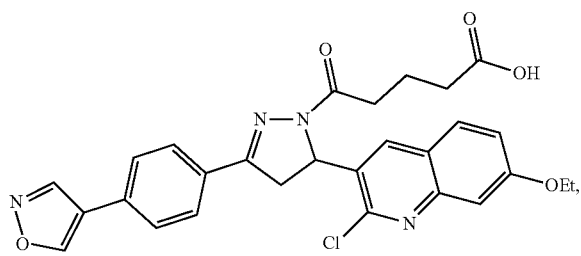

-continued
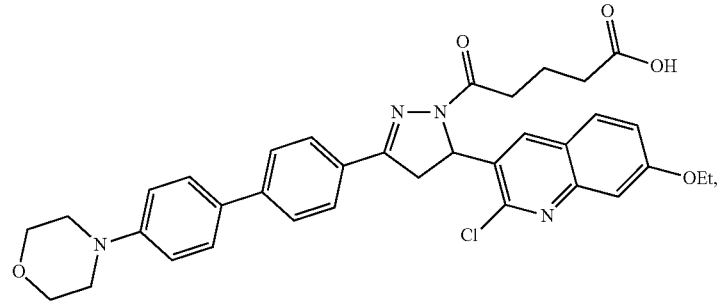
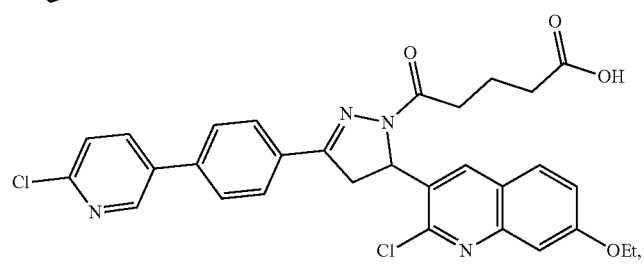
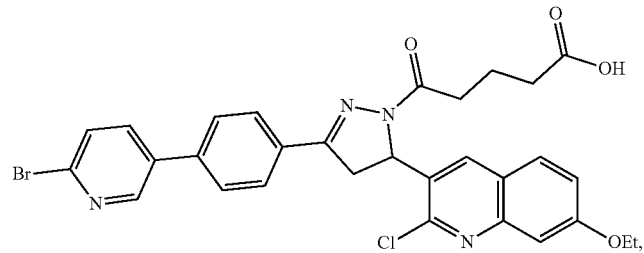
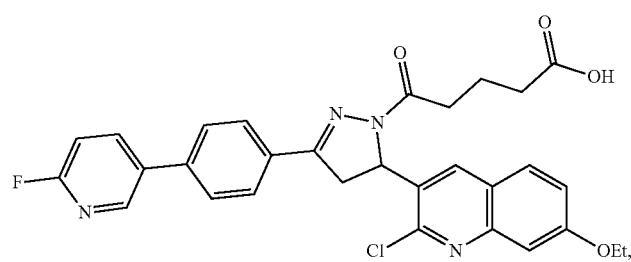
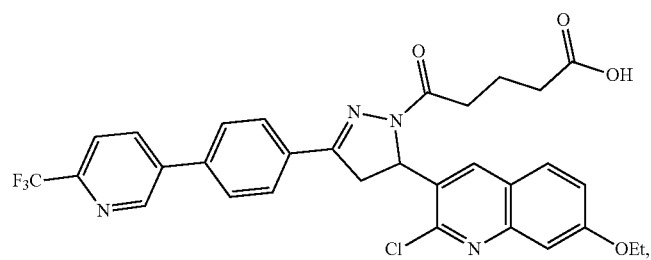
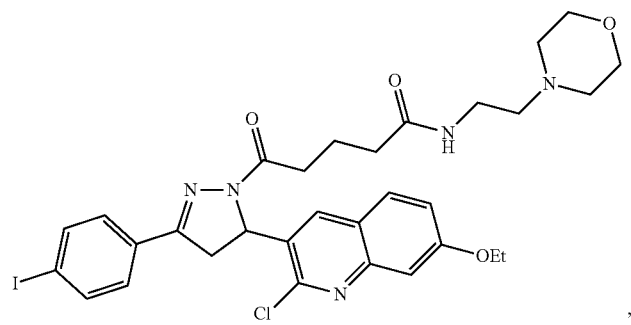

-continued

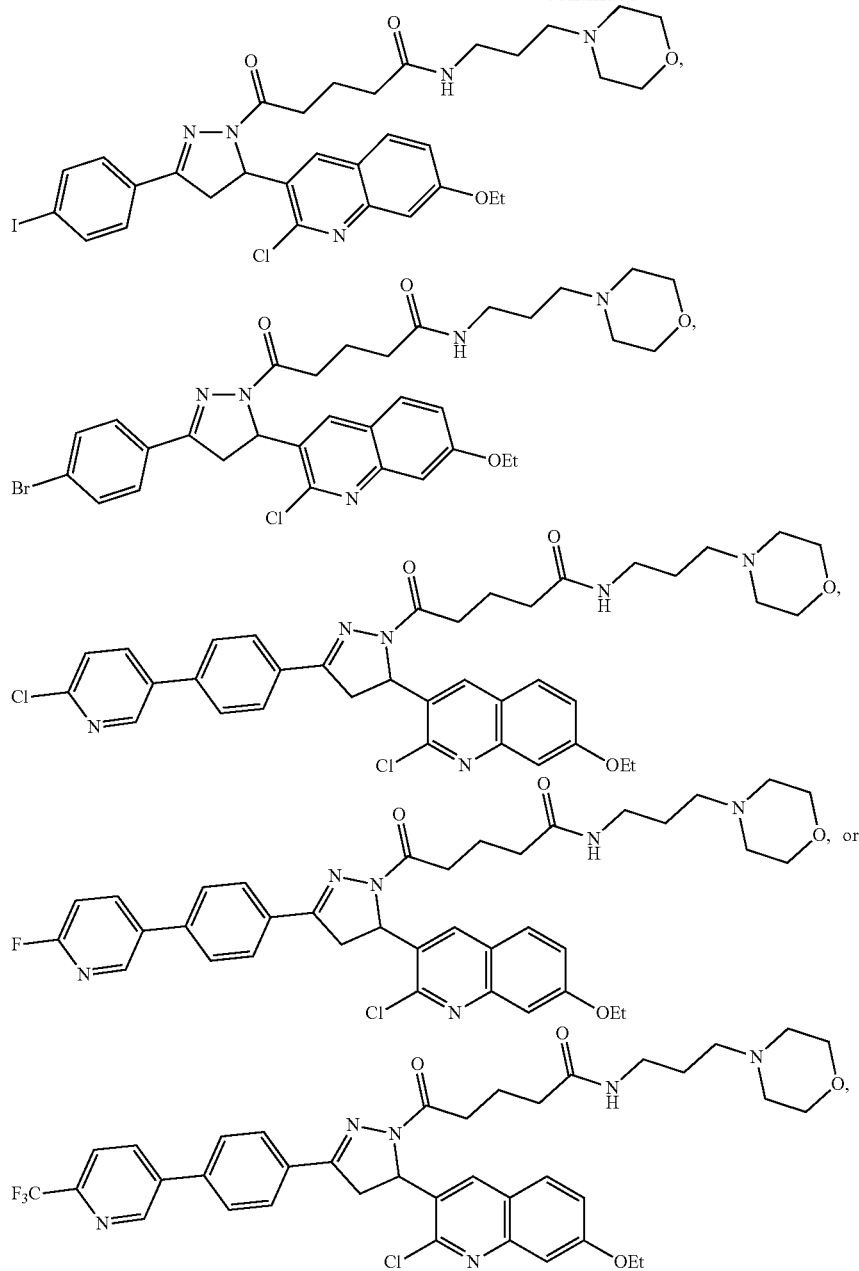

or a pharmaceutically acceptable salt thereof.

11. A pharmaceutical composition comprising a therapeutically effective amount of a compound according any one of clauses 1-10, and at least one pharmaceutically acceptable carrier, diluent, or excipient.

12. A method of treating cancer to a patient in need of such treatment, comprising administering a therapeutically effective amount of a compound of any one of clauses 1-10, or a pharmaceutically acceptable salt thereof, or a pharmaceutical composition of clause 11.

13. The method of clause 12, wherein the compound interferes with the cell cycle of a cancer cell or is metabolized into a chemical that interferes with the cell cycle of a cancer cell.

14. A method of treating a disease, comprising
a. administering a therapeutically effective amount of a compound of any one of clauses 1-10, or a pharmaceutically acceptable salt thereof, or a pharmaceutical composition of clause 11; and
b. administering a therapeutically effective amount of at least one additional therapeutic agent.

15. The method of clause 14, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.
16. The method according to any one of clauses 12-15, wherein the cancer is ovarian cancer cell or non-small cell lung cancer.
17. A compound according to any one of clauses 1-10, or a pharmaceutically acceptable salt thereof, for treating cancer in a patient.
18. The compound of clause 17, further comprising administering to the patient a therapeutically effective amount of at least one additional therapeutic agent.
19. The compound of clause 18, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.
20. Use of a compound according to any one of clauses 1-10, or a pharmaceutically acceptable salt thereof, in the manufacture of a medicament for use in treating cancer in a patient.
21. The use of clause 20, wherein the cancer is ovarian cancer cell or non-small cell lung cancer.
22. A synergistic combination comprising a compound of any one of clauses 1-10, or a pharmaceutically acceptable salt thereof, or a pharmaceutical composition of clause 11, and at least one additional therapeutic agent.
23. The synergistic combination of clause 22, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.
24. The synergistic combination of clause 22 or 23, wherein compound of any one of clauses 1-10, or a pharmaceutically acceptable salt thereof, or a pharmaceutical composition of clause 11, and the at least one additional therapeutic agent are brought together at a locus.
25. The synergistic combination of any one of clauses 22-24, wherein the locus is a cancer cell.
26. The synergistic combination of any one of clauses 22-24, wherein the locus is a human body.
27. A method of treating disease in a patient, the method comprising
administering a therapeutically effective amount of a compound of any one of clauses 1-10, or a pharmaceutically acceptable salt thereof, or a pharmaceutical composition of clause 11;
wherein the patient is previously identified as having a modulated expression of at least one gene selected from the group consisting of FEN1, APTX, PRKCG, POLE2, XRCC6, ATRX, TCEA1, IP6K3, FANCM, XAB2, ERCC2, DDB1, RRM2, BRE, PRPF19, UVRAG, DCLRE1C, KAT5, RNF168, and RTEL1.
28. The method of clause 27, wherein the patient is previously identified as having more than one gene selected from the group consisting of FEN1, APTX, PRKCG, POLE2, XRCC6, ATRX, TCEA1, IP6K3, FANCM, XAB2, ERCC2, DDB1, RRM2, BRE, PRPF19, UVRAG, DCLRE1C, KAT5, RNF168, and RTEL1.
29. The method of clause 27 or 28, wherein the disease is selected from the group consisting of cancer, pain, neurological diseases, autoimmune diseases, and inflammation.
30. The method of any one of clauses 27-29, further comprising:
b. administering a therapeutically effective amount of at least one additional therapeutic agent.
31. The method of clause 30, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.

BRIEF DESCRIPTION OF THE FIGURES

FIG. 1A-1C shows fluorescent intercalator displacement (FID): The indicated concentrations of doxorubicin (Dox), compounds 19, 23, 26, 27, 43 and 45 were analyzed for the ability to displace a fluorescent Sybr-green DNA intercalator as a measure of compound DNA interactions. The assay was performed and fluorescence measured as described herein. The data represent the average and SD of three independent experimental determinations performed in duplicates. FIG. 1D shows Differential Scanning Fluorimetry (DSF) assay with compound 43 was performed as described herein and data represent the average of triplicate determinations. FIG. 1A: (●) Dox, (■) Compound 19, (▲) Compound 45. FIG. 1B: (●) Dox, (■) Compound 23, (▲) Compound 43. FIG. 1C: (●) Dox, (■) Compound 26, (▲) Compound 17.

FIGS. 2A-C show molecular interactions of compound 26 (FIG. 2A), 42 (FIG. 2B), and 45 (FIG. 2C) with hRPA. Interaction with amino acid side chains is indicated with the dashed lines, π-π stacking interactions are shown in solid dumbbell and salt-bridge interactions are shown in dashed two-sided arrow. Interaction distances indicated in Å. FIG. 2D shows molecular overlay (superimposition) of compound 26, 42 and 45 in the RPA binding site.

FIG. 3A shows the aqueous solubility as was determined in unbuffered water as described herein. The values represent the average and SD of three independent experimental determinations. FIG. 3B shows cellular uptake as was determined in H460 NSCLC cells as described herein. The LC/MS signal was quantified and relative level was determined and normalized to compound 9. Individual data points are plotted and bars represent the mean and SD of three independent experimental determinations.

FIG. 4A shows analysis of single agent activity of compound 9, 26 and 43 in eCCK-8 metabolic assay. FIG. 4B shows analysis of single agent activity of compound 43 in A2780 (EOC), GCT27 (testicular) and H460 (lung) cancer cell models. FIG. 2C shows analysis of combination effect of compound 43 with taxol, cisplatin, etoposide and bleomycin in SKGT esophageal adenocarcinoma (EAC) and H460 NSCLC lung cancer cell models. FIG. 2D shows analysis of synergistic effect of compound 43 with BMN637 (PARP inhibitor), NU7441 (DNA-PK inhibitor), VE821 (ATR inhibitor) and MK1775 (WEE1 inhibitor) in SKGT EAC cell model. The combination index (CI) of compound 43 with DNA damaging agents/DDR inhibitors were determined through a Chou-Talalay based approach as described in herein. The data represent the average and SEM from three independent determinations FIG. 5A is a chart showing tumor volumes taken from mice bearing H460 NSCLC tumors at various time points after tumor implant. FIG. 5B is a chart showing tumor weight taken from mice bearing H460 NSCLC tumors at various time points after tumor implant. In FIG. 5A, (▼) Indicates the days on which the animal was adminstered Compound 44. FIG. 5C is a chart showing tumor volumes taken from mice bearing A549 human lung carcinoma at various time points after tumor implant. FIG. 5D is a chart showing tumor weight taken from mice bearing A549 human lung carcinoma at various time points after tumor implant. Each (●) in FIG. 5B and FIG. 5D represents the tumor removed from a different animal.

DETAILED DESCRIPTION

Figure 1A:
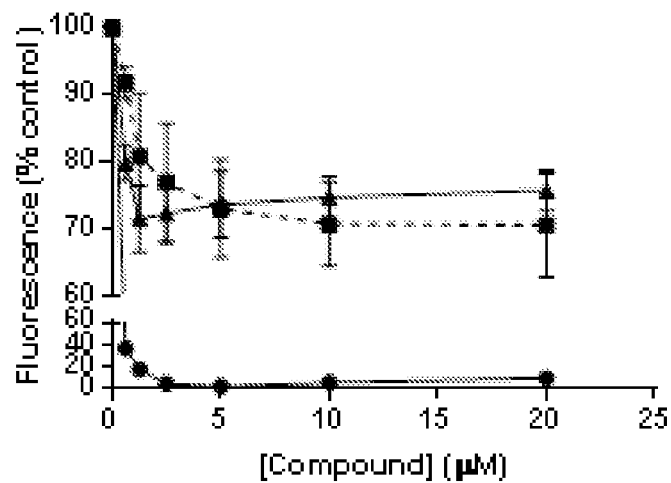
FIGS. 1A-D show analysis of compound interactions with DNA.

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

As used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As used herein, the terms "including," "containing," and "comprising" are used in their open, non-limiting sense.

To provide a more concise description, some of the quantitative expressions given herein are not qualified with the term "about." It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. Whenever a yield is given as a percentage, such yield refers to a mass of the entity for which the yield is given with respect to the maximum amount of the same entity that could be obtained under the particular stoichiometric conditions. Concentrations that are given as percentages refer to mass ratios, unless indicated differently.

Except as otherwise noted, the methods and techniques of the present embodiments are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

Chemical nomenclature for compounds described herein has generally been derived using the commercially-available ACD/Name 2014 (ACD/Labs) or ChemBioDraw μLtra 13.0 (Perkin Elmer).

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. All combinations of the embodiments pertaining to the chemical groups represented by the variables are specifically embraced by the present disclosure and are disclosed herein just as if each and every combination was individually and explicitly disclosed, to the extent that such combinations embrace compounds that are stable compounds (i.e., compounds that can be isolated, characterized, and tested for biological activity). In addition, all subcombinations of the chemical groups listed in the embodiments describing such variables are also specifically embraced by the present disclosure and are disclosed herein just as if each and every such sub-combination of chemical groups was individually and explicitly disclosed herein.

1. A compound of the formula

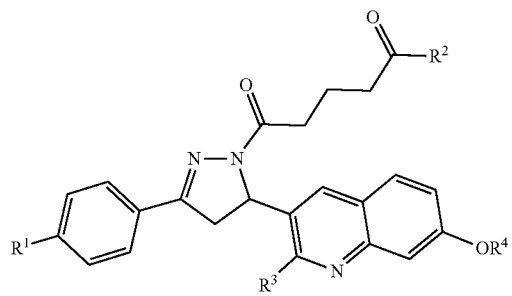

wherein $R^1$ is selected from the group consisting of bromo, chloro, iodo, trifluoromethyl, —OC(O)-morpholinyl, morpholinyl, furanyl, phenyl, pyridinyl, and isoxazolyl, wherein each hydrogen atom in furanyl, phenyl, pyridinyl, and isoxazolyl is independently optionally substituted with chloro, fluoro, bromo, iodo, $C_1$-$C_6$ haloalkyl, $C_1$-$C_6$ alkyl, or morpholinyl;

$R^2$ is —OH, —NH—OH, —NH—$SO_2$—$R^5$, —NH$(CH_2)_n$-morpholinyl, —NH$(CH_2)_n$-piperazinyl, or —NH$(CH_2)_n$—(N-methyl-piperazinyl);

$R^3$ is chloro, fluoro, bromo, or iodo;

$R^4$ is $C_1$-$C_6$ alkyl;

$R^5$ is $C_1$-$C_6$ haloalkyl, $C_1$-$C_6$ alkyl, or $C_3$-$C_6$ cycloalkyl, and n is 1, 2, 3, or 4;

or a pharmaceutically acceptable salt thereof; and with the proviso that the compound is not of the formula

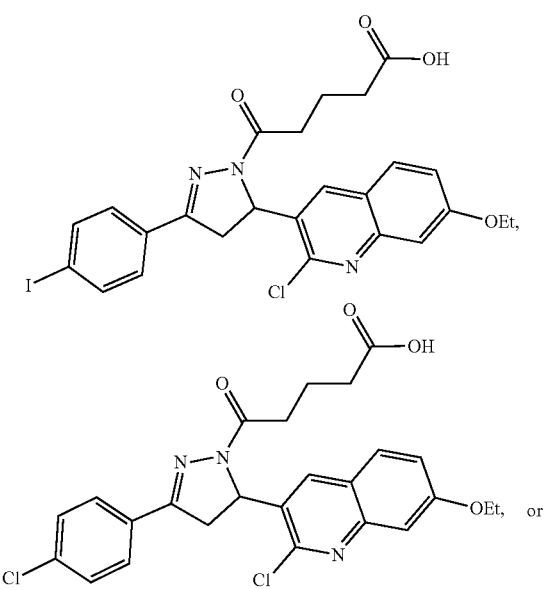

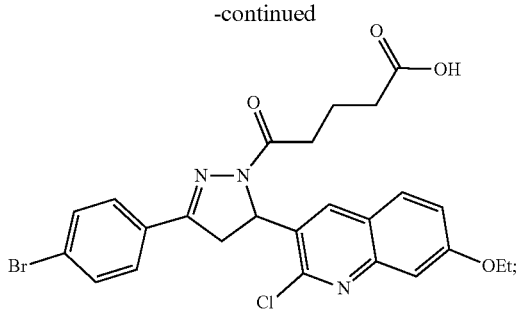

or a pharmaceutically acceptable salt thereof.

The compound of the preceding clause, or a pharmaceutically acceptable salt thereof, wherein $R^1$ is pyridinyl having one hydrogen atom substituted with chloro, fluoro, bromo, iodo, $C_1$-$C_6$ haloalkyl, or $C_1$-$C_6$ alkyl.

The compound of any preceding clause, or a pharmaceutically acceptable salt thereof, wherein $R^1$ is pyridinyl having one hydrogen atom in the para position relative to the point of attachment of $R^1$ to the compound substituted with chloro, fluoro, bromo, iodo, $C_1$-$C_6$ haloalkyl, or $C_1$-$C_6$ alkyl.

The compound of any preceding clause, or a pharmaceutically acceptable salt thereof, wherein $R^1$ is furanyl or isoxazolyl.

The compound of any preceding clause, or a pharmaceutically acceptable salt thereof, wherein $R^2$ is —OH.

The compound of any preceding clause, or a pharmaceutically acceptable salt thereof, wherein $R^2$ is —NH$(CH_2)_3$-morpholinyl.

The compound of any preceding clause, or a pharmaceutically acceptable salt thereof, wherein $R^1$ is bromo or iodo.

The compound of any preceding clause, or a pharmaceutically acceptable salt thereof, wherein $R^1$ is bromo.

The compound of any preceding clause, or a pharmaceutically acceptable salt thereof, wherein $R^1$ is iodo.

The compound of any preceding clause, or a pharmaceutically acceptable salt thereof, wherein $R^2$ is —NH$(CH_2)_3$-morpholinyl.

A compound of the formula

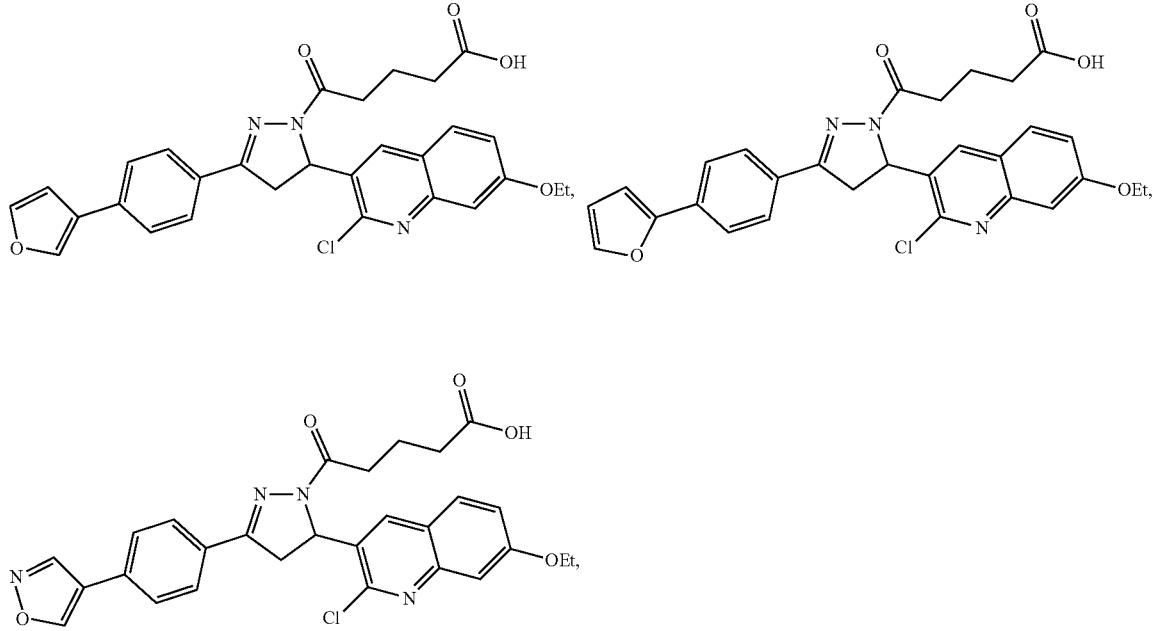

-continued
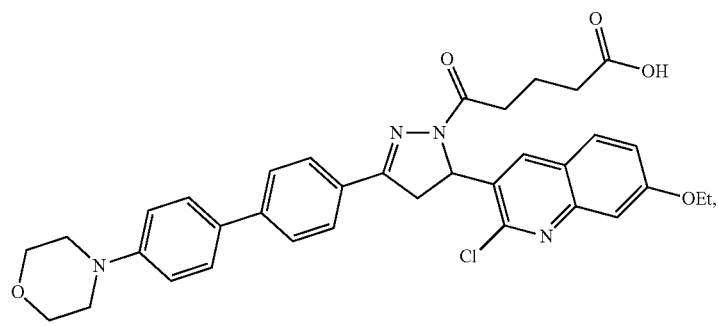
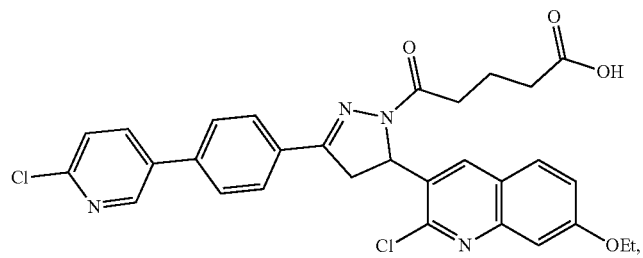
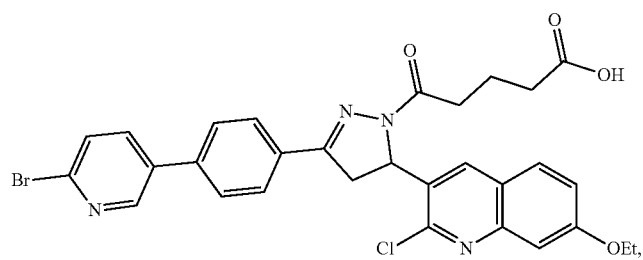
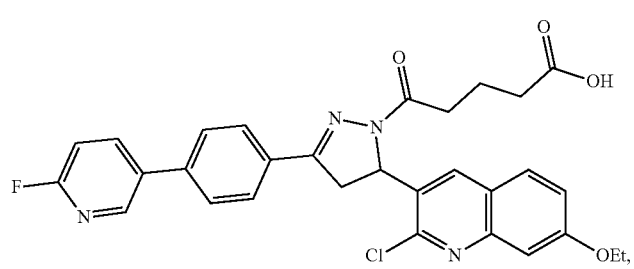
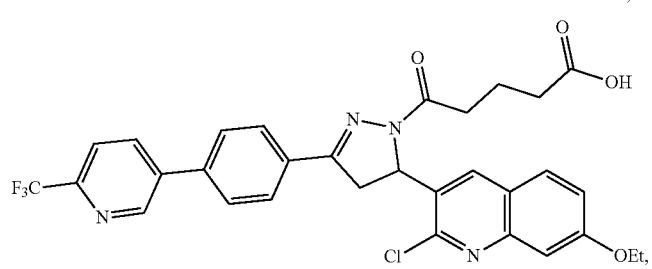
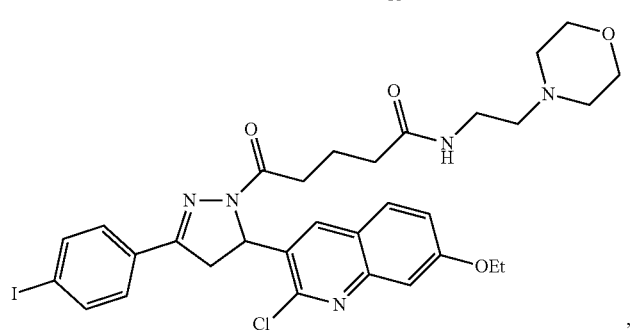
,

-continued

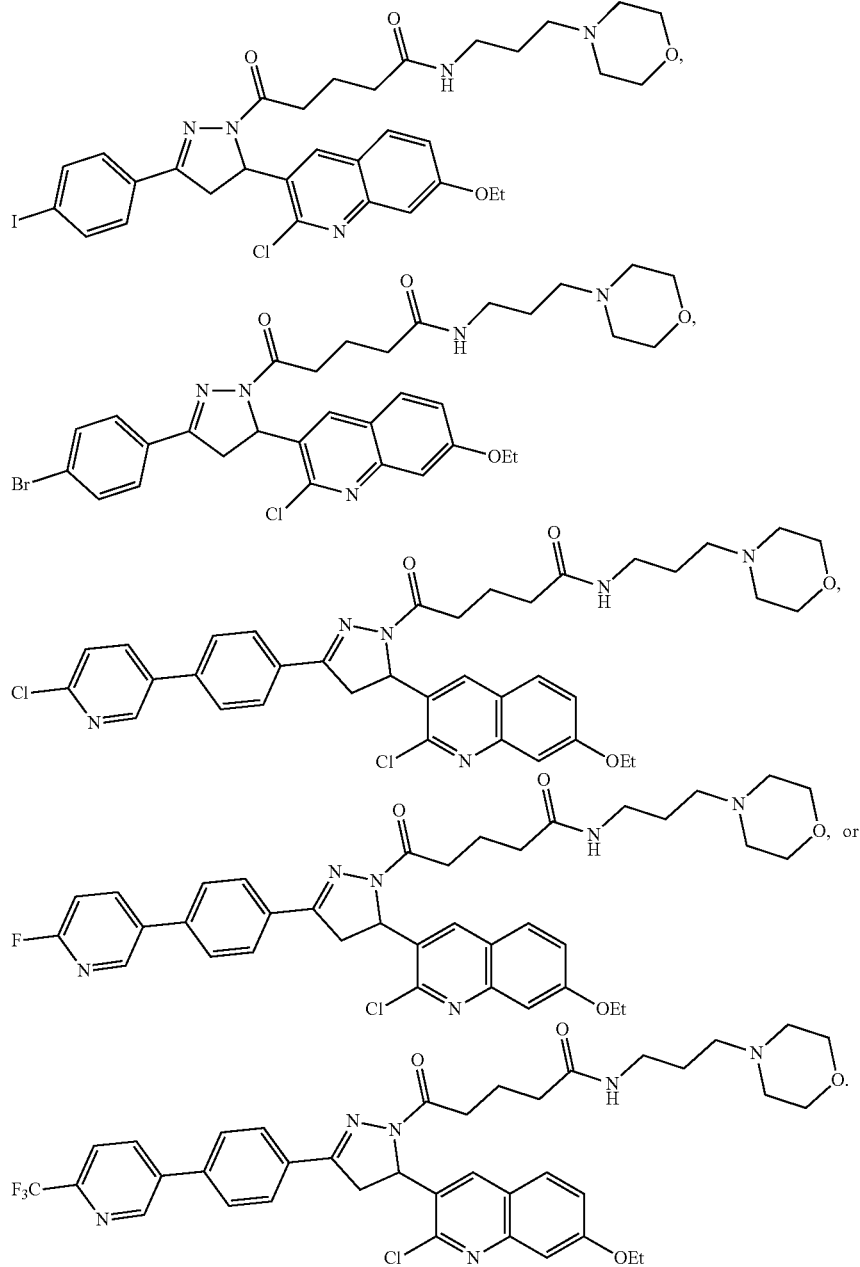

or a pharmaceutically acceptable salt thereof.

A pharmaceutical composition comprising a therapeutically effective amount of a compound according any preceding clause, and at least one pharmaceutically acceptable carrier, diluent, or excipient.

A method of treating cancer to a patient in need of such treatment, comprising administering a therapeutically effective amount of a compound of any preceding clause, or a pharmaceutically acceptable salt thereof, or a pharmaceutical composition of any preceding clause.

The method of the preceding clause, wherein the compound interferes with the cell cycle of a cancer cell or is metabolized into a chemical that interferes with the cell cycle of a cancer cell.

A method of treating a disease, comprising
a. administering a therapeutically effective amount of a compound of any preceding clause, or a pharmaceutically acceptable salt thereof, or a pharmaceutical composition of any preceding clause; and
b. administering a therapeutically effective amount of at least one additional therapeutic agent.

The method of the preceding clause, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.

The method according to any preceding clause, wherein the cancer is ovarian cancer cell or non-small cell lung cancer.

A compound according to any preceding clause, or a pharmaceutically acceptable salt thereof, for treating cancer in a patient.

The compound of the preceding clause, further comprising administering to the patient a therapeutically effective amount of at least one additional therapeutic agent.

The compound of the preceding clause, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.

Use of a compound according to any preceding clause, or a pharmaceutically acceptable salt thereof, in the manufacture of a medicament for use in treating cancer in a patient.

The use of the preceding clause, wherein the cancer is ovarian cancer cell or non-small cell lung cancer.

A synergistic combination comprising a compound of any one of clauses 1-10, or a pharmaceutically acceptable salt thereof, or a pharmaceutical composition of clause 11, and at least one additional therapeutic agent.

The synergistic combination of the preceding clause, wherein the at least one additional therapeutic agent is selected from the group consisting of BMN637, NU7441, VE821, MK1775, cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan.

The synergistic combination of any preceding clause, wherein compound of any preceding clause, or a pharmaceutically acceptable salt thereof, or a pharmaceutical composition of any preceding clause, and the at least one additional therapeutic agent are brought together at a locus.

The synergistic combination of any preceding clause, wherein the locus is a cancer cell.

The synergistic combination of any preceding clause, wherein the locus is a human body.

Definitions

As used herein, the term "alkyl" includes a chain of carbon atoms, which is optionally branched and contains from 1 to 20 carbon atoms. It is to be further understood that in certain embodiments, alkyl may be advantageously of limited length, including $C_1$-$C_{12}$, $C_1$-$C_{10}$, $C_1$-$C_9$, $C_1$-$C_8$, $C_1$-$C_7$, $C_1$-$C_6$, and $C_1$-$C_4$, Illustratively, such particularly limited length alkyl groups, including $C_1$-$C_8$, $C_1$-$C_7$, $C_1$-$C_6$, and $C_1$-$C_4$, and the like may be referred to as "lower alkyl." Illustrative alkyl groups include, but are not limited to, methyl, ethyl, n-propyl, isopropyl, n-butyl, isobutyl, sec-butyl, tert-butyl, pentyl, 2-pentyl, 3-pentyl, neopentyl, hexyl, heptyl, octyl, and the like. Alkyl may be substituted or unsubstituted. Typical substituent groups include halo or as described in the various embodiments provided herein. It will be understood that "alkyl" may be combined with other groups, such as those provided above, to form a functionalized alkyl. By way of example, the combination of an "alkyl" group, as described herein, with a "halo" group may be referred to as a "haloalkyl" group.

As used herein, "halo" or "halogen" refers to fluorine, chlorine, bromine or iodine.

As used herein, "bond" refers to a covalent bond.

The term "substituted" means that the specified group or moiety bears one or more substituents. The term "unsubstituted" means that the specified group bears no substituents. Where the term "substituted" is used to describe a structural system, the substitution is meant to occur at any valency-allowed position on the system. In some embodiments, "substituted" means that the specified group or moiety bears one, two, or three substituents. In other embodiments, "substituted" means that the specified group or moiety bears one or two substituents. In still other embodiments, "substituted" means the specified group or moiety bears one substituent.

As used herein, "optional" or "optionally" means that the subsequently described event or circumstance may but need not occur, and that the description includes instances where the event or circumstance occurs and instances in which it does not. For example, "wherein each hydrogen atom in pyridyl is independently optionally substituted by chloro" means that a chloro may be but need not be present on the pyridyl by replacing a hydrogen atom for each chloro group, and the description includes situations where the pyridyl is substituted with a chloro group and situations where the pyridyl is not substituted with the chloro group.

As used herein, "independently" means that the subsequently described event or circumstance is to be read on its own relative to other similar events or circumstances. For example, in a circumstance where several equivalent hydrogen groups are optionally substituted by another group described in the circumstance, the use of "independently optionally" means that each instance of a hydrogen atom on the group may be substituted by another group, where the groups replacing each of the hydrogen atoms may be the same or different. Or for example, where multiple groups exist all of which can be selected from a set of possibilities, the use of "independently" means that each of the groups can be selected from the set of possibilities separate from any other group, and the groups selected in the circumstance may be the same or different.

As used herein, the term "pharmaceutically acceptable salt" refers to those salts which counter ions which may be used in pharmaceuticals. See, generally, S. M. Berge, et al., "Pharmaceutical Salts," J. Pharm. Sci., 1977, 66, 1-19. Preferred pharmaceutically acceptable salts are those that are pharmacologically effective and suitable for contact with the tissues of subjects without undue toxicity, irritation, or allergic response. A compound described herein may possess a sufficiently acidic group, a sufficiently basic group, both types of functional groups, or more than one of each type, and accordingly react with a number of inorganic or organic bases, and inorganic and organic acids, to form a pharmaceutically acceptable salt. Such salts include:

(1) acid addition salts, which can be obtained by reaction of the free base of the parent compound with inorganic acids such as hydrochloric acid, hydrobromic acid, nitric acid, phosphoric acid, sulfuric acid, and perchloric acid and the like, or with organic acids such as acetic acid, oxalic acid, (D) or (L) malic acid, maleic acid, methane sulfonic acid, ethanesulfonic acid, p-toluene-sulfonic acid, salicylic acid, tartaric acid, citric acid, succinic acid or malonic acid and the like; or (2) salts formed when an acidic proton present in the parent compound either is replaced by a metal ion, e.g., an alkali metal ion, an alkaline earth ion, or an aluminum ion; or coordinates with an organic base such as ethanolamine, diethanolamine, triethanolamine, trimethamine, N-methylglucamine, and the like.

Pharmaceutically acceptable salts are well known to those skilled in the art, and any such pharmaceutically acceptable salt may be contemplated in connection with the embodiments described herein. Examples of pharmaceutically acceptable salts include sulfates, pyrosulfates, bisulfates, sulfites, bisulfites, phosphates, monohydrogen-phosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington's Pharmaceutical Sciences, 17th Edition, Mack Publishing Company, Easton, Pa., 1985.

For a compound described herein that contains a basic nitrogen, a pharmaceutically acceptable salt may be prepared by any suitable method available in the art, for example, treatment of the free base with an inorganic acid, such as hydrochloric acid, hydrobromic acid, sulfuric acid, sulfamic acid, nitric acid, boric acid, phosphoric acid, and the like, or with an organic acid, such as acetic acid, phenylacetic acid, propionic acid, stearic acid, lactic acid, ascorbic acid, maleic acid, hydroxymaleic acid, isethionic acid, succinic acid, valeric acid, fumaric acid, malonic acid, pyruvic acid, oxalic acid, glycolic acid, salicylic acid, oleic acid, palmitic acid, lauric acid, a pyranosidyl acid, such as glucuronic acid or galacturonic acid, an alpha-hydroxy acid, such as mandelic acid, citric acid, or tartaric acid, an amino acid, such as aspartic acid or glutamic acid, an aromatic acid, such as benzoic acid, 2-acetoxybenzoic acid, naphthoic acid, or cinnamic acid, a sulfonic acid, such as laurylsulfonic acid, p-toluenesulfonic acid, methanesulfonic acid, or ethanesulfonic acid, or any compatible mixture of acids such as those given as examples herein, and any other acid and mixture thereof that are regarded as equivalents or acceptable substitutes in light of the ordinary level of skill in this technology.

The disclosure also relates to pharmaceutically acceptable prodrugs of a compound described herein and treatment methods employing such pharmaceutically acceptable prodrugs. The term "prodrug" means a precursor of a designated compound that, following administration to a subject, yields the compound in vivo via a chemical or physiological process such as solvolysis or enzymatic cleavage, or under physiological conditions (e.g., a prodrug on being brought to physiological pH is converted to a compound described herein). A "pharmaceutically acceptable prodrug" is a prodrug that is non-toxic, biologically tolerable, and otherwise biologically suitable for administration to the subject. Illustrative procedures for the selection and preparation of suitable prodrug derivatives are described, for example, in "Design of Prodrugs", ed. H. Bundgaard, Elsevier, 1985.

The present disclosure also relates to pharmaceutically active metabolites of compounds described herein, and uses of such metabolites in the methods of the disclosure. A "pharmaceutically active metabolite" means a pharmacologically active product of metabolism in the body of a compound of a compound described herein, or salt thereof. Prodrugs and active metabolites of a compound may be determined using routine techniques known or available in the art. See, e.g., Bertolini et al., *J. Med. Chem.* 1997, 40, 2011-2016; Shan et al., *J. Pharm. Sci.* 1997, 86 (7), 765-767; Bagshawe, *Drug Dev. Res.* 1995, 34, 220-230; Bodor, *Adv. Drug Res.* 1984, 13, 255-331; Bundgaard, Design of Prodrugs (Elsevier Press, 1985); and Larsen, Design and Application of Prodrugs, Drug Design and Development (Krogsgaard-Larsen et al., eds., Harwood Academic Publishers, 1991).

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Examples of isotopes that can be incorporated into compounds of the disclosure include isotopes of hydrogen, carbon, nitrogen, oxygen, phosphorous, fluorine, chlorine, and iodine, such as $^{2}H$, $^{3}H$, $^{11}C$, $^{13}C$, $^{14}C$, $^{15}N$, $^{18}O$, $^{17}O$, $^{31}P$, $^{32}P$, $^{35}S$, $^{18}F$, $^{36}Cl$, and $^{125}I$, respectively. Such isotopically labelled compounds are useful in metabolic studies (preferably with $^{14}C$), reaction kinetic studies (with, for example $^{2}H$ or $^{3}H$), detection or imaging techniques [such as positron emission tomography (PET) or single-photon emission computed tomography (SPECT)] including drug or substrate tissue distribution assays, or in radioactive treatment of patients. Further, substitution with heavier isotopes such as deuterium (i.e., $^{2}H$) may afford certain therapeutic advantages resulting from greater metabolic stability, for example increased in vivo half-life or reduced dosage requirements. Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent.

Any disubstituent referred to herein is meant to encompass the various attachment possibilities when more than one of such possibilities are allowed. For example, reference to disubstituent -A-B—, where A≠B, refers herein to such disubstituent with A attached to a first substituted member and B attached to a second substituted member, and it also refers to such disubstituent with A attached to the second substituted member and B attached to the first substituted member.

REPRESENTATIVE EMBODIMENTS

In some embodiments, compounds described herein comprise a moiety of the formula

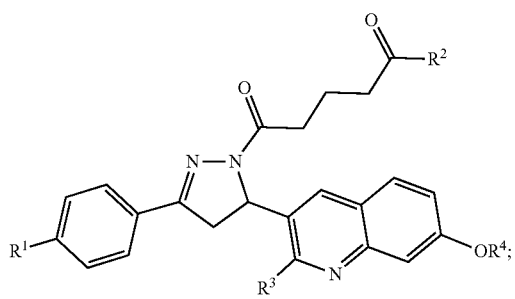

or a pharmaceutically acceptable salt thereof.

In some embodiments, $R^1$ is selected from the group consisting of bromo, chloro, iodo, trifluoromethyl, —OC(O)-morpholinyl, morpholinyl, furanyl, phenyl, pyridinyl, and isoxazolyl, wherein each hydrogen atom in furanyl, phenyl, pyridinyl, and isoxazolyl is independently optionally substituted with chloro, fluoro, bromo, iodo, $C_1$-$C_6$ haloalkyl, $C_1$-$C_6$ alkyl, or morpholinyl. In some embodiments, $R^1$ is selected from the group consisting of bromo, iodo, —OC(O)-morpholinyl, furanyl, phenyl, pydidinyl, and isoxazolyl, wherein each hydrogen atom in furanyl, phenyl, pyridinyl, and isoxazolyl is independently optionally substituted with chloro, fluoro, bromo, iodo, $C_1$-$C_6$ haloalkyl, or $C_1$-$C_6$ alkyl. In some embodiments, $R^1$ is pyrinidyl having one hydrogen atom substituted with chloro, fluoro, bromo, iodo, $C_1$-$C_6$ haloalkyl, $C_1$-$C_6$ alkyl, or morpholinyl. In some embodiments, $R^1$ is pyridinyl having one hydrogen atom in the para position relative to the point of attachment of $R^1$ to the compound substituted with chloro, fluoro, bromo, iodo, $C_1$-$C_6$ haloalkyl, or $C_1$-$C_6$ alkyl. In some embodiments, $R^1$ is furanyl or isoxazolyl. In some embodiments, $R^1$ is bromo or iodo. In some embodiments, $R^1$ is bromo. In some embodiments, $R^1$ is iodo.

In some embodiments, $R^2$ is —OH, —NH—OH, —NH—SO$_2$—R$_5$, —NH(CH$_2$)$_n$-morpholinyl, —NH(CH$_2$)$_n$-piperazinyl, or —NH(CH$_2$)$_n$—(N-methyl-piperazinyl). In some embodiments, $R^2$ is —OH, or —NH(CH$_2$)$_n$-morpholinyl. Illustratively, n is 0, 1, 2, or 3. In some embodiments, $R^2$ is —OH. In some embodiments, $R^2$ is —NH(CH$_2$)$_3$-morpholinyl.

In some embodiments, $R^3$ is chloro, fluoro, bromo, or iodo. In some embodiments, $R^3$ is chloro, bromo, or iodo.

In some embodiments, $R^4$ is $C_1$-$C_6$ alkyl.

In some embodiments, $R^5$ is $C_1$-$C_6$ haloalkyl, $C_1$-$C_6$ alkyl, or $C_3$-$C_6$ cycloalkyl In some embodiments, the compound is not of the formula

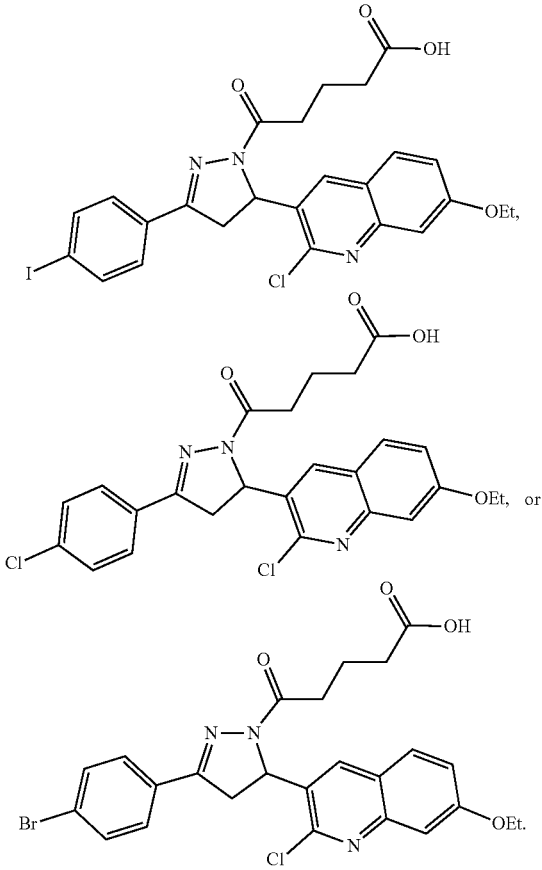

The following represent illustrative embodiments of compounds:

| Compound Number | Structure | Name |
|---|---|---|
| 22 | | 5-(5-(2-chloro-7-ethoxyquinolin-3-yl)-3-(4-(furan-3-yl)phenyl)-4,5-dihydro-1H-pyrazol-1-yl)-5-oxopentanoic acid |
| 23 | | 5-(5-(2-Chloro-7-ethoxyquinolin-3-yl)-3-(4-(furan-2-yl)phenyl)-4,5-dihydro-1H-pyrazol-1-yl)-5-oxopentanoic acid |

-continued

| Compound Number | Structure | Name |
|---|---|---|
| 24 | 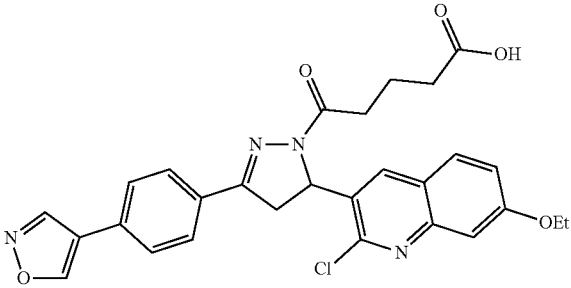 [SMILES: CCOc1ccc2cc(C3CC(c4ccc(-c5cnoc5)cc4)=NN3C(=O)CCCC(=O)O)c(Cl)nc2c1] | 5-(5-(2-Chloro-7-ethoxyquinolin-3-yl)-3-(4-(isoxazol-4-yl)phenyl)-4,5-dihydro-1H-pyrazol-1-yl)-5-oxopentanoic acid |
| 25 | 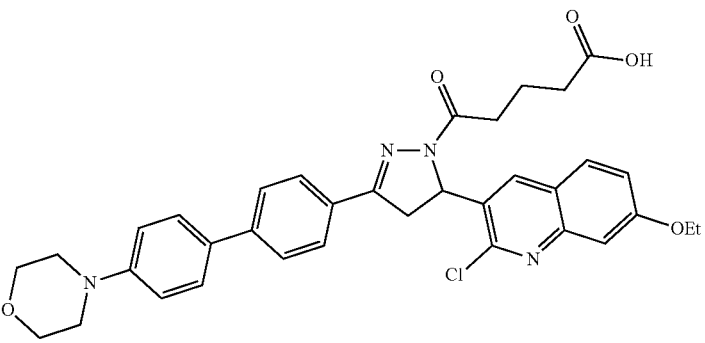 [SMILES: CCOc1ccc2cc(C3CC(c4ccc(-c5ccc(N6CCOCC6)cc5)cc4)=NN3C(=O)CCCC(=O)O)c(Cl)nc2c1] | 5-(5-(2-Chloro-7-ethoxyquinolin-3-yl)-3-(4'-morpholino-[1,1'-biphenyl]-4-yl)-4,5-dihydro-1H-pyrazol-1-yl)-5-oxopentanoic acid |
| 26 | 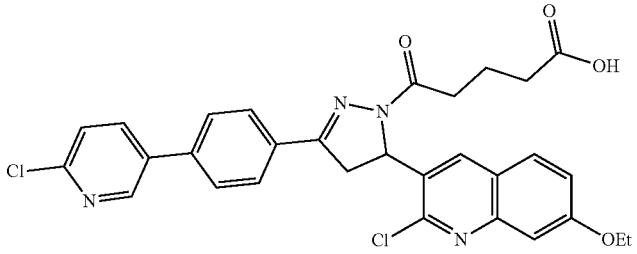 [SMILES: CCOc1ccc2cc(C3CC(c4ccc(-c5ccc(Cl)nc5)cc4)=NN3C(=O)CCCC(=O)O)c(Cl)nc2c1] | 5-(5-(2-Chloro-7-ethoxyquinolin-3-yl)-3-(4-(6-chloropyridin-3-yl)phenyl)-4,5-dihydro-1H-pyrazol-1-yl)-5-oxopentanoic acid |
| 27 | 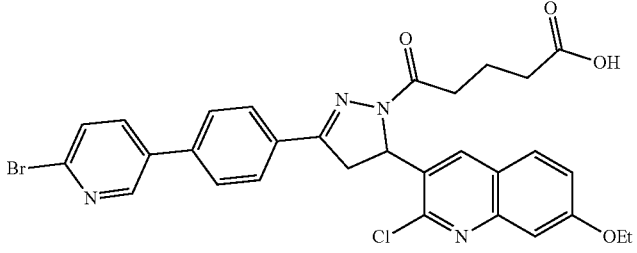 | 5-(3-(4-(6-Bromopyridin-3-yl)phenyl)-5-(2-chloro-7-ethoxyquinolin-3-yl)-4,5-dihydro-1H-pyrazol-1-yl)-5-oxopentanoic acid |
| 28 | 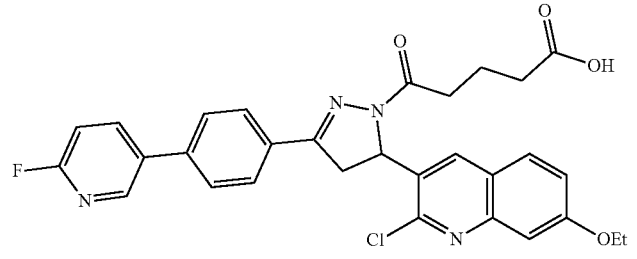 [SMILES: CCOc1ccc2cc(C3CC(c4ccc(-c5ccc(F)nc5)cc4)=NN3C(=O)CCCC(=O)O)c(Cl)nc2c1] | 5-(5-(2-Chloro-7-ethoxyquinolin-3-yl)-3-(4-(6-fluoropyridin-3-yl)phenyl)-4,5-dihydro-1H-pyrazol-1-yl)-5-oxopentanoic acid |

-continued

| Compound Number | Structure | Name |
| --- | --- | --- |
| 29 | | 5-(5-(2-Chloro-7-ethoxyquinolin-3-yl)-3-(4-(6-(trifluoromethyl)pyridin-3-yl)phenyl)-4,5-dihydro-1H-pyrazol-1-yl)-5-oxopentanoic acid |
| 42 | | 5-(5-(2-Chloro-7-ethoxyquinolin-3-yl)-3-(4-iodophenyl)-4,5-dihydro-1H-pyrazol-1-yl)-N-(2-morpholinoethyl)-5-oxopentanamide |
| 43 | | 5-(5-(2-Chloro-7-ethoxyquinolin-3-yl)-3-(4-iodophenyl)-4,5-dihydro-1H-pyrazol-1-yl)-N-(3-morpholinopropyl)-5-oxopentanamide |
| 44 | | 5-(3-(4-Bromophenyl)-5-(2-chloro-7-ethoxyquinolin-3-yl)-4,5-dihydro-1H-pyrazol-1-yl)-N-(3-morpholinopropyl)-5-oxopentanamide |
| 45 | | 5-(5-(2-Chloro-7-ethoxyquinolin-3-yl)-3-(4-(6-chloropyridin-3-yl)phenyl)-4,5-dihydro-1H-pyrazol-1-yl)-N-(3-morpholinopropyl)-5-oxopentanamide |

-continued

| Compound Number | Structure | Name |
|---|---|---|
| 46 | | 5-(5-(2-Chloro-7-ethoxyquinolin-3-yl)-3-(4-(6-fluoropyridin-3-yl)phenyl)-4,5-dihydro-1H-pyrazol-1-yl)-N-(3-morpholinopropyl)-5-oxopentanamide |
| 47 | | 5-(5-(2-Chloro-7-ethoxyquinolin-3-yl)-3-(4-(6-(trifluoromethyl)pyridin-3-yl)phenyl)-4,5-dihydro-1H-pyrazol-1-yl)-N-(3-morpholinopropyl)-5-oxopentanamide |

Those skilled in the art will recognize that the species listed or illustrated herein are not exhaustive, and that additional species within the scope of these defined terms may also be selected.

Pharmaceutical Compositions

For treatment purposes, pharmaceutical compositions comprising the compounds described herein may further comprise one or more pharmaceutically-acceptable excipients. A pharmaceutically-acceptable excipient is a substance that is non-toxic and otherwise biologically suitable for administration to a subject. Such excipients facilitate administration of the compounds described herein and are compatible with the active ingredient. Examples of pharmaceutically-acceptable excipients include stabilizers, lubricants, surfactants, diluents, anti-oxidants, binders, coloring agents, bulking agents, emulsifiers, or taste-modifying agents. In preferred embodiments, pharmaceutical compositions according to the invention are sterile compositions. Pharmaceutical compositions may be prepared using compounding techniques known or that become available to those skilled in the art.

Sterile compositions are also contemplated by the invention, including compositions that are in accord with national and local regulations governing such compositions.

The pharmaceutical compositions and compounds described herein may be formulated as solutions, emulsions, suspensions, or dispersions in suitable pharmaceutical solvents or carriers, or as pills, tablets, lozenges, suppositories, sachets, dragees, granules, powders, powders for reconstitution, or capsules along with solid carriers according to conventional methods known in the art for preparation of various dosage forms. Pharmaceutical compositions of the invention may be administered by a suitable route of delivery, such as oral, parenteral, rectal, nasal, topical, or ocular routes, or by inhalation. Preferably, the compositions are formulated for intravenous or oral administration.

For oral administration, the compounds the invention may be provided in a solid form, such as a tablet or capsule, or as a solution, emulsion, or suspension. To prepare the oral compositions, the compounds of the invention may be formulated to yield a dosage of, e.g., from about 0.1 mg to 1 g daily, or about 1 mg to 50 mg daily, or about 50 to 250 mg daily, or about 250 mg to 1 g daily. Oral tablets may include the active ingredient(s) mixed with compatible pharmaceutically acceptable excipients such as diluents, disintegrating agents, binding agents, lubricating agents, sweetening agents, flavoring agents, coloring agents and preservative agents. Suitable inert fillers include sodium and calcium carbonate, sodium and calcium phosphate, lactose, starch, sugar, glucose, methyl cellulose, magnesium stearate, mannitol, sorbitol, and the like. Exemplary liquid oral excipients include ethanol, glycerol, water, and the like. Starch, polyvinyl-pyrrolidone (PVP), sodium starch glycolate, microcrystalline cellulose, and alginic acid are exemplary disintegrating agents. Binding agents may include starch and gelatin. The lubricating agent, if present, may be magnesium stearate, stearic acid, or talc. If desired, the tablets may be coated with a material such as glyceryl monostearate or glyceryl distearate to delay absorption in the gastrointestinal tract, or may be coated with an enteric coating.

Capsules for oral administration include hard and soft gelatin capsules. To prepare hard gelatin capsules, active ingredient(s) may be mixed with a solid, semi-solid, or liquid diluent. Soft gelatin capsules may be prepared by mixing the active ingredient with water, an oil, such as peanut oil or olive oil, liquid paraffin, a mixture of mono and di-glycerides of short chain fatty acids, polyethylene glycol 400, or propylene glycol.

Liquids for oral administration may be in the form of suspensions, solutions, emulsions, or syrups, or may be lyophilized or presented as a dry product for reconstitution with water or other suitable vehicle before use. Such liquid compositions may optionally contain: pharmaceutically-acceptable excipients such as suspending agents (for example, sorbitol, methyl cellulose, sodium alginate, gelatin, hydroxyethylcellulose, carboxymethylcellulose, aluminum stearate gel and the like); non-aqueous vehicles, e.g., oil (for example, almond oil or fractionated coconut oil), propylene glycol, ethyl alcohol, or water; preservatives (for example, methyl or propyl p-hydroxybenzoate or sorbic acid); wetting agents such as lecithin; and, if desired, flavoring or coloring agents.

For parenteral use, including intravenous, intramuscular, intraperitoneal, intranasal, or subcutaneous routes, the agents of the invention may be provided in sterile aqueous solutions or suspensions, buffered to an appropriate pH and isotonicity or in parenterally acceptable oil. Suitable aqueous vehicles include Ringer's solution and isotonic sodium chloride. Such forms may be presented in unit-dose form such as ampoules or disposable injection devices, in multi-dose forms such as vials from which the appropriate dose may be withdrawn, or in a solid form or pre-concentrate that can be used to prepare an injectable formulation. Illustrative infusion doses range from about 1 to 1000 µg/kg/minute of agent admixed with a pharmaceutical carrier over a period ranging from several minutes to several days.

For nasal, inhaled, or oral administration, the inventive pharmaceutical compositions may be administered using, for example, a spray formulation also containing a suitable carrier. The inventive compositions may be formulated for rectal administration as a suppository.

For topical applications, the compounds of the present invention are preferably formulated as creams or ointments or a similar vehicle suitable for topical administration. For topical administration, the inventive compounds may be mixed with a pharmaceutical carrier at a concentration of about 0.1% to about 10% of drug to vehicle. Another mode of administering the agents of the invention may utilize a patch formulation to effect transdermal delivery.

As used herein, the terms "treat" or "treatment" encompass both "preventative" and "curative" treatment. "Preventative" treatment is meant to indicate a postponement of development of a disease, a symptom of a disease, or medical condition, suppressing symptoms that may appear, or reducing the risk of developing or recurrence of a disease or symptom. "Curative" treatment includes reducing the severity of or suppressing the worsening of an existing disease, symptom, or condition. Thus, treatment includes ameliorating or preventing the worsening of existing disease symptoms, preventing additional symptoms from occurring, ameliorating or preventing the underlying systemic causes of symptoms, inhibiting the disorder or disease, e.g., arresting the development of the disorder or disease, relieving the disorder or disease, causing regression of the disorder or disease, relieving a condition caused by the disease or disorder, or stopping the symptoms of the disease or disorder.

The term "subject" refers to a mammalian patient in need of such treatment, such as a human.

Exemplary diseases include cancer, pain, neurological diseases, autoimmune diseases, and inflammation. Cancer includes, for example, lung cancer, colon cancer, breast cancer, prostate cancer, hepatocellular carcinoma, renal cell carcinoma, gastric and esophago-gastric cancers, glioblastoma, head and neck cancers, inflammatory myofibroblastic tumors, and anaplastic large cell lymphoma. Pain includes, for example, pain from any source or etiology, including cancer pain, pain from chemotherapeutic treatment, nerve pain, pain from injury, or other sources. Autoimmune diseases include, for example, rheumatoid arthritis, Sjogren syndrome, Type I diabetes, and lupus. Exemplary neurological diseases include Alzheimer's Disease, Parkinson's Disease, Amyotrophic lateral sclerosis, and Huntington's disease. Exemplary inflammatory diseases include atherosclerosis, allergy, and inflammation from infection or injury.

In exemplary embodiments, compounds described herein may be useful for treating a disease such as cancer. In some embodiments, the cancer is in a patient. In some embodiments, the cancer is ovarian cancer or non-small cell lung cancer.

In treatment methods according to the invention, an "therapeutically effective amount" refers to an amount or dose sufficient to generally bring about the desired therapeutic benefit in subjects needing such treatment. Effective amounts or doses of the compounds of the invention may be ascertained by routine methods, such as modeling, dose escalation, or clinical trials, taking into account routine factors, e.g., the mode or route of administration or drug delivery, the pharmacokinetics of the agent, the severity and course of the infection, the subject's health status, condition, and weight, and the judgment of the treating physician. An exemplary dose is in the range of about from about 0.1 mg to 1 g daily, or about 1 mg to 50 mg daily, or about 50 to 250 mg daily, or about 250 mg to 1 g daily. The total dosage may be given in single or divided dosage units (e.g., BID, TID, QID).

Once improvement of the patient's disease has occurred, the dose may be adjusted for preventative or maintenance treatment. For example, the dosage or the frequency of administration, or both, may be reduced as a function of the symptoms, to a level at which the desired therapeutic or prophylactic effect is maintained. Of course, if symptoms have been alleviated to an appropriate level, treatment may cease. Patients may, however, require intermittent treatment on a long-term basis upon any recurrence of symptoms. Patients may also require chronic treatment on a long-term basis.

Identifying individual genes that can impact the efficacy of a compound of the present disclosure, for example compound 43, can be used to identify interacting pathways and genes. In some embodiments, identifying these genes can occur prior to treatment with a compound according to the present disclosure or can occur concurrently with administration. These data can be used for patient stratification to identify those more or less likely to respond to RPAi treatment. In addition, the genes and therefore the proteins identified offer the possibility for pharmacologic interventions with combination studies. Combining known inhibitors of gene hits may provide enhanced therapeutic efficacy compared to individual agents. In some embodiments, the patient could be treated with a combination therapeutic as described herein. Illustratively, this approach can be used for any of the diseases described herein.

In some embodiments, the identified genes include FEN1, APTX, PRKCG, POLE2, XRCC6, ATRX, TCEA1, IP6K3, FANCM, XAB2, ERCC2, DDB1, RRM2, BRE, PRPF19, UVRAG, DCLRE1C, KAT5, RNF168, and RTEL1. In some embodiments, at least one, at least two, or at least three of the genes are identified in a patient. In some embodiments, the patient has been previously identified to have at least one of the listed genes.

Drug Combinations

The inventive compounds described herein may be used in pharmaceutical compositions or methods in combination with one or more additional active ingredients in the treatment of the diseases and disorders described herein. Further additional active ingredients include other therapeutics or agents that mitigate adverse effects of therapies for the intended disease targets. Such combinations may serve to increase efficacy, ameliorate other disease symptoms, decrease one or more side effects, or decrease the required dose of an inventive compound. The additional active ingredients may be administered in a separate pharmaceutical composition from a compound of the present invention or may be included with a compound of the present invention in a single pharmaceutical composition. The additional active ingredients may be administered simultaneously with, prior to, or after administration of a compound of the present invention.

Combination agents include additional active ingredients are those that are known or discovered to be effective in treating the diseases and disorders described herein, including those active against another target associated with the disease. For example, compositions and formulations of the invention, as well as methods of treatment, can further comprise other drugs or pharmaceuticals, e.g., other active agents useful for treating or palliative for the target diseases or related symptoms or conditions. Additional such agents include, but are not limited to, BMN637 (PARP inhibitor), NU7441 (DNA-PK inhibitor), VE821 (ATR inhibitor) and MK1775 (WEE1 inhibitor), cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan. The pharmaceutical compositions of the invention may additionally comprise one or more of such active agents, and methods of treatment may additionally comprise administering an effective amount of one or more of such active agents.

In some embodiments, the disclosure provides a synergistic combination comprising a compound as described herein, or a pharmaceutically acceptable salt thereof, or a pharmaceutical composition as described herein, and at least one additional therapeutic agent. Additional such agents include, but are not limited to, BMN637 (PARP inhibitor), NU7441 (DNA-PK inhibitor), VE821 (ATR inhibitor) and MK1775 (WEE1 inhibitor), cisplatin, etoposide, busulfan, bendamustine, carboplatin, carmustine, chlorambucil, cyclophosphamide, dacarbazine, daunorubicin, decitabine, doxorubicin, epirubicin, etoposide, idarubicin, ifosfamide, paclitaxel, abraxane, pembrolizumab, nivolumab, olaparib, rucaparib, irinotecan, lomustine, mechlorethamine, melphalan, mitomycin C, mitoxantrone, oxaliplatin, temozolomide, and topotecan. The pharmaceutical compositions of the invention may additionally comprise one or more of such active agents, and methods of treatment may additionally comprise administering an effective amount of one or more of such active agents. In some embodiments, the additional therapeutic agent is BMN637 (PARP inhibitor), NU7441 (DNA-PK inhibitor), VE821 (ATR inhibitor), or MK1775 (WEE1 inhibitor).

Chemical Synthesis

Exemplary chemical entities useful in methods of the description will now be described by reference to illustrative synthetic schemes for their general preparation below and the specific examples that follow. Artisans will recognize that, to obtain the various compounds herein, starting materials may be suitably selected so that the µLtimately desired substituents will be carried through the reaction scheme with or without protection as appropriate to yield the desired product. Alternatively, it may be necessary or desirable to employ, in the place of the µLtimately desired substituent, a suitable group that may be carried through the reaction scheme and replaced as appropriate with the desired substituent. Furthermore, one of skill in the art will recognize that the transformations shown in the schemes below may be performed in any order that is compatible with the functionality of the particular pendant groups.

Abbreviations: DDR, DNA Damage Response; NER, Nucleotide Excision Repair; RPA, Replication Protein A; DBD, DNA Binding Domain; EMSA, Electrophoretic Mobility Shift Assay; SAR, Structure Activity Relationship; FID, Fluorescent Intercalator Displacement; DSF, Differential Scan Fluorimetry; Dox, Doxorubicin; Tm, Melting Temperature; NSCLC, Non-Small Cell Lung Cancer; EOC, Epithelial Ovarian Cancer; EAC, Esophageal Adenocarcinoma; TLC, CI, Combination Index; Thin-layer Chromatography; LC-MS, Liquid Chromatography-Mass Spectrometry; HRMS, High Resolution Mass Spectroscopy; HPLC, High Performance Liquid Chromatography; EtOH, Ethanol; DCM, Dichloromethane; EtOAc, Ethyl acetate; DMF, N,N-Dimethylformamide; DMSO, Dimethyl sulfoxide; THF, Tetrahydrofuran; $CHCl_3$, Chloroform; HOBt, Hydroxybenzotriazole; EDCI, 1-Ethyl-3-(3-(dimethylamino)propyl)-carbodiimide; DIPEA, Diisopropylethylamine; $NaHCO_3$, Sodium bicarbonate; $K_2CO_3$, Potassium carbonate; HCl, Hydrogen chloride.

General. All chemicals used for synthesis were purchased from Aldrich, Acros, Fisher Scientific and Combi-Blocks Chemical Co. (USA) and used without further purification. Anhydrous solvents were obtained from Fisher Scientific or Aldrich and used directly. All reactions involving air- or moisture-sensitive reagents were performed under a nitrogen atmosphere. $^1H$ NMR spectra were recorded at 300 MHz using Bruker AV NMR spectrometer. $^{13}C$ NMR spectra were recorded at 75 MHz using Bruker AV NMR spectrometer. The chemical shifts were reported as δ ppm relative to TMS, using the residual solvent peak as the reference unless otherwise noted. All coupling constants (J) are given in hertz. Data are reported as follows: chemical shift, multiplicity (s=singlet, d=doublet, t=triplet, q=quartet, p=pentet or quintet, brs=broad singlet, m=multiplet, dd=doublet of doublets, dt=doublet of triplets), number of protons and coupling constants. Thin layer chromatography was performed using Merck silica gel 60 F-254 thin layer plates, which were developed using one of the following techniques: UV fluorescence (254 nm), alkaline potassium permanganate solution (0.5% w/v) or ninhydrin (0.2% w/v) and iodine vapors. Automated flash column chromatography was carried out on prepacked silica cartridges using the indicated solvent system on Biotage Isolera chromatography system. Purities of all new compounds were determined by analytical HPLC coupled to electrospray ionization mass spectrometry (LC/ESI-MS) using the area percentage method on the UV trace recorded at a wavelength of 214 nm, and compounds were found to have ≥95% purity unless otherwise specified. LC-MS analyses and purity data of compounds were obtained using an Agilent 6545 Q-ToF LC/MS instrument connected to an Agilent 1200 HPLC system, and both instruments were connected to an Agilent photodiode array (PDA) UV detector. A C-18 reversed phase column (Agilent Zorbax EclipsePlus C18 RRHD, 1.8 µM particle size, 2.1 mm×50 mm) was used as stationary phase, and water and acetonitrile (both containing 0.1% formic acid) were used as mobile phase at room temperature. The HPLC gradient method utilized was 5-90% acetonitrile in water (both containing 0.1% formic acid) over 10 min with a 0.6 mL/min flow rate. UV absorbance at the fixed wavelength of 254 nm and positive and negative ESI-MS data were recorded. The retention time and corresponding ESI- MS data were used to identify molecules. HRMS data were obtained using Waters/Macromass LCT electrospray ionization (ESI) on a time-of-flight (TOF) mass spectrometer at the Mass Spectrometry Facility at Indiana University Chemistry Department (http://msf.chem.indiana.edu). A2780 cells are purchased from Sigma. All other cells (H460, SKGT-4 and GCT27) were available in our laboratory and routinely tested for *mycoplasma* contamination. Cells were maintained in RPMI media supplemented with 10% FBS (Atlanta Biological), penicillin and streptomycin. Cultures were incubated at 37° C. in 5% $CO_2$ and sub-cultured two to three times per week.

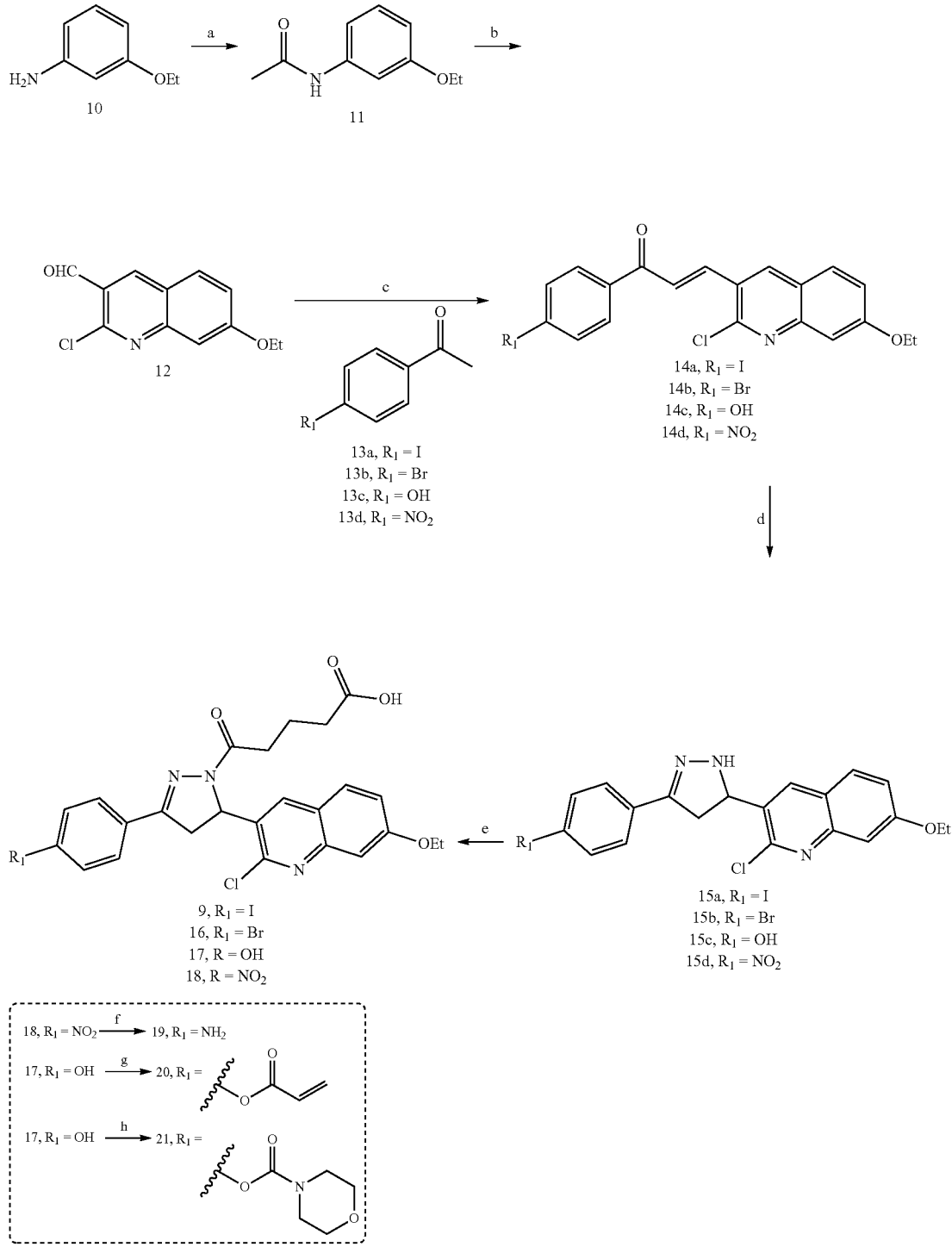

N-(3-Ethoxyphenyl)acetamide (11). To a stirred solution of 3-ethoxyaniline 10 (1 gm, 1 equiv.) in dry DCM (25 mL) were added DIPEA (1.89 mL, 1.5 equiv.), DMAP (89 mg, 0.1 equiv.) and acetic anhydride (0.69 mL, 1 equiv.) under an argon atmosphere. The reaction mixture was stirred for 2 h at room temperature. The solution was then diluted with more DCM (30 mL), the combined organic extracts were washed with water, brine, dried over $Na_2SO_4$ and concentrated under reduced pressure to obtain N-(3-ethoxyphenyl) acetamide 11 (1.15 gm, 88% yield, require no further purification) as an off-white solid. TLC: 50% EtOAc in hexanes, $R_f$=0.35; visualized with UV. $^1$H NMR (300 MHz, DMSO): δ 9.88 (s, 1H, NH), 7.27 (s, 1H), 7.16 (t, 1H, J=8.07 and 16.14 Hz), 7.07 (d, 1H, J=7.08 Hz), 6.59 (d, 1H, J=8.1 Hz), 3.99-3.92 (q, 2H, $OCH_2$), 2.02 (s, 3H, $COCH_3$), 1.31 (t, 3H, J=6.93 and 13.92 Hz, $CH_3$). MS (ESI) m/z=180.1 $[M+H]^+$.

2-Chloro-7-ethoxyquinoline-3-carbaldehyde (12). In a three-necked round flask equipped with condenser, $POCl_3$ (4 mL, 7 equiv.) was added drop wise at 0° C. to dry DMF (1.20 mL, 2.5 equiv.) under an argon atmosphere with vigorous stirring for 25 min. Then, N-(3-ethoxyphenyl)acetamide 11 (1.10 gm, 1 equiv.) was added portion wise at 0° C. The reaction mixture was warmed up to room temperature and allowed to stir at that temperature for 10 min until clear solution was obtained. After that the reaction mixture was heated at 110° C. for 3 h, and then cooled down to room temperature, poured onto stirring ice water (80 mL) and stirred yellow mixture for 15-20 min. The obtained solid was filtered off, washed with water 4-5 times (10 mL) to neutralize the reaction mixture, air dried and crystallized using 70% EtOAc in hexanes to afford 2-chloro-7-ethoxyquinoline-3-carbaldehyde 12 (1.07 gm, 74% yield, require no further purification) as a yellow solid. TLC: 20% EtOAc in hexanes, $R_f$=0.51; visualized with UV. $^1$H NMR (300 MHz, DMSO): δ 10.32 (s, 1H, CHO), 8.87 (s, 1H), 8.18 (d, 1H, J=8.97 Hz), 7.42 (s, 1H), 7.39 (d, 1H, J=8.94 Hz), 4.28-4.21 (q, 2H, $OCH_2$), 1.41 (t, 3H, J=6.96 and 13.95 Hz, $CH_3$); $^{13}$C NMR (75 MHz, DMSO): δ 189.64, 163.54, 151.53, 150.25, 141.03, 132.02, 124.52, 121.86, 121.63, 107.62, 64.69, 14.81. MS (ESI) m/z=236.1 $[M+H]^+$.

Synthesis of 14a-d: (E)-3-(2-Chloro-7-ethoxyquinolin-3-yl)-1-(4-iodophenyl)prop-2-en-1-one (14a). To a stirred solution of 4-iodoacetophenone 13a (0.36 gm, 1.0 equiv.) and 2-chloro-7-ethoxyquinoline-3-carbaldehyde 12 (0.35 gm, 1.0 equiv.) in 15 mL EtOH was added NaOH (0.83 mL, 2.5 M in water, 2.0 equiv.) drop wise at room temperature. The reaction mixture was stirred for 45 min at 45° C., then cooled down to room temperature and reaction mixture was quenched with HCl (3 M) to pH 2-3. The obtained solid was filtered off, washed with water 2-3 times (5 mL) and crystallized using EtOH to afford (E)-3-(2-chloro-7-ethoxyquinolin-3-yl)-1-(4-iodophenyl)prop-2-en-1-one 14a (0.51 gm, 74% yield) as a yellow solid and product was used for the next reaction without further purification. TLC: 30% EtOAc in hexanes, $R_f$=0.48; visualized with UV. $^1$H NMR (300 MHz, DMSO): δ 9.17 (s, 1H), 8.06 (d, 2H, J=2.1 Hz), 8.02-7.93 (m, 5H), 7.36 (s, 2H), 4.25-4.18 (q, 2H, $OCH_2$), 1.41 (t, 3H, J=6.9 and 13.89 Hz, $CH_3$). MS (ESI) m/z=464.1 $[M+H]^+$.

(E)-1-(4-Bromophenyl)-3-(2-chloro-7-ethoxyquinolin-3-yl)prop-2-en-1-one (14b). 14b was prepared by an above described procedure using 12 (0.35 gm, 1 equiv.) and 13b (0.29 gm, 1 equiv.) as starting materials. Brown solid, (433 mg, 70% yield). $^1$H NMR (300 MHz, DMSO): δ 9.21 (s, 1H), 8.15 (d, 2H, J=15.18 Hz), 8.11 (d, 2H, J=15.00 Hz), 7.99 (d, 1H, J=8.97 Hz), 7.85 (d, 2H, J=9.09 Hz), 7.40-7.36 (m, 2H), 4.27-4.21 (q, 2H, $OCH_2$), 1.42 (t, 3H, J=6.2 and 13.82 Hz, $CH_3$). MS (ESI) m/z=417.1 $[M+H]^+$.

(E)-3-(2-Chloro-7-ethoxyquinolin-3-yl)-1-(4-hydroxyphenyl)prop-2-en-1-one (14c). 14c was prepared by an above described procedure using 12 (0.35 gm, 1 equiv.) and 13c (0.20 gm, 1 equiv.) as starting materials. Yellow solid, (278 mg, 53% yield). $^1$H NMR (300 MHz, DMSO): δ 10.54 (s, 1H, OH), 9.13 (s, 1H), 8.12-7.90 (m, 5H), 7.34-7.29 (m, 2H), 6.94 (d, 2H, J=8.76 Hz), 4.24-4.17 (q, 2H, $OCH_2$), 1.40 (t, 3H, J=6.93 and 13.95 Hz, $CH_3$); $^{13}$C NMR (125 MHz, DMSO): δ 186.46, 162.51, 161.45, 150.04, 149.24, 136.92, 136.71, 131.30, 129.75, 128.77, 125.02, 124.40, 122.04, 120.83, 115.47, 107.00, 63.90, 14.36. MS (ESI) m/z=355.1 $[M+H]^+$.

(E)-3-(2-Chloro-7-ethoxyquinolin-3-yl)-1-(4-nitrophenyl)prop-2-en-1-one (14d). 14d was prepared by an above described procedure using 12 (0.35 gm, 1 equiv.) and 13d (0.25 gm, 1 equiv.) as starting materials. Red solid, (346 mg, 61% yield). $^1$H NMR (300 MHz, DMSO): δ 9.16 (s, 1H), 8.16-8.11 (m, 3H), 8.04 (d, 1H, J=14.5 Hz), 7.84 (d, 1H, J=8.96 Hz), 7.51 (dd, 1H, J=2.74 and 8.91 Hz), 7.47-7.42 (m, 3H), 4.26-4.19 (q, 2H, $OCH_2$), 1.41 (t, 3H, J=6.91 and 13.90 Hz, $CH_3$). MS (ESI) m/z=384.1 $[M+H]^+$.

Synthesis of 15a-d: 2-Chloro-7-ethoxy-3-(3-(4-iodophenyl)-4,5-dihydro-1H-pyrazol-5-yl)quinoline (15a). To a stirred suspension of 3-(2-chloro-7-ethoxyquinolin-3-yl)-1-(4-iodophenyl) prop-2-en-1-one 14a (500 mg, 1 equiv.) in ethanol (15 mL) was added hydrazine monohydrate (0.52 mL, 10 equiv.) dropwise. The reaction mixture was refluxed for 2 h, after which it was allowed to cool to room temperature. The obtained solid was filtered and washed with EtOH (2 times). Further purification by trituration with EtOH furnished the 2-chloro-7-ethoxy-3-(3-(4-iodophenyl)-4,5-dihydro-1H-pyrazol-5-yl)quinoline 15a (427 mg, 83% yield) as a light yellow solid. $^1$H NMR (300 MHz, DMSO): 8.41 (s, 1H), 7.98 (d, 1H, J=9.03 Hz), 7.74 (d, 2H, J=8.52 Hz), 7.44 (d, 2H, J=8.49 Hz), 7.33 (s, 1H), 7.28 (dd, 1H, J=2.46 and 8.94 Hz), 5.21 (t, 1H, J=10.32 and 20.73 Hz), 4.21-4.14 (q, 2H, $OCH_2$), 3.70-3.61 (dd, 1H), 2.92-2.83 (dd, 1H), 1.41 (t, 3H, J=6.93 and 13.89 Hz, $CH_3$). MS (ESI) m/z=479.1 $[M+H]^+$.

3-(3-(4-Bromophenyl)-4,5-dihydro-1H-pyrazol-5-yl)-2-chloro-7-ethoxyquinoline (15b). 15b was prepared by an above described procedure using 14b (350 mg, 1 equiv.) as a starting material. Light brown solid, (278 mg, 77% yield). $^1$H NMR (500 MHz, DMSO): δ 8.42 (s, 1H), 7.98 (d, 1H, J=8.64 Hz), 7.85 (d, 1H, J=3.3 Hz), 7.61-7.56 (m, 4H), 7.35 (d, 1H, J=2.34 Hz), 7.29-7.25 (dd, 1H, J=2.36 and 8.9 Hz), 5.22 (t, 1H, J=10.32 and 19.87 Hz), 4.21-4.16 (q, 2H, $OCH_2$), 3.71-3.63 (dd, 1H), 2.93-2.88 (dd, 1H), 1.42 (t, 3H, J=6.9 and 13.87 Hz, $CH_3$). MS (ESI) m/z=430.1 $[M+H]^+$.

4-(5-(2-Chloro-7-ethoxyquinolin-3-yl)-4,5-dihydro-1H-pyrazol-3-yl)phenol (15c). 15c was prepared by an above described procedure using 14c (250 mg, 1 equiv.) as a starting material. Yellow solid, (182 mg, 70% yield). $^1$H NMR (500 MHz, DMSO): δ 9.66 (s, 1H), 8.44 (s, 1H), 7.97 (d, 1H, J=9 Hz), 7.49-7.42 (m, 2H), 7.34 (s, 1H), 7.27 (dd, 1H, J=2.5 and 8.95 Hz), 6.77 (d, 2H, J=8.7 Hz), 5.12 (t, 1H, J=10.35 and 20.7 Hz), 4.21-4.17 (q, 2H, $OCH_2$), 3.65-3.59 (dd, 1H), 2.85-2.79 (dd, 1H), 1.42 (t, 3H, J=6.95 and 13.95 Hz, $CH_3$). MS (ESI) m/z=369.1 $[M+H]^+$.

2-Chloro-7-ethoxy-3-(3-(4-nitrophenyl)-4,5-dihydro-1H-pyrazol-5-yl)quinoline (15d). 15d was prepared by an above described procedure using 14d (300 mg, 1 equiv.) as a starting material. Brown solid, (227 mg, 73% yield). $^1$H NMR (300 MHz, DMSO): δ 8.38-8.36 (m, 2H), 8.23 (d, 2H, J=8.88 Hz), 7.98 (d, 1H, J=9 Hz), 7.86 (d, 2H, J=8.85 Hz), 7.34 (s, 1H), 7.28 (dd, 1H, J=2.34 and 8.88 Hz), 5.33 (t, 1H, J=11.52 and 21.03 Hz), 4.21-4.14 (q, 2H, OCH$_2$), 3.78-3.69 (dd, 1H), 3.04-2.95 (dd, 1H), 1.41 (t, 3H, J=6.9 and 13.83 Hz, CH$_3$); $^{13}$C NMR (125 MHz, DMSO): δ 160.32, 149.98, 148.16, 146.31, 145.90, 139.40, 135.97, 131.33, 129.21, 126.07, 123.84, 122.04, 120.18, 106.69, 63.65, 60.65, 14.40. MS (ESI) m/z=398.1 [M+H]$^+$.

Synthesis of compound 9, 16-18: 5-(5-(2-Chloro-7-ethoxyquinolin-3-yl)-3-(4-iodophenyl)-4,5-dihydro-1H-pyrazol-1-yl)-5-oxopentanoic acid (9/TDRL-551). To a stirred suspension of 2-chloro-7-ethoxy-3-(3-(4-iodophenyl)-4,5-dihydro-1H-pyrazol-5-yl)quinoline 15a (410 mg, 1.0 equiv.) in CHCl$_3$ (15 mL) was added glutaric anhydride (107 mg, 1.1 equiv.) under an argon atmosphere through the condenser in one portion. The resulting solution was refluxed for 2 h with stirring, after which it was allowed to cool to room temperature. The obtained solid was filtered and washed with EtOAc and further purification by trituration and crystallization with EtOAc yielded 5-(5-(2-chloro-7-ethoxyquinolin-3-yl)-3-(4-iodophenyl)-4,5-dihydro-1H-pyrazol-1-yl)-5-oxopentanoic acid 9 (360 mg, 71% yield) as an off-white solid. TLC: 75% EtOAc in hexanes, R$_f$=0.51; visualized with UV. $^1$H NMR (300 MHz, DMSO): δ 12.10 (brs, 1H, COOH), 7.98 (s, 1H), 7.93 (d, 1H, J=9.06 Hz), 7.85 (d, 2H, J=8.52 Hz), 7.58 (d, 2H, J=8.49 Hz), 7.34 (d, 1H, J=2.4 Hz), 7.27 (dd, 1H, J=2.49 and 8.97 Hz), 5-84-5.79 (dt, 1H, J=3.39 and 11.91 Hz), 4.21-4.14 (q, 2H, OCH$_2$), 3.97 (dd, 1H, J=12.15 and 18.12 Hz), 3.28 (dd, 1H, J=5.01 and 12.75 Hz), 2.96-2.71 (m, 2H, CH$_2$), 2.32 (t, 2H, J=7.35 and 14.58 Hz, CH$_2$), 1.86-1.76 (p, 2H, CH$_2$), 1.41 (t, 3H, J=6.93 and 13.89 Hz, CH$_3$); $^{13}$C NMR (75 MHz, DMSO): δ 174.71, 170.38, 160.83, 154.27, 148.63, 138.05, 130.91, 130.44, 129.62, 129.02, 122.53, 120.71, 107.09, 97.88, 64.15, 57.88, 33.40, 33.03, 20.24, 14.87. MS (ESI) m/z=614.1 [M+Na]$^+$; HRMS (ESI): calcd for C$_{25}$H$_{22}$N$_3$O$_4$ICl [M+H]$^+$ m/z=592.0500, found 592.0503. HPLC purity: 98.36% (R$_t$=6.29 min).

5-(3-(4-Bromophenyl)-5-(2-chloro-7-ethoxyquinolin-3-yl)-4,5-dihydro-1H-pyrazol-1-yl)-5-oxopentanoic acid (16). Compound 16 was prepared by an above described procedure using 15b (150 mg, 1 equiv.) as a starting material. Yellow solid, (132 mg, 70% yield). $^1$H NMR (300 MHz, DMSO): δ 12.10 (brs, 1H, COOH), 7.98 (s, 1H), 7.93 (d, 1H, J=9.06 Hz), 7.76-7.65 (m, 4H), 7.34 (d, 1H, J=2.37 Hz), 7.27-7.23 (dd, 1H, J=2.46 and 8.97 Hz), 5-85-5.79 (dt, 1H, J=5.22 and 11.97 Hz), 4.21-4.14 (q, 2H, OCH$_2$), 4.02 (dd, 1H, J=12.09 and 18.09 Hz), 3.30 (dd, 1H, J=12.84 and 18.06 Hz), 2.96-2.72 (m, 2H, CH$_2$), 2.32 (t, 2H, J=7.29 and 14.52 Hz, CH$_2$), 1.89-1.77 (p, 2H, CH$_2$), 1.41 (t, 3H, J=6.93 and 13.89 Hz, CH$_3$). $^{13}$C NMR (125 MHz, CDCl$_3$): δ 174.71, 170.41, 160.83, 154.08, 148.64, 135.38, 132.24, 130.66, 130.44, 129.64, 129.16, 124.25, 122.54, 120.72, 107.10, 64.15, 57.92, 33.40, 33.03, 20.24, 14.87. MS (ESI) m/z=542.1 [M–H]$^-$; HRMS (ESI): calcd for C$_{25}$H$_{22}$N$_3$O$_4$BrCl [M–H]$^-$ m/z=542.0482, found 542.0479. HPLC purity: 98.03%.

5-(5-(2-Chloro-7-ethoxyquinolin-3-yl)-3-(4-hydroxyphenyl)-4,5-dihydro-1H-pyrazol-1-yl)-5-oxopentanoic acid (17). Compound 17 was prepared by an above described procedure using 15c (170 mg, 1 equiv.) as a starting material. Yellow solid, (142 mg, 64% yield). $^1$H NMR (300 MHz, DMSO): δ 12.10 (brs, 1H, COOH), 10.0 (brs, 1H, OH), 7.93 (s, 1H), 7.90 (d, 1H, J=9.02 Hz), 7.63 (d, 2H, J=8.7 Hz), 7.33 (d, 1H, J=2.37 Hz), 7.26 (dd, 1H, J=2.46 and 8.94 Hz), 6.83 (d, 2H, J=8.76 Hz), 5-80-5.74 (dt, 1H, J=4.89 and 11.73 Hz), 4.20-4.14 (q, 2H, OCH$_2$), 3.96 (dd, 1H, J=11.94 and 17.91 Hz), 3.24 (dd, 1H, J=5.07 and 17.94 Hz), 2.92-2.76 (m, 2H, CH$_2$), 2.32 (t, 2H, J=7.35 and 14.58 Hz, CH$_2$), 1.85-1.80 (p, 2H, CH$_2$), 1.41 (t, 3H, J=6.93 and 13.89 Hz, CH$_3$). MS (ESI) m/z=480.1 [M–H]$^-$; HRMS (ESI): calcd for C$_{25}$H$_{23}$N$_3$O$_5$Cl [M–H]$^-$ m/z=480.1326, found 480.1321. HPLC purity: 97.24%.

5-(5-(2-Chloro-7-ethoxyquinolin-3-yl)-3-(4-nitrophenyl)-4,5-dihydro-1H-pyrazol-1-yl)-5-oxopentanoic acid (18): Compound 18 was prepared by an above described procedure using 15d (210 mg, 1 equiv.) as a starting material. Red solid, (157 mg, 58% yield). $^1$H NMR (500 MHz, CDCl$_3$): δ 12.14 (brs, 1H, COOH), 8.37 (d, 2H, J=6.5 Hz), 7.91 (d, 2H, J=7 Hz), 7.72 (s, 1H), 7.65 (d, 1H, J=9 Hz), 7.31 (s, 1H), 7.19 (dd, 1H, J=2.5 and 11.5 Hz), 5-96-5.92 (dt, 1H, J=5 and 12 Hz), 4.09-4.05 (q, 2H, OCH$_2$), 3.92 (dd, 1H, J=12 and 17.5 Hz), 3.20 (dd, 1H, J=5 and 18 Hz), 2.93-2.87 (m, 2H, CH$_2$), 2.39 (t, 2H, J=7.5 and 14.6 Hz, CH$_2$), 1.90-1.87 (p, 2H, CH$_2$), 1.40 (t, 3H, J=6.95 and 13.84 Hz, CH$_3$); $^{13}$C NMR (125 MHz, CDCl$_3$): δ 173.44, 172.24, 161.06, 151.98, 149.09, 148.36, 137.01, 128.80 128.59, 127.36, 124.06, 122.16, 120.99, 106.92, 63.92, 60.31, 33.56, 33.20, 20.37, 14.46. MS (ESI) m/z=510.1 [M–H]$^-$; HRMS (ESI): calcd for C$_{25}$H$_{24}$N$_4$O$_6$Cl [M+2H]$^+$ m/z=511.1384, found 511.1389. HPLC purity: 95.07%.

5-(3-(4-Aminophenyl)-5-(2-chloro-7-ethoxyquinolin-3-yl)-4,5-dihydro-1H-pyrazol-1-yl)-5-oxopentanoic acid (19). To a solution of 18 (120 mg, 1 equiv.) in the mixture of THF:EtOH (1:1, 8 mL) were added 89 mg SnCl$_2$ (2 equiv.) and the resulting suspension was gently refluxed for 2 hr. After cooling, the reaction mixture was diluted with ice, made slightly alkaline with 5% NaHCO$_3$, precipitate was filtered and washed with DCM and water. The filtrate was concentrated under reduced pressure and then residue was acidified with 20% citric acid. The precipitate was extracted with dichloromethane (3×30 mL); the combined organic fractions were washed with brine, dried over anhydrous Na$_2$SO$_4$, and concentrated under reduced pressure to obtain crude product. The crude product was crystallized in 2% ethanol in EtOAc mixture and triturated with 70% EtOAc in hexanes to afford 5-(3-(4-aminophenyl)-5-(2-chloro-7-ethoxyquinolin-3-yl)-4,5-dihydro-1H-pyrazol-1-yl)-5-oxopentanoic acid 19 (54 mg, 48% yield) as a red solid. $^1$H NMR (300 MHz, DMSO): δ 12.11 (brs, 1H, COOH), 7.89 (s, 1H), 7.87 (d, 1H, J=9 Hz), 7.61 (d, 2H, J=8.5 Hz), 7.31 (d, 1H, J=2.41 Hz), 7.28 (dd, 1H, J=2.45 and 8.91 Hz), 6.83 (d, 2H, J=8.76 Hz), 5-79-5.73 (dt, 1H, J=4.87 and 11.73 Hz), 4.21-4.13 (q, 2H, OCH$_2$), 3.93 (dd, 1H), 3.27 (dd, 1H, J=5 and 17.96 Hz), 2.90-2.79 (m, 2H, CH$_2$), 2.35 (t, 2H, J=7.3 and 14.5 Hz, CH$_2$), 1.82-1.76 (p, 2H, CH$_2$), 1.40 (t, 3H, J=6.91 and 13.85 Hz, CH$_3$). MS (ESI) m/z=479.1 [M–H]$^-$; HRMS (ESI): calcd for C$_{25}$H$_{24}$N$_4$O$_4$Cl [M–H]$^-$ m/z=479.1486, found 479.1483. HPLC purity: 95.63% (R$_t$=4.39 min).

5-(3-(4-(Acryloyloxy)phenyl)-5-(2-chloro-7-ethoxyquinolin-3-yl)-4,5-dihydro-1H-pyrazol-1-yl)-5-oxopentanoic acid (20). To a stirred suspension of 17 (60 mg, 1 equiv.) in THF (5 mL) was added 2N NaOH (0.5 mL). The reaction mixture was stirred at 0° C. for 15 min then acryloyl chloride (13 mg, 1.1 equiv.) was added in one portion. The reaction mixture was stirred for further 2 h at room temperature. Solvent was removed in vacuo and residue was acidified to pH 2-3 using 20% citric acid solution. The product was extracted with EtOAc (3×15 mL). The combined organic extracts were washed with brine, dried over $Na_2SO_4$ and concentrated under reduced pressure. The crude product was purified by Biotage automated flash column chromatography using 1-5% MeOH in DCM as the eluent to furnish 5-(3-(4-(acryloyloxy)phenyl)-5-(2-chloro-7-ethoxyquinolin-3-yl)-4,5-dihydro-1H-pyrazol-1-yl)-5-oxopentanoic acid 20 (22 mg, 34% yield) as a white solid. TLC: 5% MeOH in DCM, $R_f$=0.44; visualized with UV. $^1$H NMR (300 MHz, $CDCl_3$): δ 7.78 (d, 2H, J=7.35 Hz), 7.70 (s, 1H), 7.64 (d, 1H, J=8.76 Hz), 7.29 (d, 2H, J=8.7 Hz), 7.20 (d, 2H, J=8.07 Hz), 6.64 (d, 1H, J=16.83 Hz), 6.35 (t, 1H, J=10.29 and 27.21 Hz), 6.05-5.96 (m, 2H), 4.20-4.12 (q, 2H, $OCH_2$), 3.96 (dd, 1H, J=11.82 and 16.89 Hz), 3.17-2.94 (m, 3H), 2.65-2.52 (m, 2H, $CH_2$), 2.15-2.07 (p, 2H, $CH_2$), 1.46 (t, 3H, J=6.95 and 13.80 Hz, $CH_3$); $^{13}$C NMR (125 MHz, $CDCl_3$): δ 177.80, 170.82, 170.48, 169.10, 164.15, 160.93, 153.75, 152.31, 148.97, 148.52, 134.31, 133.23, 129.23, 128.64, 127.97, 127.56, 122.23, 122.07, 120.86, 106.83, 63.86, 57.79, 41.43, 33.07, 19.89, 14.58. MS (ESI) m/z=535.1 [M–H]$^-$; HRMS (ESI): calcd for $C_{28}H_{26}N_3O_6ClNa$ [M+Na]$^+$ m/z=558.1408, found 558.1407. HPLC purity: 99.21% ($R_t$=4.74 min).

5-(5-(2-Chloro-7-ethoxyquinolin-3-yl)-3-(4-((morpholine-4-carbonyl)oxy)phenyl)-4,5-dihydro-1H-pyrazol-1-yl)-5-oxopentanoic acid (21). To a stirred suspension of 17 (60 mg, 1 equiv.) in dry THF (5 mL) were added trimethylamine/TEA (34 uL, 2 equiv.) and DMAP (3 mg, 0.2 equiv.) under an argon atmosphere and reaction mixture was stirred for 15 min at 0° C. then 4-morpholinecarbonyl chloride (20 mg, 1.1 equiv.) was added. The reaction mixture was stirred for further 12 h at room temperature. Solvent was removed in vacuo and residue was acidified to pH 2-3 using 20% citric acid solution. The product was extracted with EtOAc (3×15 mL). The combined organic extracts were washed with brine, dried over $Na_2SO_4$ and concentrated under reduced pressure. The obtained solid was washed with EtOAc and further purification by trituration and crystallization with EtOAc yielded 5-(5-(2-chloro-7-ethoxyquinolin-3-yl)-3-(4-((morpholine-4-carbonyl)oxy)phenyl)-4,5-dihydro-1H-pyrazol-1-yl)-5-oxopentanoic acid 21 (46 mg, 63% yield) as a white solid. TLC: 5% MeOH in EtOAc, $R_f$=0.41; visualized with UV. $^1$H NMR (300 MHz, $CDCl_3$): δ 8.00 (s, 1H), 7.94 (d, 1H, J=9.09 Hz), 7.82 (d, 2H, J=8.79 Hz), 7.34 (d, 1H, J=2.4 Hz), 7.27 (d, 1H, J=8.94 Hz), 7.26 (d, 2H, J=8.79 Hz), 5-85-5.80 (dt, 1H, J=5.79 and 11.91 Hz), 4.21-4.15 (q, 2H, $OCH_2$), 3.97 (dd, 1H, J=12.11 and 18.10 Hz), 3.53-3.46 (m, 4H), 3.44-3.37 (m, 4H), 3.27 (dd, 1H, J=5.1 and 17.94 Hz), 2.96-2.79 (m, 2H, $CH_2$), 2.37 (m, 2H, $CH_2$), 1.87-1.78 (p, 2H, $CH_2$), 1.40 (t, 3H, J=6.12 and 13.89 Hz, $CH_3$). $^{13}$C NMR (75 MHz, $CDCl_3$): δ 170.99, 170.51, 160.82, 154.25, 153.09, 148.67, 130.60, 129.64, 128.51, 122.72, 122.56, 120.69, 107.09, 66.53, 66.20, 64.15, 57.81, 45.77, 43.12, 33.26, 32.02, 20.40, 14.87. MS (ESI) m/z=594.1 [M–H]$^-$; HRMS (ESI): calcd for $C_{30}H_{32}N_4O_7Cl$ [M+H]$^+$ m/z=595.1960, found 595.1958. HPLC purity: 96.71% ($R_t$=4.92 min).

Synthesis of Target Compounds 22-25:

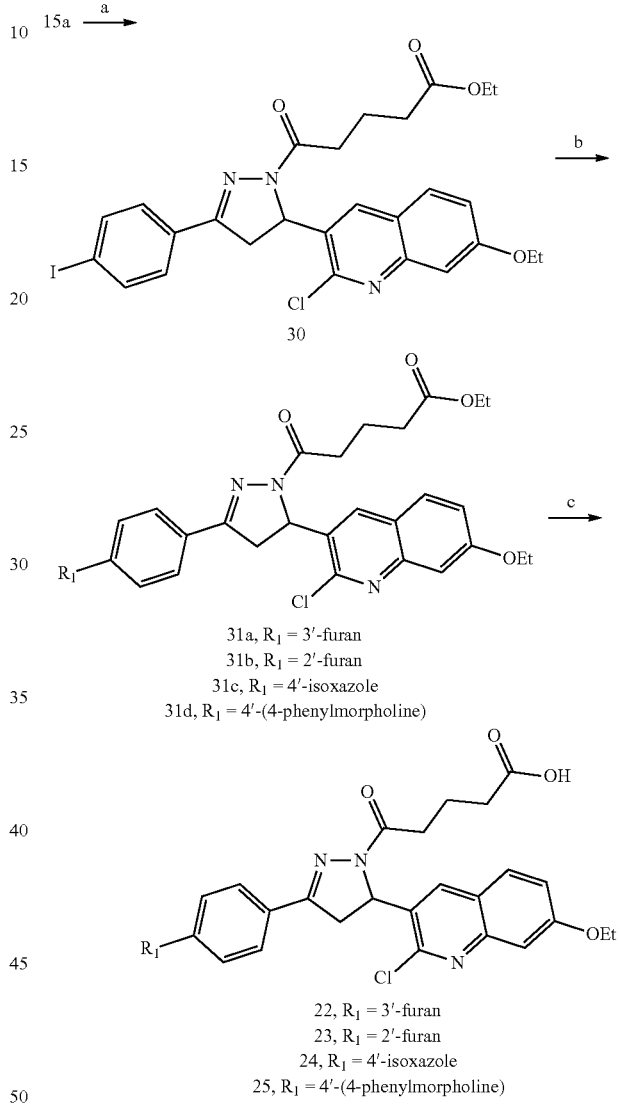

Scheme 2

Step 1.

Synthesis of ethyl 5-(5-(2-chloro-7-ethoxyquinolin-3-yl)-3-(4-iodophenyl)-4,5-dihydro-1H-pyrazol-1-yl)-5-oxopentanoate (30). To a stirred suspension of 15a (600 mg, 1 equiv.) in dry DCM (25 mL) was added DIPEA (0.54 mL, 2.5 equiv.). The reaction mixture was stirred for 15 min at room temperature and then ethyl glutaryl chloride (0.30 mL, 1.5 equiv.) was added dropwise. The reaction mixture was stirred for further 12 h at room temperature. The reaction mixture was diluted with water and product was extracted with DCM (3×15 mL). The combined organic extracts were washed with saturated $NaHCO_3$, brine, dried over $Na_2SO_4$ and concentrated under reduced pressure. The crude product was purified by Biotage automated flash column chromatography using 5-40% EtOAc in hexanes as the eluent to furnish ethyl 5-(5-(2-chloro-7-ethoxyquinolin-3-yl)-3-(4-iodophenyl)-4,5-dihydro-1H-pyrazol-1-yl)-5-oxopentanoate 30 (607 mg, 78% yield) as a white solid. TLC: 40% EtOAc in hexanes, $R_f$=0.51; visualized with UV. $^1$H NMR (300 MHz, DMSO): δ 7.98 (s, 1H), 7.93 (d, 1H, J=9.03 Hz), 7.85 (d, 2H, J=8.52 Hz), 7.57 (d, 2H, J=8.52 Hz), 7.34 (d, 1H, J=2.43 Hz), 7.27 (dd, 1H, J=2.49 and 8.97 Hz), 5-84-5.79 (dt, 1H, J=3.54 and 12 Hz), 4.21-4.14 (q, 2H, OCH$_2$), 4.08-4.01 (q, 2H, OCH$_2$), 3.96 (dd, 1H, J=12.10 and 17.97 Hz), 3.30 (dd, 1H, J=5.61 and 18.27 Hz), 2.96-2.76 (m, 2H, CH$_2$), 2.36 (t, 2H, J=7.41 and 14.76 Hz, CH$_2$), 1.89-1.79 (p, 2H, CH$_2$), 1.41 (t, 3H, J=6.93 and 13.92 Hz, CH$_3$), 1.17 (t, 3H, J=7.08 and 10.83 Hz, CH$_3$); $^{13}$C NMR (75 MHz, DMSO): δ 173.12, 170.28, 160.84, 154.34, 148.63, 138.07, 130.89, 130.43, 129.62, 129.02, 122.53, 120.73, 107.09, 97.92, 64.16, 60.25, 57.92, 33.26, 32.87, 20.25, 14.87, 14.58. MS (ESI) m/z=621.1 [M+H]$^+$; HRMS (ESI): calcd for C$_{27}$H$_{28}$N$_3$O$_4$ICl [M+H]$^+$ m/z=620.0813, found 620.0814. HPLC purity: 99.08%.

Step 2. Synthesis of 31a-d:

Synthesis of ethyl 5-(5-(2-chloro-7-ethoxyquinolin-3-yl)-3-(4-(furan-3-yl)phenyl)-4,5-dihydro-1H-pyrazol-1-yl)-5-oxopentanoate (31a). To a stirred suspension of 30 (100 mg, 1 equiv.) and 3-furan boronic acid (24 mg, 1.3 equiv.) in dimethoxyethane/DME (8 mL) was added CsF (98 mg, 4 equiv.). The reaction mixture was degassed with argon for 5 minute and then Pd(PPh$_3$)$_4$ (19 mg, 0.1 equiv.) was added. The reaction mixture was stirred for 18 h at 90° C. The reaction mixture was cooled to room temperature, precipitated reaction mixture was extracted with dichloromethane (3×20 mL); the combined organic fractions were washed with saturated NaHCO$_3$, brine, dried over anhydrous Na$_2$SO$_4$, and concentrated under reduced pressure. The crude product was purified by Biotage automated flash column chromatography using 5-40% EtOAc in hexanes as the eluent to furnish ethyl 5-(5-(2-chloro-7-ethoxyquinolin-3-yl)-3-(4-(furan-3-yl)phenyl)-4,5-dihydro-1H-pyrazol-1-yl)-5-oxopentanoate 31a (58 mg, 64% yield) as a yellow solid. TLC: 40% EtOAc in hexanes, $R_f$=0.47; visualized with UV. $^1$H NMR (300 MHz, CDCl$_3$): δ 7.80 (d, 2H, J=11.97 Hz), 7.74 (d, 2H, J=2.07 Hz), 7.66 (d, 1H, J=9 Hz), 7-54-7.49 (m, 3H), 7.30 (d, 1H, J=2.28 Hz), 7.18 (dd, 1H, J=2.43 and 8.97 Hz), 6.73 (s, 1H), 6.00-5.95 (dt, 1H, J=4.86 and 11.79 Hz), 4.20-4.09 (m, 4H, 2OCH$_2$), 3.98 (dd, 1H, J=11.82 and 17.97 Hz), 3.21 (dd, 1H, J=4.95 and 17.76 Hz), 3.10-2.89 (m, 2H, CH$_2$), 2.48 (t, 2H, J=7.26 and 14.61 Hz, CH$_2$), 2.16-2.07 (p, 2H, CH$_2$), 1.47 (t, 3H, J=6.96 and 13.92 Hz, CH$_3$), 1.22 (t, 3H, J=7.10 and 10.85 Hz, CH$_3$); $^{13}$C NMR (75 MHz, CDCl$_3$): δ 173.33, 170.75, 160.86, 153.99, 148.96, 148.61, 144.04, 139.19, 134.68, 129.48, 129.43, 128.62, 127.19, 125.98, 125.69, 122.26, 120.78, 108.56, 106.84, 63.84, 60.40, 57.65, 41.32, 33.69, 33.16, 20.22, 14.58, 14.29. MS (ESI) m/z=561.1 [M+H]$^+$; HRMS (ESI): calcd for C$_{31}$H$_{31}$N$_3$O$_5$Cl [M+H]$^+$ m/z=560.1952, found 560.1934.

Compounds 31b-d were synthesized using an appropriate boronic acid/ester by an above Suzuki coupling synthetic procedure described for the preparation of compound 31a. Each compound was purified by Biotage automated flash column chromatography using 5-50% EtOAc in hexanes (31b) or 0-7% MeOH in DCM (31c-d) as the eluent to afford desired compound.

Ethyl 5-(5-(2-chloro-7-ethoxyquinolin-3-yl)-3-(4-(furan-2-yl)phenyl)-4,5-dihydro-1H-pyrazol-1-yl)-5-oxopentanoate (31b). Yellow solid (57 mg, 63% yield). TLC: 50% EtOAc in hexanes, $R_f$=0.52; visualized with UV. $^1$H NMR (300 MHz, CDCl$_3$): δ 7.85 (d, 1H, J=8.43 Hz), 7.78-7.62 (m, 5H), 7.54-7.36 (m, 3H), 7.30 (t, 1H, J=2.49 and 5.07 Hz), 7.19 (dd, 1H, J=2.22 and 8.97 Hz), 6-03-5.94 (m, 1H), 4.20-4.10 (m, 4H, 2OCH$_2$), 4.01-3.83 (m, 1H), 3.24-2.86 (m, 3H), 2.51-2.42 (m, 2H, CH$_2$), 2.17-2.05 (p, 2H, CH$_2$), 1.49 (t, 3H, J=6.93 and 13.92 Hz, CH$_3$), 1.27 (t, 3H, J=7.17 and 10.95 Hz, CH$_3$); $^{13}$C NMR (75 MHz, CDCl$_3$): δ 173.32, 173.22, 170.82, 160.91, 153.78, 148.99, 148.49, 141.98, 135.31, 130.64, 129.16, 128.33, 127.91, 127.33, 122.25, 120.83, 106.85, 63.86, 60.41, 57.79, 41.34, 33.69, 33.19, 20.21, 14.59, 14.30. MS (ESI) m/z=561.1 [M+H]$^+$; HRMS (ESI): calcd for C$_{31}$H$_{32}$N$_3$O$_5$Cl [M+2H]$^+$ m/z=561.2030, found 561.2039.

Ethyl 5-(5-(2-chloro-7-ethoxyquinolin-3-yl)-3-(4-(isoxazol-4-yl)phenyl)-4,5-dihydro-1H-pyrazol-1-yl)-5-oxopentanoate (31c). Light brown solid (59 mg, 65% yield). TLC: 5% MeOH in DCM, $R_f$=0.43; visualized with UV. MS (ESI) m/z=562.1 [M+H]$^+$; HRMS (ESI): calcd for C$_{30}$H$_{30}$N$_4$O$_5$Cl [M+H]$^+$ m/z=561.1905, found 561.1908.

Ethyl 5-(5-(2-chloro-7-ethoxyquinolin-3-yl)-3-(4'-morpholino-[1,1'-biphenyl]-4-yl)-4,5-dihydro-1H-pyrazol-1-yl)-5-oxopentanoate (31d). Yellow solid (73 mg, 69% yield). TLC: 5% MeOH in DCM, $R_f$=0.41; visualized with UV. MS (ESI) m/z=578.1 [M+Na]$^+$; HRMS (ESI): calcd for C$_{37}$H$_{40}$N$_4$O$_5$Cl [M+H]$^+$ m/z=655.2687, found 655.2683.

Step 3. Synthesis of Target Compounds 22-25:

Synthesis of 5-(5-(2-chloro-7-ethoxyquinolin-3-yl)-3-(4-(furan-3-yl)phenyl)-4,5-dihydro-1H-pyrazol-1-yl)-5-oxopentanoic acid (22). To a stirred solution of compound 31a (50 mg) in THF:MeOH (1:2, v/v, 6 mL) was added ION NaOH (0.4 mL) solution. The reaction mixture was stirred at room temperature for 6-8 h. Solvent was removed in vacuo and residue was acidified to pH 2-3 using 1N HCl solution. The product was extracted with EtOAc (3×15 mL). The combined organic extracts were washed with brine, dried over Na$_2$SO$_4$ and concentrated under reduced pressure. The product was triturated with 70% EtOAc in hexanes and crystallized in 2% EtOH in EtOAc to afford 5-(5-(2-chloro-7-ethoxyquinolin-3-yl)-3-(4-(furan-3-yl)phenyl)-4,5-dihydro-1H-pyrazol-1-yl)-5-oxopentanoic acid 22 (41 mg, 87% yield) as a yellow solid. $^1$H NMR (300 MHz, DMSO): δ 12.11 (brs, 1H, COOH), 8.30 (s, 1H), 7.98 (s, 1H), 7.94 (d, 1H, J=9.06 Hz), 7.82-7.69 (m, 5H), 7.34 (s, 1H), 7.27 (dd, 1H, J=2.31 and 8.97 Hz), 7.03 (s, 1H), 5.85-5.80 (dt, 1H, J=4.98 and 11.79 Hz), 4.21-4.14 (m, 2H, 2OCH$_2$), 4.01 (dd, 1H, J=12.09 and 18.27 Hz), 3.30 (dd, 2H, J=4.92 and 17.72 Hz), 2.98-2.78 (m, 2H, CH$_2$), 2.32 (t, 2H, J=7.23 and 14.47 Hz, CH$_2$), 1.89-1.80 (p, 2H, CH$_2$), 1.49 (t, 3H, J=6.84 and 13.77 Hz, CH$_3$); $^{13}$C NMR (75 MHz, CDCl$_3$): δ 174.74, 170.28, 160.81, 154.65, 148.63, 145.05, 140.70, 134.37, 130.61, 129.80, 129.64, 127.76, 126.12, 125.66, 122.55, 120.72, 109.02, 107.09, 64.15, 57.71, 33.43, 33.04, 20.29, 14.88. MS (ESI) m/z=532.1 [M+H]$^+$; HRMS (ESI): calcd for C$_{29}$H$_{27}$N$_3$O$_5$Cl [M+H]$^+$ m/z=532.1639, found 532.1638. HPLC purity: 98.56% ($R_t$=5.98 min).

Compounds 23-25 were synthesized using an above ester hydrolysis synthetic procedure described for the preparation of compound 22. Each compound was purified by trituration with 70% EtOAc in hexanes and crystallized in 2% EtOH in EtOAc to afford desired compound.

5-(5-(2-Chloro-7-ethoxyquinolin-3-yl)-3-(4-(furan-2-yl)phenyl)-4,5-dihydro-1H-pyrazol-1-yl)-5-oxopentanoic acid (23). Yellow solid (35 mg, 75% yield). $^1$H NMR (300 MHz, DMSO): δ 12.12 (brs, 1H, COOH), 8.25 (s, 1H), 7.94 (s, 1H), 7.92-7.80 (m, 5H), 7.62-7.59 (m, 2H), 7.34 (s, 1H), 7.27 (dd, 1H, J=2.35 and 8.94 Hz), 5.85-5.80 (dt, 1H, J=4.95 and 11.76 Hz), 4.21-4.14 (m, 2H, 2OCH$_2$), 4.02 (dd, 1H, J=12.13 and 18.23 Hz), 2.99-2.79 (m, 2H, CH$_2$), 2.31 (t, 2H, J=7.26 and 14.43 Hz, CH$_2$), 1.88-1.82 (p, 2H, CH$_2$), 1.39 (t, 3H, J=6.87 and 13.74 Hz, CH$_3$). MS (ESI) m/z=531.1 [M−H]$^-$; HRMS (ESI): calcd for C$_{29}$H$_{26}$N$_3$O$_5$Cl [M]$^+$ m/z=531.1561, found 531.1564. HPLC purity: 98.04% (R$_t$=5.82 min).

5-(5-(2-Chloro-7-ethoxyquinolin-3-yl)-3-(4-(isoxazol-4-yl)phenyl)-4,5-dihydro-1H-pyrazol-1-yl)-5-oxopentanoic acid (24). Light brown solid (37 mg, 79% yield). $^1$H NMR (300 MHz, DMSO): δ 12.11 (brs, 1H, COOH), 8.17 (s, 1H), 7.97 (s, 1H), 7.77 (m, 3H), 7.57 (d, 1H, J=8.4 Hz), 7.51 (d, 1H, J=8.49 Hz), 7.41 (s, 1H), 6.81-6.74 (m, 2H), 5.52-5.47 (dt, 1H, J=4.53 and 11.31 Hz), 4.10-3.99 (m, 2H, 2OCH$_2$), 3.78 (dd, 1H, J=12.24 and 18.18 Hz), 3.13 (dd, 1H, J=4.74 and 17.91 Hz), 2.93-2.72 (m, 2H, CH$_2$), 2.31 (t, 2H, J=7.14 and 14.28 Hz, CH$_2$), 1.89-1.80 (p, 2H, CH$_2$), 1.34 (t, 3H, J=6.87 and 13.83 Hz, CH$_3$); $^{13}$C NMR (75 MHz, CDCl$_3$): δ 174.76, 170.08, 161.45, 160.49, 154.97, 140.22, 134.10, 132.01, 129.76, 128.82, 127.36, 126.92, 116.99, 113.37, 111.53, 98.61, 89.91, 63.82, 33.46, 33.09, 20.38, 14.97. MS (ESI) m/z=532.1 [M−H]$^-$; HRMS (ESI): calcd for C$_{28}$H$_{24}$N$_4$O$_5$Cl [M−H]$^-$ m/z=531.1435, found 531.1440. HPLC purity: 96.27% (R$_t$=5.49 min).]

5-(5-(2-Chloro-7-ethoxyquinolin-3-yl)-3-(4'-morpholino-[1,1'-biphenyl]-4-yl)-4,5-dihydro-1H-pyrazol-1-yl)-5-oxopentanoic acid (25). Yellow solid (40 mg, 84% yield). $^1$H NMR (300 MHz, DMSO): δ 12.11 (brs, 1H, COOH), 8.21 (s, 1H), 7.94 (d, 1H, J=9.57 Hz), 7.79-7.60 (m, 4H), 7.46 (d, 1H, J=11.76 Hz), 7.06-7.01 (m, 3H), 6.78-6.75 (m, 2H), 5.85-5.80 (dt, 1H, J=4.49 and 11.63 Hz), 4.20-4.15 (m, 2H, 2OCH$_2$), 4.05 (dd, 1H, J=12.44 and 18.29 Hz), 3.74 (brs, 4H), 3.16 (brs, 5H), 2.88-2.72 (m, 2H, CH$_2$), 2.31 (t, 2H, J=7.11 and 14.34 Hz, CH$_2$), 1.90-1.80 (p, 2H, CH$_2$), 1.36 (t, 3H, J=6.45 and 13.98 Hz, CH$_3$); $^{13}$C NMR (75 MHz, CDCl$_3$): δ 174.77, 170.11, 160.82, 160.49, 151.32, 142.10, 133.34, 133.98, 129.82, 127.68, 126.27, 115.64, 112.34, 111.67, 66.47, 48.44, 20.29, 14.88. MS (ESI) m/z=626.1 [M−H]$^-$; HRMS (ESI): calcd for C$_{35}$H$_{34}$N$_4$O$_5$Cl [M−H]$^-$ m/z=625.2218, found 625.2215. HPLC purity: 97.63% (R$_t$=6.18 min).

Synthesis of Target Compounds 26-29: Step 1. Synthesis of Intermediates 33a-d:

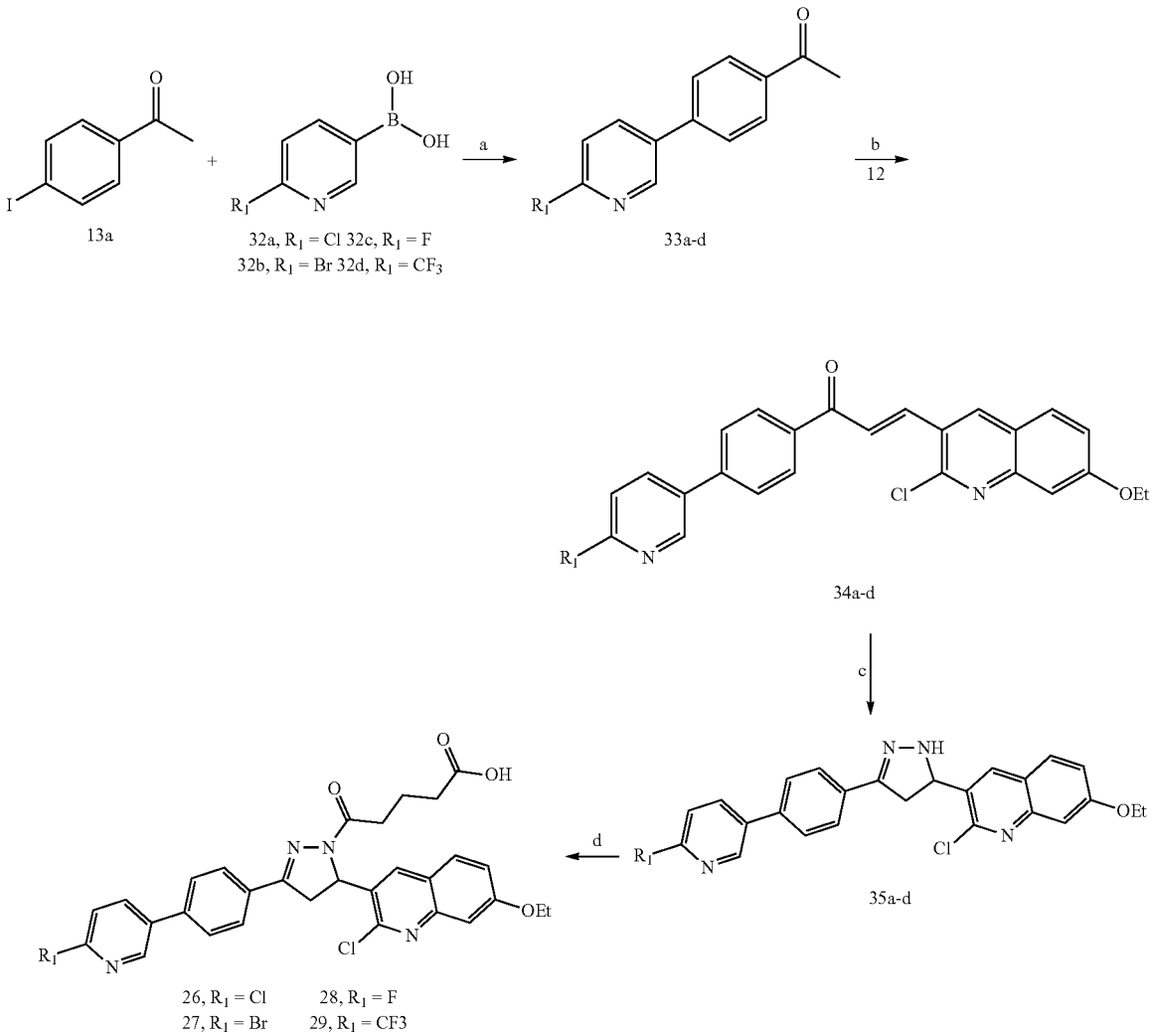

Scheme 3

Synthesis of 1-(4-(6-chloropyridin-3-yl)phenyl)ethan-1-one (33a). A solution of K$_2$CO$_3$ (421 mg, 3 equiv.) in water (4 mL) was added to a mixture of 4-iodoacetophenone 13a (250 mg, 1.2 equiv.) and 6-chloro-3-pyridinylboronic acid 32a (192 mg, 1.2 equiv.) in toluene (12 mL). The mixture was degassed with argon for 5 minute and then Pd(PPh$_3$)$_4$ (117 mg, 0.1 equiv.) was added. The reaction mixture was stirred at 90° C. for 18 h. The reaction mixture was cooled to room temperature and solvent was removed under reduced pressure. The residue was extracted with ethyl acetate (3×15 mL); the combined organic fractions were washed with brine, dried over anhydrous Na$_2$SO$_4$, and concentrated under reduced pressure. The crude product was purified by Biotage automated flash column chromatography using 0 to 50% EtOAc in hexanes as the eluent to furnish 1-(4-(6-chloropyridin-3-yl)phenyl)ethan-1-one 33a as a white solid (197 mg, 84% yield). TLC: 30% EtOAc in hexanes, R$_f$=0.47; visualized with UV. $^1$H NMR (300 MHz, CDCl$_3$): δ 8.66 (d, 1H, J=2.61 Hz), 8.09 (d, 2H, J=8.64 Hz), 7.91 (dd, 1H, J=2.61 and 8.28 Hz), 7.68 (d, 2H, J=8.64 Hz), 7.47 (d, 1H, J=8.28 Hz), 2.67 (s, 2H, CH$_3$); $^{13}$C NMR (75 MHz, CDCl$_3$): δ 197.47, 151.31, 148.08, 140.97, 137.25, 136.78, 134.43, 129.24, 127.22, 124.45, 26.74. MS (ESI) m/z=232.1 [M+H]$^+$.

Intermediates 33b-d were synthesized using an appropriate boronic acid/ester (32b-d) by above Suzuki coupling synthetic procedure described for the preparation of intermediate 33a. Each compound was purified by Biotage automated flash column chromatography using 0 to 50% EtOAc in hexanes as the eluent to afford desired compound.

1-(4-(6-Bromopyridin-3-yl)phenyl)ethan-1-one (33b). Off-white solid (241 mg, 86% yield). TLC: 30% EtOAc in hexanes, R$_f$=0.48; visualized with UV. $^1$H NMR (300 MHz, CDCl$_3$): δ 8.47 (d, 1H), 8.10 (m, 2H), 7.93 (dd, 1H, J=2.64 and 8.32 Hz), 7.69 (d, 2H, J=8.58 Hz), 7.47 (d, 1H, J=8.32 Hz), 2.67 (s, 2H, CH$_3$). MS (ESI) m/z=276.1 [M+H]$^+$.

1-(4-(6-Fluoropyridin-3-yl)phenyl)ethan-1-one (33c). White solid (196 mg, 90% yield). TLC: 30% EtOAc in hexanes, R$_f$=0.50; visualized with UV. $^1$H NMR (300 MHz, CDCl$_3$): δ 8.49 (s, 1H), 8.10-8.01 (m, 3H), 7.67 (d, 2H, J=8.52 Hz), 7.09 (dd, 1H, J=3.03 and 8.49 Hz), 2.67 (s, 2H, CH$_3$); $^{13}$C NMR (75 MHz, CDCl$_3$): δ 197.50, 146.23, 146.03, 141.36, 139.90, 139.79, 136.58, 129.21, 127.20, 110.03, 109.53, 26.73. MS (ESI) m/z=216.1 [M+H]$^+$.

1-(4-(6-(Trifluoromethyl)pyridin-3-yl)phenyl)ethan-1-one (33d). White solid (229 mg, 85% yield). TLC: 30% EtOAc in hexanes, R$_f$=0.50; visualized with UV. $^1$H NMR (300 MHz, CDCl$_3$): δ 9.00 (s, 1H), 8.14-8.08 (m, 3H), 7.83 (d, 1H, J=8.16 Hz), 7.74 (d, 2H, J=8.64 Hz), 2.68 (s, 2H, CH$_3$); $^{13}$C NMR (75 MHz, CDCl$_3$): δ 197.40, 148.53, 140.75, 137.21, 135.80, 129.32, 127.61, 120.58, 26.77. MS (ESI) m/z=266.1 [M+H]$^+$.

Step 2. Synthesis of Intermediates 34a-d: Intermediates 34a-d were synthesized using aldehyde 12 and corresponding acetophenone (33a-d) by above Claisen-Schmidt condensation synthetic procedure described for the preparation and purification of compound 14a.

(E)-3-(2-Chloro-7-ethoxyquinolin-3-yl)-1-(4-(6-chloropyridin-3-yl)phenyl)prop-2-en-1-one (34a). Yellow solid (204 mg, 57% yield). $^1$H NMR (300 MHz, DMSO): δ 9.27 (s, 1H), 8.88 (d, 1H, J=2.04 Hz), 8.33 (m, 2H), 8.19 (s, 1H), 8.11 (s, 1H), 8.07-7.97 (m, 4H), 7.69 (d, 1H, J=8.91 Hz), 7.38-7.35 (m, 2H), 4.26-4.20 (q, 2H, OCH$_2$), 1.41 (t, 3H, J=6.90 and 13.92 Hz, CH$_3$). MS (ESI) m/z=450.1 [M+H]$^+$.

(E)-1-(4-(6-Bromopyridin-3-yl)phenyl)-3-(2-chloro-7-ethoxyquinolin-3-yl)prop-2-en-1-one (34b). Brown solid (193 mg, 48% yield). $^1$H NMR (300 MHz, DMSO): δ 9.21 (s, 1H), 8.90 (d, 1H, J=1.96 Hz), 8.29 (m, 2H), 8.16 (d, 2H), 8.10 (d, 2H), 7.97 (d, 1H), 7.86 (d, 2H, J=8.95 Hz), 7.40-7.36 (m, 2H), 4.26-4.21 (q, 2H, OCH$_2$), 1.41 (t, 3H, J=6.88 and 13.92 Hz, CH$_3$). MS (ESI) m/z=495.1 [M+H]$^+$.

(E)-3-(2-Chloro-7-ethoxyquinolin-3-yl)-1-(4-(6-fluoropyridin-3-yl)phenyl)prop-2-en-1-one (34c). Orange solid (253 mg, 68% yield). $^1$H NMR (300 MHz, DMSO): δ 9.23 (s, 1H), 8.70 (d, 1H, J=2.49 Hz), 8.46-8.39 (m, 1H), 8.32 (d, 2H, J=8.49 Hz), 8.21-8.04 (m, 2H), 7.99-7.93 (m, 3H), 7.37-7.32 (m, 3H), 4.25-4.18 (q, 2H, OCH$_2$), 1.40 (t, 3H, J=6.93 and 13.89 Hz, CH$_3$). $^{13}$C NMR (75 MHz, DMSO): δ 188.46, 162.15, 150.63, 149.92, 146.60, 146.40, 141.35, 141.24, 138.62, 137.80, 137.06, 133.48, 130.41, 129.96, 127.76, 125.17, 124.60, 122.50, 121.43, 110.60, 107.51, 64.46, 14.86. MS (ESI) m/z=434.1 [M+H]$^+$.

(E)-3-(2-Chloro-7-ethoxyquinolin-3-yl)-1-(4-(6-(trifluoromethyl)pyridin-3-yl)phenyl)prop-2-en-1-one (34d). Yellow solid (229 mg, 60% yield). $^1$H NMR (300 MHz, DMSO): δ 8.22 (s, 1H), 8.06 (s, 1H), 7.81-7.64 (m, 4H), 7.48 (d, 1H, J=8.19 Hz), 7.40 (d, 1H, J=8.22 Hz), 7.29 (s, 2H), 7.15-7.03 (m, 3H), 4.22-4.15 (q, 2H, OCH$_2$), 1.38 (t, 3H, J=6.72 and 13.44 Hz, CH$_3$). MS (ESI) m/z=484.1 [M+H]$^+$.

Step 3. Synthesis of Intermediates 35a-d: Intermediates 35a-d were synthesized using synthetic procedure described above for the preparation and purification of compound 15a.

2-Chloro-3-(3-(4-(6-chloropyridin-3-yl)phenyl)-4,5-dihydro-JH-pyrazol-5-yl)-7-ethoxyquinoline (35a). Light yellow solid (150 mg, 77% yield). $^1$H NMR (300 MHz, DMSO): δ 8.78 (d, 1H, J=2.64 Hz), 8.44 (s, 1H), 8.21-8.17 (dd, 1H, J=2.67 and 8.4 Hz), 7.99 (d, 1H, J=9.03 Hz), 7.77 (s, 4H), 7.62 (d, 1H, J=8.37 Hz), 7.34 (d, 1H, J=2.43 Hz), 7.28-7.24 (dd, 1H, J=2.49 and 8.94 Hz), 5.24 (t, 1H, J=10.44 and 20.85 Hz), 4.22-4.15 (q, 2H, OCH$_2$), 3.77-3.68 (dd, 1H, J=11.16 and 16.65 Hz), 2.99-2.90 (dd, 1H, J=10.02 and 16.65 Hz), 1.40 (t, 3H, J=6.96 and 13.92 Hz, CH$_3$). MS (ESI) m/z=464.1 [M+H]$^+$.

3-(3-(4-(6-Bromopyridin-3-yl)phenyl)-4,5-dihydro-H-pyrazol-5-yl)-2-chloro-7-ethoxyquinoline (35b). Brown solid (139 mg, 73% yield). $^1$H NMR (300 MHz, DMSO): δ 8.77 (d, 1H, J=2.25 Hz), 8.42 (s, 1H), 8.13 (d, 1H, J=8.34 Hz), 8.01 (s, 1H), 7.94-7.85 (m, 4H), 7.77 (d, 1H, J=8.43 Hz), 7.34 (s, 1H), 7.27-7.24 (dd, 1H, J=2.19 and 9.0 Hz), 5.26 (t, 1H, J=10.42 and 20.80 Hz), 4.21-4.14 (q, 2H, OCH$_2$), 3.75-3.70 (dd, 1H, J=11.12 and 16.48 Hz), 2.95-2.89 (dd, 1H, J=10 and 16.60 Hz), 1.42 (t, 3H, J=6.9 and 13.77 Hz, CH$_3$). MS (ESI) m/z=509.1 [M+H]$^+$.

2-Chloro-7-ethoxy-3-(3-(4-(6-fluoropyridin-3-yl)phenyl)-4,5-dihydro-1H-pyrazol-5-yl)quinoline (35c). Yellow solid (198 mg, 80% yield). $^1$H NMR (300 MHz, DMSO): δ 8.59 (d, 1H, J=2.49 Hz), 8.44 (s, 1H), 8.35-8.29 (m, 1H), 7.99 (d, 1H, J=9.0 Hz), 7.75 (s, 4H), 7.34 (d, 1H, J=2.4 Hz), 7.30-7.24 (m, 2H), 5.24 (t, 1H, J=10.38 and 20.91 Hz), 4.22-4.15 (q, 2H, OCH$_2$), 3.77-3.68 (dd, 1H, J=11.16 and 16.65 Hz), 2.95-2.89 (dd, 1H, J=9.99 and 16.65 Hz), 1.42 (t, 3H, J=6.96 and 13.92 Hz, CH$_3$). MS (ESI) m/z=448.1 [M+H]$^+$.

2-Chloro-7-ethoxy-3-(3-(4-(6-(trifluoromethyl)pyridin-3-yl)phenyl)-4,5-dihydro-1H-pyrazol-5-yl)quinoline (35d). Light yellow solid (170 mg, 77% yield). $^1$H NMR (300 MHz, DMSO): δ 9.13 (s, 1H), 8.44 (s, 1H), 8.41-8.38 (d, 1H, J=8.16 Hz), 7.99-7.78 (m, 6H), 7.35 (d, 1H, J=2.19 Hz), 7.28-7.25 (dd, 1H, J=2.43 and 8.97 Hz), 5.26 (t, 1H, J=10.42 and 20.94 Hz), 4.22-4.15 (q, 2H, OCH$_2$), 3.78-3.69 (dd, 1H, J=11.22 and 16.53 Hz), 2.97-2.92 (dd, 1H, J=6.81 and 16.53 Hz), 1.42 (t, 3H, J=6.90 and 13.89 Hz, CH$_3$). MS (ESI) m/z=498.1 [M+H]$^+$.

Step 4. Synthesis of target compounds 26-29: Target compounds 26-29 were synthesized using synthetic procedure described above for the preparation and purification of compound 9.

5-(5-(2-Chloro-7-ethoxyquinolin-3-yl)-3-(4-(6-chloropyridin-3-yl)phenyl)-4,5-dihydro-1H-pyrazol-1-yl)-5-oxopentanoic acid (26). White solid (113 mg, 70% yield). $^1$H NMR (300 MHz, DMSO): δ 12.10 (brs, 1H, COOH), 8.81 (d, 1H, J=2.58 Hz), 8.24-8.20 (dd, 1H, J=2.64 and 8.4 Hz), 8.0 (s, 1H), 7.94-7.84 (m, 5H), 7.65 (d, 1H, J=8.34 Hz), 7.35 (d, 1H, J=2.31 Hz), 7.27-7.23 (dd, 1H, J=2.46 and 8.97 Hz), 5.88-5.82 (dt, 1H, J=5.16 and 11.85 Hz), 4.22-4.15 (q, 2H, OCH$_2$), 4.08-3.97 (dd, 1H, J=12.42 and 18.27 Hz), 3.39-3.31 (dd, 1H, J=5.4 and 17.91 Hz), 2.99-2.78 (m, 2H, CH$_2$), 2.32 (t, 2H, J=7.32 and 14.52 Hz, CH$_2$), 1.89-1.79 (p, 2H, CH$_2$), 1.41 (t, 3H, J=6.93 and 13.89 Hz, CH$_3$); $^{13}$C NMR (75 MHz, DMSO): δ 174.72, 170.42, 160.84, 154.40, 150.17, 148.64, 148.31, 138.23, 137.71, 134.50, 131.48, 130.54, 129.64, 127.99, 127.64, 124.93, 122.55, 120.73, 107.11, 64.16, 57.89, 33.43, 33.07, 20.29, 14.88. MS (ESI) m/z=576.1 [M−H]$^-$; HRMS (ESI): calcd for C$_{30}$H$_{25}$N$_4$O$_4$Cl$_2$ [M+H]$^+$ m/z=577.1409, found 577.1412. HPLC purity: 98.23% (R$_t$=5.98 min).

5-(3-(4-(6-Bromopyridin-3-yl)phenyl)-5-(2-chloro-7-ethoxyquinolin-3-yl)-4,5-dihydro-1H-pyrazol-1-yl)-5-oxopentanoic acid (27). Off-white solid (95 mg, 65% yield). $^1$H NMR (300 MHz, DMSO): δ 12.10 (brs, 1H, COOH), 8.77 (d, 1H, J=2.28 Hz), 8.11 (dd, 1H, J=2.52 and 8.34 Hz), 8.0 (s, 1H), 7.94-7.82 (m, 5H), 7.77 (d, 1H, J=8.38 Hz), 7.33 (s, 1H), 7.27-7.23 (dd, 1H, J=2.13 and 8.91 Hz), 5.87-5.82 (dt, 1H, J=5.25 and 11.82 Hz), 4.21-4.14 (q, 2H, OCH$_2$), 4.07-3.97 (dd, 1H, J=12.12 and 17.91 Hz), 3.38-3.30 (dd, 1H), 2.98-2.79 (m, 2H, CH$_2$), 2.33 (t, 2H, J=7.29 and 14.49 Hz, CH$_2$), 1.89-1.80 (p, 2H, CH$_2$), 1.40 (t, 3H, J=6.84 and 13.74 Hz, CH$_3$); $^{13}$C NMR (75 MHz, DMSO): δ 174.32, 170.41, 160.84, 154.39, 148.84, 148.64, 141.26, 137.95, 137.73, 134.77, 131.50, 130.53, 129.63, 129.31, 129.15, 128.66, 127.99, 127.60, 122.55, 120.72, 107.10, 64.16, 57.90, 33.43, 33.08, 20.29, 14.88. MS (ESI) m/z=619.1 [M−H]$^-$; HRMS (ESI): calcd for C$_{30}$H$_{25}$N$_4$O$_4$BrCl [M−H]$^-$ m/z=619.0748, found 619.0744. HPLC purity: 96.08% (R$_t$=5.77 min).

5-(5-(2-Chloro-7-ethoxyquinolin-3-yl)-3-(4-(6-fluoropyridin-3-yl)phenyl)-4,5-dihydro-1H-pyrazol-1-yl)-5-oxopentanoic acid (28). White solid (164 mg, 73% yield). $^1$H NMR (300 MHz, DMSO): δ 12.10 (brs, 1H, COOH), 8.62 (d, 1H, J=2.43 Hz), 8.38-8.31 (m, 1H), 8.0 (s, 1H), 7.94-7.82 (m, 5H), 7.34-7.23 (m, 3H), 5.87-5.82 (dt, 1H, J=5.25 and 11.88 Hz), 4.21-4.14 (q, 2H, OCH$_2$), 4.07-3.97 (dd, 1H, J=12.33 and 18.21 Hz), 3.38-3.30 (dd, 1H, J=5.37 and 17.82 Hz), 2.96-2.81 (m, 2H, CH$_2$), 2.31 (t, 2H, J=7.41 and 14.61 Hz, CH$_2$), 1.90-1.78 (p, 2H, CH$_2$), 1.41 (t, 3H, J=6.93 and 13.86 Hz, CH$_3$); $^{13}$C NMR (75 MHz, DMSO): δ 174.72, 170.39, 161.69, 160.84, 154.44, 148.65, 146.12, 145.92, 140.91, 140.80, 137.95, 133.74, 131.16, 130.55, 129.64, 127.96, 127.57, 122.56, 120.73, 110.51, 110.01, 107.10, 64.16, 57.88, 33.43, 33.08, 20.30, 14.88. MS (ESI) m/z=559.1 [M−H]$^-$; HRMS (ESI): calcd for C$_{30}$H$_{27}$N$_4$O$_4$FCl [M+H]$^+$ m/z=561.1705, found 561.1746. HPLC purity: 96.08% (R$_t$=5.68 min).

5-(5-(2-Chloro-7-ethoxyquinolin-3-yl)-3-(4-(6-(trifluoromethyl)pyridin-3-yl)phenyl)-4,5-dihydro-1H-pyrazol-1-yl)-5-oxopentanoic acid (29). White solid (130 mg, 71% yield). $^1$H NMR (300 MHz, DMSO): δ 12.10 (brs, 1H, COOH), 9.15 (s, 1H), 8.44 (d, 1H, J=8.16 Hz), 8.02-7.92 (m, 7H), 7.34 (s, 1H), 7.27-7.23 (dd, 1H, J=2.19 and 8.94 Hz), 5.89-5.83 (dt, 1H, J=5.19 and 12 Hz), 4.22-4.15 (q, 2H, OCH$_2$), 4.09-3.99 (dd, 1H, J=12.72 and 18.36 Hz), 3.40-3.33 (dd, 1H, J=5.37 and 17.80 Hz), 2.97-2.80 (m, 2H, CH$_2$), 2.34 (t, 2H, J=7.2 and 14.31 Hz, CH$_2$), 1.92-1.80 (p, 2H, CH$_2$), 1.41 (t, 3H, J=6.84 and 13.71 Hz, CH$_3$); $^{13}$C NMR (75 MHz, DMSO): δ 174.72, 170.46, 160.85, 154.34, 148.74, 148.65, 138.38, 137.56, 136.60, 132.04, 129.65, 128.14, 128.05, 122.56, 121.42, 120.74, 107.11, 64.16, 57.94, 33.43, 33.09, 20.30, 14.88. MS (ESI) m/z=611.1 [M+H]$^+$; HRMS (ESI): calcd for C$_{31}$H$_{27}$N$_4$O$_4$F$_3$Cl [M+H]$^+$ m/z=611.1673, found 611.1678. HPLC purity: 97.46% (R$_t$=6.25 min).

Synthesis of Target Compounds 37-40:

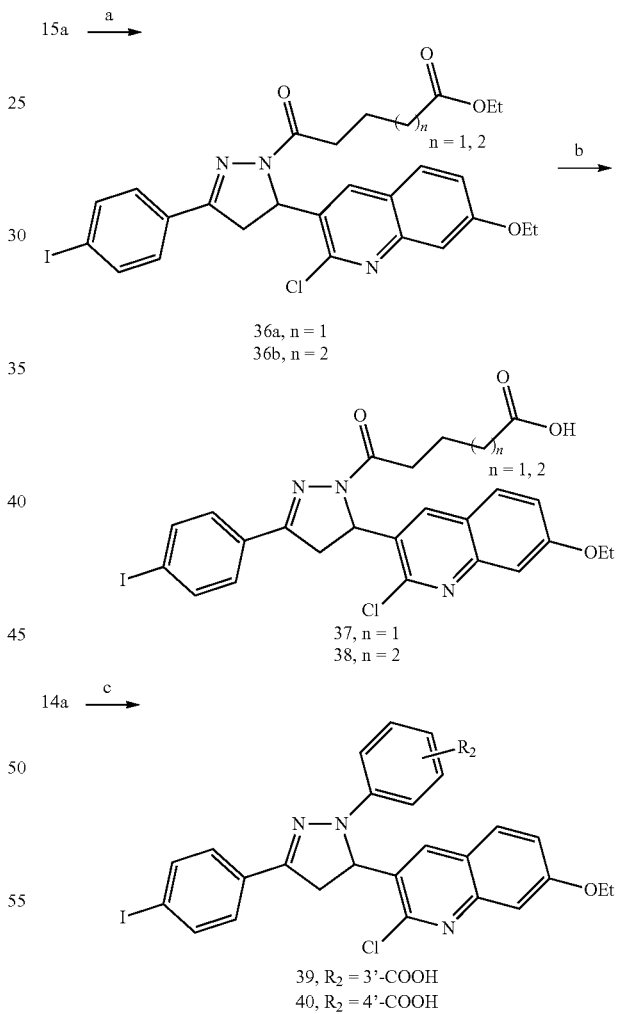

Scheme 4

Intermediates 36a-b were synthesized from compound 15a and using corresponding acyl chloride by an above synthetic procedure described for the preparation of compound 30. Each compound was purified by Biotage automated flash column chromatography using 0-50% EtOAc in hexanes as the eluent to afford desired compound.

Ethyl 6-(5-(2-chloro-7-ethoxyquinolin-3-yl)-3-(4-iodophenyl)-4,5-dihydro-1H-pyrazol-1-yl)-6-oxohexanoate (36a). White solid (55 mg, 84% yield). TLC: 40% EtOAc in hexanes, $R_f$=0.49; visualized with UV. $^1$H NMR (300 MHz, DMSO): δ 7.74-7.69 (t, 3H, J=8.37 and 17.64 Hz), 7.64 (d, 1H, J=8.97 Hz), 7.46 (d, 2H, J=8.37 Hz), 7.27 (d, 1H, J=2.22 Hz), 7.16-7.12 (dd, 1H, J=2.22 and 8.91 Hz), 5.97-5.91 (dt, 1H, J=4.92 and 11.79 Hz), 4.15-4.08 (q, 4H, 2OCH$_2$), 3.92-3.82 (dd, 1H, J=11.97 and 17.7 Hz), 3.15-3.07 (dd, 1H, J=4.98 and 17.82 Hz), 3.00-2.81 (m, 2H, CH$_2$), 2.37 (t, 2H, J=6.57 and 13.02 Hz, CH$_2$), 1.82-1.75 (m, 4H, 2CH$_2$), 1.48 (t, 3H, J=6.93 and 13.86 Hz, CH$_3$), 1.26 (t, 3H, J=7.14 and 14.25 Hz, CH$_3$); $^{13}$C NMR (75 MHz, DMSO): δ 173.50, 171.26, 160.88, 153.36, 148.95, 148.51, 137.94, 130.51, 129.26, 128.61, 128.10, 122.19, 120.80, 106.83, 96.95, 63.85, 60.31, 57.82, 41.08, 34.10, 33.77, 24.66, 24.35, 14.59, 14.28. MS (ESI) m/z=634.1 [M+H]$^+$.

Ethyl 7-(5-(2-chloro-7-ethoxyquinolin-3-yl)-3-(4-iodophenyl)-4,5-dihydro-1H-pyrazol-1-yl)-7-oxoheptanoate (36b). White solid (58 mg, 86% yield). TLC: 40% EtOAc in hexanes, $R_f$=0.48; visualized with UV. $^1$H NMR (300 MHz, DMSO): δ 7.76 (d, 2H, J=7.92 Hz), 7.68-7.60 (m, 2H) 7.47 (d, 2H, J=7.98 Hz), 7.28 (d, 1H, J=2.2 Hz), 7.18-7.15 (dd, 1H, J=2.26 and 8.94 Hz), 5.98-5.93 (dt, 1H, J=4.11 and 11.28 Hz), 4.15-4.09 (q, 4H, 2OCH$_2$), 3.93-3.83 (dd, 1H, J=12.15 and 17.64 Hz), 3.15-3.08 (dd, 1H, J=4.38 and 17.85 Hz), 3.00-2.81 (m, 2H, CH$_2$), 2.35 (t, 2H, J=7.17 and 14.4 Hz, CH$_2$), 1.83-1.69 (m, 4H, 2CH$_2$), 1.51-1.44 (m, 5H, CH$_2$ and CH$_3$), 1.27 (t, 3H, J=6.93 and 13.89 Hz, CH$_3$); $^{13}$C NMR (75 MHz, DMSO): δ 173.73, 171.57, 160.89, 153.27, 148.96, 148.54, 137.96, 130.54, 129.30, 128.57, 128.10, 122.18, 120.83, 106.86, 96.92, 63.86, 60.25, 57.80, 41.06, 34.19, 33.93, 28.87, 24.71, 24.51, 14.59, 14.28. MS (ESI) m/z=648.1 [M+H]$^+$.

Compounds 37-38 were synthesized using an above ester hydrolysis synthetic procedure described for the preparation of compound 22. Each compound was purified by trituration with 70% EtOAc in hexanes and crystallized in 2% EtOH in EtOAc to afford desired final compound.

6-(5-(2-Chloro-7-ethoxyquinolin-3-yl)-3-(4-iodophenyl)-4,5-dihydro-1H-pyrazol-1-yl)-6-oxohexanoic acid (37). White solid (35 mg, 92% yield). TLC: 75% EtOAc in hexanes, $R_f$=0.48; visualized with UV. $^1$H NMR (300 MHz, DMSO): δ 12.05 (brs, 1H, COOH), 7.96 (s, 1H), 7.93 (d, 1H, J=9.0 Hz), 7.84 (d, 2H, J=8.28 Hz), 7.58 (d, 2H, J=8.25 Hz), 7.33 (d, 1H, J=1.59 Hz), 7.25-7.22 (dd, 1H, J=2.13 and 8.88 Hz), 5.84-5.78 (dt, 1H, J=5.01 and 11.91 Hz), 4.20-4.14 (q, 2H, OCH$_2$), 4.01-3.90 (dd, 1H, J=12.18 and 18.12 Hz), 3.31-3.23 (dd, 1H, J=5.43 and 18.24 Hz), 2.91-2.70 (m, 2H, CH$_2$), 2.27 (t, 2H, J=6.87 and 12.78 Hz, CH$_2$), 1.62-1.58 (m, 4H, 2CH$_2$), 1.40 (t, 3H, J=6.81 and 13.68 Hz, CH$_3$); $^{13}$C NMR (75 MHz, DMSO): δ 174.90, 170.65, 160.82, 154.20, 148.62, 138.05, 130.92, 130.48, 129.65, 129.04, 122.52, 120.70, 107.07, 97.88, 64.15, 57.82, 33.90, 33.58, 24.62, 24.37, 14.88. MS (ESI) m/z=604.1 [M−H]$^-$; HRMS (ESI): calcd for C$_{26}$H$_{26}$N$_3$O$_4$ICl [M+H]$^+$ m/z=606.0657, found 606.0662. HPLC purity: 98.91% ($R_t$=6.46 min).

7-(5-(2-Chloro-7-ethoxyquinolin-3-yl)-3-(4-iodophenyl)-4,5-dihydro-1H-pyrazol-1-yl)-7-oxoheptanoic acid (38). White solid (34 mg, 90% yield). TLC: 75% EtOAc in hexanes, $R_f$=0.47; visualized with UV. $^1$H NMR (300 MHz, DMSO): δ 12.02 (brs, 1H, COOH), 7.96 (s, 1H), 7.93 (d, 1H, J=9.06 Hz), 7.84 (d, 2H, J=8.46 Hz), 7.58 (d, 2H, J=8.43 Hz), 7.33 (d, 1H, J=2.19 Hz), 7.26-7.22 (dd, 1H, J=2.4 and 8.97 Hz), 5.83-5.78 (dt, 1H, J=5.07 and 11.79 Hz), 4.21-4.14 (q, 2H, OCH$_2$), 4.01-3.91 (dd, 1H, J=12.27 and 18.27 Hz), 3.31-3.23 (dd, 1H, J=5.55 and 18.36 Hz), 2.90-2.70 (m, 2H, CH$_2$), 2.22 (t, 2H, J=7.2 and 14.49 Hz, CH$_2$), 1.65-1.48 (m, 4H, 2CH$_2$), 1.41-1.33 (m, 5H, CH$_2$ and CH$_3$); $^{13}$C NMR (75 MHz, DMSO): δ 174.95, 170.76, 160.82, 154.16, 148.62, 138.05, 130.94, 130.51, 129.65, 129.02, 122.52, 120.71, 107.07, 97.86, 64.15, 55.39, 34.00, 33.66, 31.17, 28.68, 24.72, 24.51, 14.88. MS (ESI) m/z=618.1 [M−H]$^-$; HRMS (ESI): calcd for C$_{27}$H$_{28}$N$_3$O$_4$ICl [M+H]$^+$ m/z=620.0813, found 620.0809. HPLC purity: 97.34% ($R_t$=6.70 min).

3-(5-(2-Chloro-7-ethoxyquinolin-3-yl)-3-(4-iodophenyl)-4,5-dihydro-1H-pyrazol-1-yl)benzoic acid (39). To a stirred suspension of 3-(2-chloro-7-ethoxyquinolin-3-yl)-1-(4-iodophenyl) prop-2-en-1-one 14a (100 mg, 1 equiv.) and 3'-hydrazino benzoic acid (65 mg, 1 equiv.) in n-butanol (8 mL) was added acetic acid (4 mL). The reaction mixture was heated at 120° C. for 20 h. The reaction mixture was concentrated under reduced pressure. The crude solid was washed with EtOH (3×1.5 mL) and crystalized in 2% EtOH in EtOAc to afford compound 39 (79 mg, 62%) as a yellow solid. $^1$H NMR (300 MHz, DMSO): δ 12.86 (brs, 1H, COOH), 7.80 (d, 2H, J=7.35 Hz), 7.64 (s, 1H), 7.55-7.45 (m, 4H), 7.36-7.29 (m, 2H), 7.18-7.12 (m, 1H), 6.79 (s, 1H), 6.71 (dd, 1H, J=8.19 Hz), 5.54-5.48 (dt, 1H, J=5.12 and 11.82 Hz), 4.04-3.99 (q, 2H, OCH$_2$), 3.95-3.85 (dd, 1H, J=12.78 and 18.64 Hz), 3.17-3.09 (dd, 1H, J=4.89 and 18.06 Hz), 1.34 (t, 3H, J=6.3 and 12.51 Hz, CH$_3$); $^{13}$C NMR (75 MHz, DMSO): δ 170.91, 167.92, 161.67, 150.24, 148.66, 144.35, 140.31, 134.95, 132.07, 129.95, 129.79, 128.63, 120.04, 113.84, 112.57, 111.62, 98.70, 95.70, 63.85, 58.69, 14.39. MS (ESI) m/z=596.1 [M−H]$^-$; HRMS (ESI): calcd for C$_{27}$H$_{20}$N$_3$O$_3$ICl [M−H]$^-$ m/z=596.0238, found 596.0243. HPLC purity: 96.12% ($R_t$=6.82 min).

4-(5-(2-Chloro-7-ethoxyquinolin-3-yl)-3-(4-iodophenyl)-4,5-dihydro-1H-pyrazol-1-yl)benzoic acid (40). Compound 40 was prepared and purified by an above described procedure using 14a (100 mg, 1 equiv.) and 4'-hydrazino benzoic acid (65 mg, 1 equiv.) as starting materials. Yellow solid, (74 mg, 58% yield). $^1$H NMR (300 MHz, DMSO): δ 12.32 (brs, 1H, COOH), 7.80-7.76 (m, 4H), 7.57 (d, 2H, J=8.25 Hz), 7.48 (d, 1H, J=8.76 Hz), 7.40 (s, 1H), 7.05 (d, 2H, J=8.58 Hz), 6.79 (s, 1H), 6.71 (dd, 1H, J=1.62 and 8.64 Hz), 5.60-5.54 (dt, 1H, J=5.01 and 12.03 Hz), 4.05-3.97 (q, 2H, OCH$_2$), 3.96-3.85 (dd, 1H, J=12.72 and 17.61 Hz), 3.21-3.14 (dd, 1H, J=5.16 and 17.79 Hz), 1.34 (t, 3H, J=6.69 and 13.83 Hz, CH$_3$); $^{13}$C NMR (75 MHz, DMSO): δ 170.89, 167.67, 161.61, 150.25, 148.66, 144.35, 140.31, 137.92, 134.89, 131.84, 129.97, 128.42, 128.28, 120.60, 117.11, 113.32, 112.55, 111.62, 98.68, 96.18, 63.95, 58.35, 14.92. MS (ESI) m/z=596.1 [M−H]$^-$; HRMS (ESI): calcd for C$_{27}$H$_{20}$N$_3$O$_3$ICl [M−H]$^-$ m/z=596.0238, found 596.0236. HPLC purity: 96.55% ($R_t$=6.84 min).

Synthesis of Target Compounds 41-47:

Scheme 5

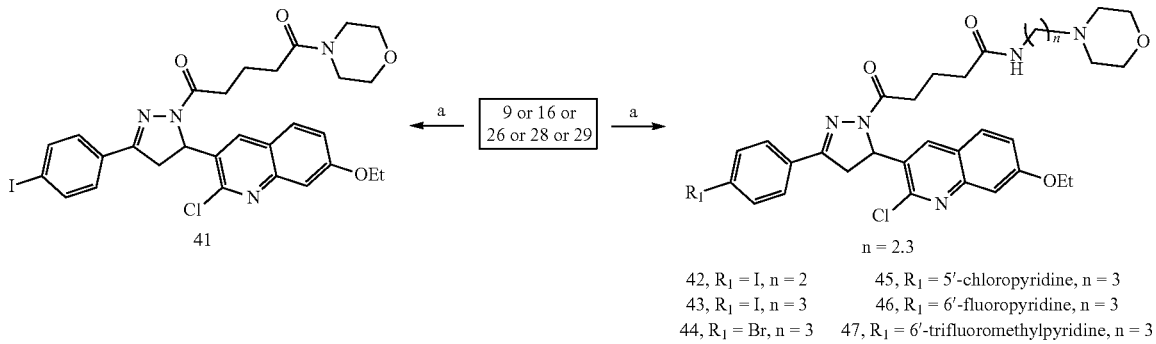

42, $R_1$ = I, n = 2   45, $R_1$ = 5'-chloropyridine, n = 3
43, $R_1$ = I, n = 3   46, $R_1$ = 6'-fluoropyridine, n = 3
44, $R_1$ = Br, n = 3  47, $R_1$ = 6'-trifluoromethylpyridine, n = 3

1-(5-(2-Chloro-7-ethoxyquinolin-3-yl)-3-(4-iodophenyl)-4,5-dihydro-1H-pyrazol-1-yl)-5-morpholinopentane-1,5-dione (41). To a solution of compound 9 (50 mg, 1 equiv.) in dry DMF (4 mL) was added EDCI.HCl (24 mg, 1.5 equiv.), HOBt (17 mg 1.5 equiv.), DIPEA (22 µL, 1.5 equiv.) and the mixture was stirred for 30 min at room temperature under an argon atmosphere. Morpholine (9 µL, 1.1 equiv.) and DIPEA (22 µL, 1.5 equiv.) were added to the reaction mixture. The reaction mixture was stirred at room temperature for 18 h. The reaction mixture was poured into water and extracted with DCM (3×10 mL). The combined organic extracts was washed with saturated $NaHCO_3$ (2×10 mL), brine, dried over $Na_2SO_4$ and concentrated under reduced pressure. The crude product was purified by Biotage automated flash column chromatography using 1-2% MeOH in DCM as the eluent to furnish 1-(5-(2-chloro-7-ethoxyquinolin-3-yl)-3-(4-iodophenyl)-4,5-dihydro-1H-pyrazol-1-yl)-5-morpholinopentane-1,5-dione 41 (44 mg, 78% yield) as a white solid. TLC: 1% MeOH in DCM, $R_f$=0.38; visualized with UV. $^1$H NMR (300 MHz, $CDCl_3$): δ 7.74 (t, 3H, J=8.37 and 17.58 Hz), 7.65 (d, 1H, J=8.97 Hz), 7.47 (d, 2H, J=8.37 Hz), 7.29 (d, 1H, J=1.74 Hz), 7.18-7.15 (dd, 1H, J=2.25 and 8.91 Hz), 5.98-5.92 (dt, 1H, J=4.8 and 11.76 Hz), 4.18-4.08 (q, 2H, $OCH_2$), 3.93-3.83 (dd, 1H, J=11.97 and 17.82 Hz), 3.61 (brs, 4H), 3.15-2.89 (m, 3H, CH and $CH_2$), 2.52-2.38 (m, 2H, $CH_2$), 2.27 (brs, 4H), 2.13-2.04 ((p, 2H, $CH_2$), 1.48 (t, 3H, J=6.9 and 13.86 Hz, $CH_3$). $^{13}$C NMR (75 MHz, $CDCl_3$): δ 171.26, 171.07, 160.95, 153.46, 149.00, 148.51, 137.97, 130.44, 128.59, 128.14, 122.19, 120.89, 106.85, 97.02, 66.60, 63.89, 57.84, 53.61, 36.18, 33.36, 32.54, 21.08, 14.58. MS (ESI) m/z=661.1 [M+H]$^+$; HRMS (ESI): calcd for $C_{29}H_{31}N_4O_4ICl$ [M+H]$^+$ m/z=661.1079, found 661.1076. HPLC purity: 95.37% ($R_t$=4.09 min).

Compounds 42-47 were synthesized by an above synthetic procedure described for the preparation of amide 41 using appropriate starting materials. Each compound was triturated with the mixture of 1-2% MeOH in EtOAc (2-3 times) to afford desired compound.

5-(5-(2-Chloro-7-ethoxyquinolin-3-yl)-3-(4-iodophenyl)-4,5-dihydro-1H-pyrazol-1-yl)-N-(2-morpholinoethyl)-5-oxopentanamide (42). White solid (44 mg, 74% yield). TLC: 10% MeOH in DCM, $R_f$=0.42; visualized with UV. $^1$H NMR (300 MHz, DMSO): δ 7.98 (s, 1H), 7.94 (d, 1H, J=9.03 Hz), 7.85 (d, 2H, J=8.43 Hz), 7.77 (t, 1H, J=5.49 and 11.13 Hz), 7.57 (d, 2H, J=8.4 Hz), 7.34 (d, 1H, J=2.31 Hz), 7.26-7.22 (dd, 1H, J=2.4 and 8.97 Hz), 5-84-5.78 (dt, 1H, J=5.13 and 11.88 Hz), 4.21-4.14 (q, 2H, $OCH_2$), 4.01 (dd, 1H, J=12.03 and 18.00 Hz), 3.54 (t, 4H, J=4.5 and 9.12 Hz), 3.29 (dd, 1H, J=5.91 and 18.63 Hz), 3.18-3.11 (q, 2H, $CH_2$), 2.89-2.72 (m, 2H, $CH_2$), 2.33-2.27 (m, 6H), 2.16-2.11 (t, 2H, J=7.26 and 14.43 Hz, $CH_2$), 1.86-1.77 (p, 2H, $CH_2$), 1.41 (t, 3H, J=6.93 and 13.89 Hz, $CH_3$); $^{13}$C NMR (75 MHz, DMSO): δ 172.10, 170.54, 160.82, 154.20, 148.63, 138.05, 130.93, 130.47, 129.67, 129.01, 122.54, 120.70, 107.08, 97.88, 66.60, 64.15, 57.99, 53.71, 36.20, 35.12, 33.16, 21.07, 14.88. MS (ESI) m/z=704.1 [M+H]$^+$; HRMS (ESI): calcd for $C_{31}H_{36}N_5O_4ICl$ [M+H]$^+$ m/z=704.1501, found 704.1504. HPLC purity: 98.92% ($R_t$=4.16 min).

5-(5-(2-Chloro-7-ethoxyquinolin-3-yl)-3-(4-iodophenyl)-4,5-dihydro-1H-pyrazol-1-yl)-N-(3-morpholinopropyl)-5-oxopentanamide (43). White solid (46 mg, 76% yield). TLC: 10% MeOH in DCM, $R_f$=0.37; visualized with UV. $^1$H NMR (300 MHz, DMSO): δ 7.98 (s, 1H), 7.94 (d, 1H, J=9.09 Hz), 7.85 (d, 2H, J=8.46 Hz), 7.78 (t, 1H), 7.57 (d, 2H, J=8.49 Hz), 7.34 (d, 1H, J=2.34 Hz), 7.26-7.23 (dd, 1H, J=2.43 and 8.97 Hz), 5-84-5.78 (dt, 1H, J=5.16 and 11.97 Hz), 4.21-4.14 (q, 2H, $OCH_2$), 4.01 (dd, 1H, J=12.42 and 18.36 Hz), 3.53 (t, 4H, J=4.47 and 9.09 Hz), 3.29 (dd, 1H, J=5.34 and 18.15 Hz), 3.07-3.01 (q, 2H, $CH_2$), 2.91-2.71 (m, 2H, $CH_2$), 2.27 (brs, 4H), 2.27-2.19 (m, 2H), 2.15-2.10 (t, 2H, J=7.29 and 14.49 Hz, $CH_2$), 1.87-1.77 (p, 2H, $CH_2$), 1.56-1.49 (p, 2H, $CH_2$), 1.41 (t, 3H, J=6.93 and 13.89 Hz, $CH_3$); $^{13}$C NMR (75 MHz, DMSO): δ 172.01, 170.52, 160.82, 154.18, 148.63, 138.05, 135.34, 130.92, 130.45, 129.66, 128.99, 128.20, 122.54, 121.18, 120.69, 107.08, 97.87, 66.62, 64.15, 57.85, 56.35, 53.77, 37.26, 35.15, 33.20, 26.57, 21.07, 14.87. MS (ESI) m/z=718.1 [M+H]$^+$; HRMS (ESI): calcd for $C_{32}H_{38}N_5O_4ICl$ [M+H]$^+$ m/z=718.1657, found 718.1651. HPLC purity: 97.24% ($R_t$=4.28 min).

5-(3-(4-Bromophenyl)-5-(2-chloro-7-ethoxyquinolin-3-yl)-4,5-dihydro-1H-pyrazol-1-yl)-N-(3-morpholinopropyl)-5-oxopentanamide (44). Off-white solid (49 mg, 80% yield). TLC: 10% MeOH in DCM, $R_f$=0.39; visualized with UV. $^1$H NMR (300 MHz, DMSO): δ 7.99 (s, 1H), 7.94 (d, 1H, J=9.09 Hz), 7.83 (t, 1H, J=5.16 and 9.9 Hz), 7.74-7.65 (m, 4H), 7.34 (d, 1H, J=2.34 Hz), 7.27-7.23 (dd, 1H, J=2.49 and 8.97 Hz), 5-85-5.79 (dt, 1H, J=5.25 and 12.06 Hz), 4.21-4.14 (q, 2H, $OCH_2$), 4.02 (dd, 1H, J=12.33 and 18.33 Hz), 3.51 (t, 4H, J=4.17 and 9.04 Hz), 3.30 (dd, 1H, J=5.55 and 18.37 Hz), 3.08-3.01 (q, 2H, $CH_2$), 2.91-2.72 (m, 2H, $CH_2$), 2.27 (brs, 4H), 2.26-2.20 (m, 2H), 2.16-2.11 (t, 2H, J=7.41 and 14.58 Hz, $CH_2$), 1.87-1.77 (p, 2H, $CH_2$), 1.56-1.49 (p, 2H, $CH_2$), 1.41 (t, 3H, J=6.96 and 13.92 Hz, $CH_3$); $^{13}$C NMR (75 MHz, DMSO): δ 172.03, 170.54, 160.83, 153.99, 148.64, 132.23, 130.67, 130.46, 129.67, 129.13, 124.24, 122.55, 120.70, 107.09, 66.61, 64.15, 57.91, 56.33, 53.76, 37.24, 35.15, 33.22, 26.58, 21.07, 14.87. MS (ESI) m/z=670.1 [M+H]$^+$; HRMS (ESI): calcd for $C_{32}H_{38}N_5O_4BrCl$ [M+H]$^+$ m/z=670.1796, found 670.1793. HPLC purity: 96.61% ($R_t$=3.93 min).

5-(5-(2-Chloro-7-ethoxyquinolin-3-yl)-3-(4-(6-chloropyridin-3-yl)phenyl)-4,5-dihydro-1H-pyrazol-1-yl)-N-(3-morpholinopropyl)-5-oxopentanamide (45). Light yellow solid (49 mg, 81% yield). TLC: 10% MeOH in DCM, $R_f$=0.40; visualized with UV. $^1$H NMR (300 MHz, DMSO): δ 8.80 (s, 1H), 8.23 (d, 1H, J=6.78 Hz), 8.01 (s, 1H), 7.95-7.81 (m, 6H), 7.65 (d, 1H, J=8.22 Hz), 7.34 (s, 1H), 7.26 (d, 1H, J=8.16 Hz), 5-87-5.83 (dt, 1H, J=5.30 and 12.16 Hz), 4.20-4.15 (q, 2H, OCH$_2$), 4.07 (dd, 1H, J=12.87 and 17.82 Hz), 3.51 (brs, 4H), 3.08-3.01 (q, 2H, CH$_2$), 2.90-2.72 (m, 2H, CH$_2$), 2.29 (brs, 4H), 2.27-2.22 (m, 2H), 2.16-2.11 (t, 2H, J=7.35 and 14.24 Hz, CH$_2$), 1.88-1.78 (p, 2H, CH$_2$), 1.57-1.50 (p, 2H, CH$_2$), 1.41 (t, 3H, J=6.51 and 12.57 Hz, CH$_3$); $^{13}$C NMR (75 MHz, DMSO): δ 174.65, 172.16, 172.08, 170.58, 160.83, 160.41, 154.31, 153.81, 150.51, 150.18, 148.65, 148.31, 140.74, 138.22, 137.70, 135.58, 134.51, 131.57, 129.49, 127.96, 127.64, 124.94, 124.43, 123.21, 120.90, 107.71, 66.50, 64.03, 57.91, 53.64, 36.09, 35.17, 35.07, 33.22, 21.12, 14.91. MS (ESI) m/z=703.1 [M+H]$^+$; HRMS (ESI): calcd for $C_{37}H_{41}N_6O_4Cl_2$ [M+H]$^+$ m/z=703.2566, found 703.2699. HPLC purity: 95.36% ($R_t$=4.27 min).

5-(5-(2-Chloro-7-ethoxyquinolin-3-yl)-3-(4-(6-fluoropyridin-3-yl)phenyl)-4,5-dihydro-1H-pyrazol-1-yl)-N-(3-morpholinopropyl)-5-oxopentanamide (46). White solid (47 mg, 77% yield). TLC: 10% MeOH in DCM, $R_f$=0.43; visualized with UV. $^1$H NMR (300 MHz, DMSO): δ 8.62 (d, 1H, J=2.28 Hz), 8.38-8.31 (m, 1H), 8.01 (s, 1H), 7.95-7.80 (m, 6H),), 7.34-7.32 (m, 1H), 7.30-7.23 (m, 2H), 5-87-5.81 (dt, 1H, J=5.04 and 11.7 Hz), 4.21-4.14 (q, 2H, OCH$_2$), 4.07 (dd, 1H, J=12.15 and 18.15 Hz), 3.52 (t, 4H, J=4.32 and 8.76 Hz), 3.36 (dd, 1H, J=5.37 and 17.88 Hz), 3.09-3.02 (q, 2H, CH$_2$), 2.92-2.80 (m, 2H, CH$_2$), 2.28 (brs, 4H), 2.27-2.21 (m, 2H), 2.17-2.13 (t, 2H, J=7.32 and 14.46 Hz, CH$_2$), 1.89-1.82 (p, 2H, CH$_2$), 1.57-1.50 (p, 2H, CH$_2$), 1.41 (t, 3H, J=6.9 and 13.83 Hz, CH$_3$); $^{13}$C NMR (75 MHz, DMSO): δ 172.04, 170.53, 160.83, 154.35, 148.65, 146.11, 145.91, 140.89, 140.78, 137.94, 131.17, 130.56, 129.68, 127.93, 127.55, 122.57, 120.70, 110.51, 110.01, 107.09, 66.60, 64.15, 57.86, 56.34, 53.75, 37.26, 35.20, 33.28, 26.56, 21.12, 14.87. MS (ESI) m/z=687.1 [M+H]$^+$; HRMS (ESI): calcd for $C_{37}H_{41}N_6O_4ClF$ [M+H]$^+$ m/z=687.2862, found 687.2859. HPLC purity: 97.05% ($R_t$=4.06 min).

5-(5-(2-Chloro-7-ethoxyquinolin-3-yl)-3-(4-(6-(trifluoromethyl)pyridin-3-yl)phenyl)-4,5-dihydro-1H-pyrazol-1-yl)-N-(3-morpholinopropyl)-5-oxopentanamide (47). Off-white solid (45 mg, 75% yield). TLC: 10% MeOH in DCM, $R_f$=0.37; visualized with UV. $^1$H NMR (300 MHz, DMSO): δ 9.15 (s, 1H), 8.44 (d, 1H, J=8.01 Hz), 8.02-7.92 (m, 7H), 7.86 (t, 2H, J=4.89 and 10.05 Hz), 7.34 (d, 1H, J=1.74 Hz), 7.27-7.23 (dd, 1H, J=2.16 and 8.91 Hz), 5-88-5.83 (dt, 1H, J=5.07 and 11.85 Hz), 4.21-4.14 (q, 2H, OCH$_2$), 4.08 (dd, 1H, J=12.06 and 18.06 Hz), 3.53 (t, 4H, J=4.02 and 8.22 Hz), 3.29 (m, 1H), 3.09-3.03 (q, 2H, CH$_2$), 2.93-2.78 (m, 2H, CH$_2$), 2.31 (brs, 4H), 2.27-2.23 (m, 2H), 2.18-2.13 (t, 2H, J=7.2 and 14.37 Hz, CH$_2$), 1.89-1.82 (p, 2H, CH$_2$), 1.58-1.49 (p, 2H, CH$_2$), 1.41 (t, 3H, J=6.87 and 13.8 Hz, CH$_3$); MS (ESI) m/z=737.1 [M+H]$^+$; HRMS (ESI): calcd for $C_{37}H_{41}N_6O_4ClF$ [M+H]$^+$ m/z=737.2830, found 737.2835. HPLC purity: 95.12% ($R_t$=4.55 min).

Purification of Full-Length Human RPA and DBD-A/B Constructs of RPA70 Subunit.

Full length, heterotrimeric human RPA (fl-RPA) and DBD-A/B constructs were expressed and purified according to previously described protocol. The DBD-A/B construct was expressed as a His6-RPA$_{181-422}$ fusion protein. E. coli BL21 (DE3) cells in log growth were induced for 3 h with 0.5 mM IPTG at 37° C. The cells were lysed via sonication in buffer containing 20 mM Tris pH 7.5, 500 mM NaCl, 10 mM b-mercaptoethanol, supplemented with 25 μg/mL lysozyme, 1 μg/mL leupeptin, 1 μg/mL pepstatin and 0.5 mM PMSF. The lysate was applied to a 20 mL phosphocellulose column equilibrated in the same buffer and the flow-through material collected, brought to 5 mM Imidazole and loaded onto a 2 ml Ni-NTA column. The column was washed and proteins eluted on with a gradient from 50 mM to 500 mM imidazole. Fractions were assessed by EMSA and SDS-PAGE and DBD-A/B containing fraction were pool, dialyzed against buffer containing 50 mM HEPES pH 7.0, 500 mM NaCl and 1 mM DTT and stored at −80° C.

Electrophoretic Mobility Shift Assay (EMSA).

EMSAs were carried out using previously described procedure with the following modification. EMSA reactions (20 μL) were performed with 50 nM fl-RPA and 2.5 nM 5' [$^{32}$P]-labeled 34-base DNA in buffer containing 20 mM HEPES (pH 7.8), 1 mM DTT, 0.001% NP-40, 50 mM NaCl. Chemical compounds were suspended in DMSO and DMSO concentration in the reaction mixture was kept constant at 2% or below 5%. RPA was incubated with inhibitor or DMSO control in reaction buffer for 30 min before the addition of DNA. Reactions were incubated for 5 min at room temperature and products separated via 6% native polyacrylamide gel electrophoresis. The bound and unbound fractions were then quantified by phosphor-imager analysis using ImageQuant software (Molecular Dynamics, CA) and IC$_{50}$ values calculated by non-linear regression using SigmPlot (Sysat). For EMSA reactions with RPA DBD-A/B, 150 nM DBD-A/B was used, and electrophoresis was performed at 4° C. All other conditions were identical to those described for the full-length RPA.

Purified full length heterotrimeric human RPA protein was used to screen a series of analogs in an electrophoretic mobility shift assay (EMSA) measuring direct binding to a ss-DNA substrate. Quantification of the EMSA data and additional concentration dependent analysis to measure IC$_{50}$ values of newly synthesized analogs provided potential insight into the structure-activity relationships (Table 1 and 2). The replacement of the iodo group of compound 9 (IC$_{50}$=15.30±1.42 μM) with hydroxyl or nitro groups decreased RPA inhibitory activity while changing to an amine resulted in a 7-fold increase in potency (IC$_{50}$=2.34±0.22 μM). Acrylate containing compound 20 exhibited 2-fold increase in activity compared to 9, the inclusion of morpholinecarbonyl group in compound 21 resulted in decreased RPA inhibition. Introduction of a heteroaromatic on Ring A such as 3'-furan, 2'-furan and 4'-isoxazole increased potency as 2'-substituted furan at Ring A (compound 23, IC$_{50}$=2.10±0.48 µM) exhibited almost 3.2-fold increase in activity compared to 3'-substituted furan containing compound 22 (IC50=6.77±0.64 µM). Insertion of another heteroatom such as nitrogen into the furan ring in the form of an isoxazole displayed even more potent RPA inhibitory activity. (compound 24, IC$_{50}$=1.71±0.28 µM). Halogenated pyridinyl compounds (26-29) exhibited increased RPA inhibitory activities compared to the parent compound with an increased potency between 4- and 15-fold. The chloro-pyridinyl compound 26 and bromo-pyridinyl compound 27 showed RPA inhibitory activity in the EMSA assay of 26, 1.61±0.04 µM and 27, IC$_{50}$=1.01±0.60 µM. Fluorine and trifluoromethyl substituents were included in pyridinyl compounds 28-29. However, both compounds displayed slightly weaker activity compared to chloro- and bromo-pyridinyl containing compounds 26-27.

The conversion to an oxopentanoic ethyl ester (compound 30) decreased RPA inhibitory activity (Table 2). Compounds 39-40 comprised oxopentanoic acids with 2' or 3'-subsitituted benzoylic carboxylic acids. Compounds 37 and 38 had increased length of the aliphatic side chain by 1 and 2 carbon, in compounds 37 and 38 respectively. Compound 41 had an N-morpholino group on alkyl carboxylic acid side chain.

TABLE 1

IC$_{50}$ values

| Compound | R1 | RPA IC50 (µM)[b,c] |
|---|---|---|
| 9 | I | 15.30 ± 1.42 |
| 16 | Br | 19.24 ± 4.17 |
| 17 | OH | >25 |
| 18 | NO2 | >25 |
| 19 | NH2 | 2.34 ± 0.22 |
| 20 | (acrylate ester) | 8.98 ± 0.98 |
| 21 | (morpholine carbamate) | >25 |
| 22 | (3-furyl) | 6.77 ± 0.64 |
| 23 | (2-furyl) | 2.10 ± 0.48 |
| 24 | (isoxazolyl) | 1.71 ± 0.28 |
| 25 | (4-morpholinophenyl) | 3.14 ± 0.23 |
| 26 | (2-chloropyridinyl) | 1.61 ± 0.04 |
| 27 | (2-bromopyridinyl) | 1.01 ± 0.60 |
| 28 | (2-fluoropyridazinyl) | 2.66 ± 0.60 |
| 29 | (2-CF3-pyridinyl) | 4.35 ± 0.42 |

Determined using EMSA, binding of full length human RPA to DNA was assessed.

[b]Compounds that displayed greater than 80% inhibition at 25 µM were analyzed in titration experiments.

[c]IC$_{50}$ values are a mean of minimum of triplicate independent experiments and data are presented as the mean ± SD.

TABLE 2
IC$_{50}$ values
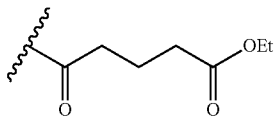 [SMILES: *C(=O)CCCC(=O)OCC]
Series A
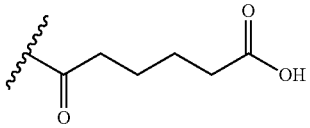 [SMILES: *C(=O)CCCCC(=O)O]
Series B
| Compd | Series | R$_1$ | 56$^{R2}$ | Y | RPA IC$_{50}$ (μM)$^{b,c}$ |
|---|---|---|---|---|---|
| 30 | A | I | 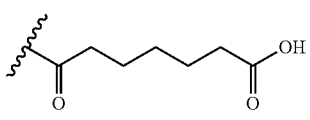 [SMILES: *C(=O)CCCCCC(=O)O] | | >25 |
| 37 | A | I | 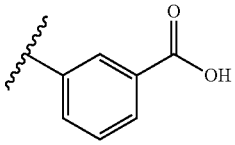 [SMILES: *c1cccc(C(=O)O)c1] | | 6.86 ± 0.23 |
| 38 | A | I | 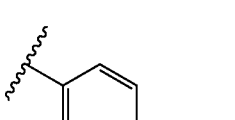 | | 9.93 ± 1.23 |
| 39 | A | I | 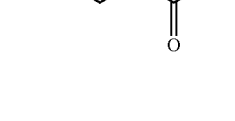 | | >25 |
| 40 | A | I | 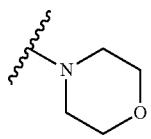 [SMILES: *N1CCOCC1] | | >25 |
| 41 | B | I | |  | 6.63 ± 0.48 |

TABLE 2-continued

IC$_{50}$ values

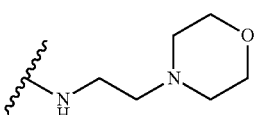

Series A

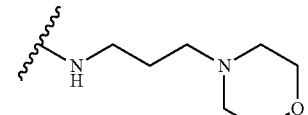

Series B

| Compd | Series | R$_1$ | R$_2$ | Y | RPA IC$_{50}$ (μM)[b,c] |
|---|---|---|---|---|---|
| 42 | B | I | | 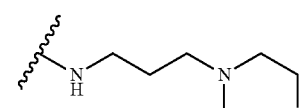 | 10.52 ± 0.68 |
| 43 | B | I | | 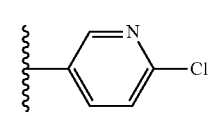 | 4.99 ± 0.28 |
| 44 | B | Br | | 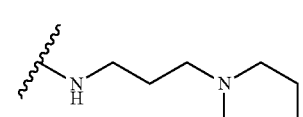 | 10.05 ± 1.46 |
| 45 | B | 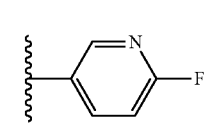 | | 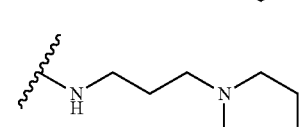 | 4.06 ± 0.56 |
| 46 | B | 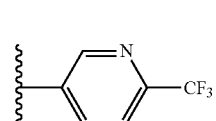 | | 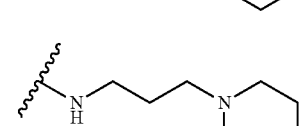 | 2.29 ± 0.31 |
| 47 | B | (pyridine-CF$_3$) | | (NH-propyl-morpholine) | 5.85 ± 0.39 |

Determined using EMSA, binding of full length human RPA to DNA was accessed.
[b]Compounds that displayed greater than 80% inhibition at 25 μM were analyzed in titration experiments.
[c]IC$_{50}$ values are a mean of minimum of triplicate independent experiments and data are presented as the mean ± SD.

The central region of the RPA70 subunit contains DNA-binding domains A and B (DBD-A and DBD-B) GB folds and RPA binds to a 12-base ssDNA primarily through these DBD-A and B domains (amino acids 181-422) which may significantly contribute to the RPA-ssDNA interaction. These domains are compact modular domains populated with hydrophobic and basic DNA binding amino acid residues and have great potential to influence binding of the compounds to the RPA70 subunit. RPA DBD-A/B construct was purified via Ni-affinity chromatography. The activity of compounds 23-27 was evaluated on purified DBD-A/B construct using EMSA. Table 3 shows inhibition of RPA DBD-A/B by compounds 23-27 and suggests that majority of the inhibitory effect of our RPA inhibitors is manifested through interaction with the DBA-A, DBD-B OB-fold and potentially the inter-domain region. We then compared compounds 23-27 inhibitory activity towards the DBD-A/B construct and full-length heterotrimeric RPA and all compounds displayed improved potency toward full length RPA compared to the DBD-A/B. Compounds 23-27 improved potency for full length RPA suggesting that these compounds may be making interactions with other sites within RPA beyond the DBD-A and B that stabilize the interactions and contributing in overall potency of our compounds.

TABLE 3

| Compd | $RPA_{A/B}$ $IC_{50}$ $(\mu M)^b$ |
|---|---|
| 23 | 3.30 ± 0.07 |
| 24 | 4.03 ± 0.28 |
| 25 | 16.43 ± 2.09 |
| 26 | 11.73 ± 0.30 |
| 27 | 3.32 ± 0.016 |

$^a$Determined using EMSA, binding of RPA DBD-A/B constructs to DNA was assessed.
$^b$IC$_{50}$ values are a mean of minimum of triplicate independent experiments and data are presented as the mean ± SD.

Fluorescent Intercalator Displacement (FID) Assay.

The analysis of compound interactions with DNA was determined by inhibition of SYBR-Green intercalation into DNA as we have previously described. Briefly, reactions were performed in 25 mM MOPS (pH 6.5) containing sonicated salmon sperm DNA (8.29 ng/μL), SYBR-Green, and the indicated concentrations of RPA inhibitors. Reactions were conducted in black 96-well plates. Doxorubicin, a known noncovalent DNA binding chemotherapeutic, was used as a positive control. Fluorescence was measured using a BioTek® Synergy™ H1 hybrid multi-mode microplate reader with an excitation wavelength of 485 nm, emission wavelength of 528 nm, and a read height of 7 mm. Data were collected using BioTek® Gen5™ reader software. Reactions were incubated a maximum of 5 min before measurements were collected.

Figure 1B:
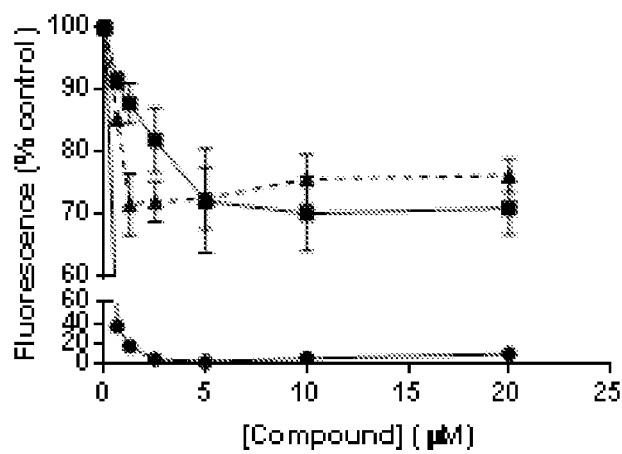
Figure 1C:
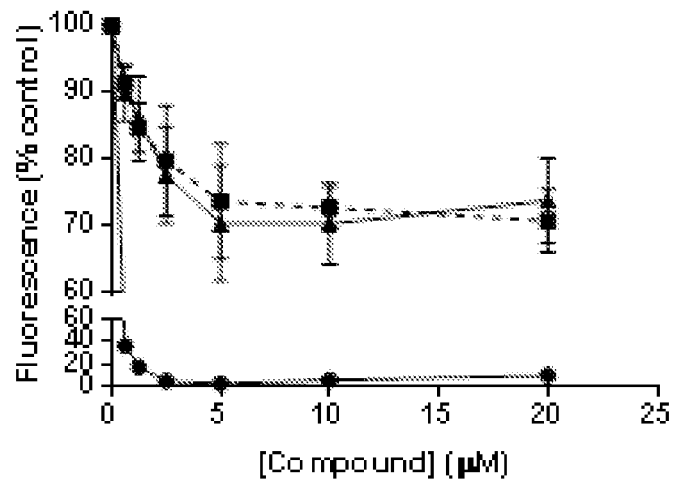
Figure 1D:
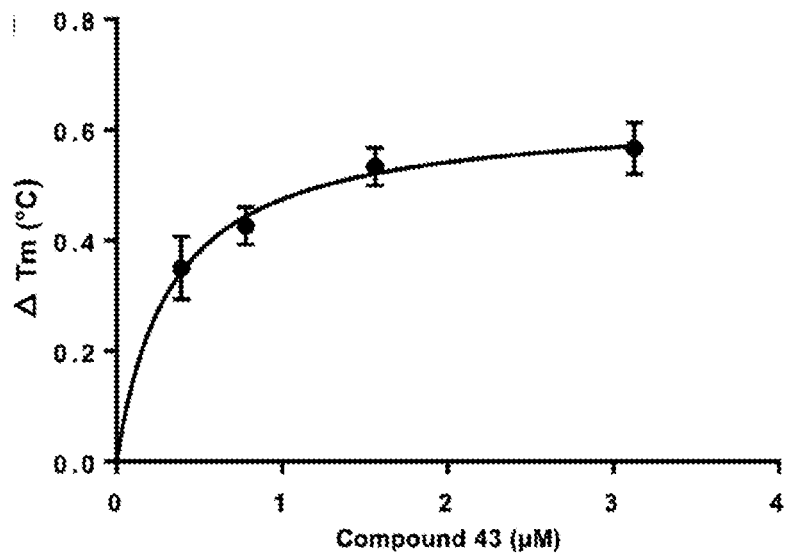

In order to probe the potential role of DNA intercalation as a mechanism for RPA inhibition, compounds 19, 23, 26, 27, 43 and 45 were analyzed using FID assay along with doxorubicin (Dox) as a positive control. The results presented in FIG. 1A demonstrate as expected that positive control doxorubicin, a known non-covalent DNA binding chemotherapeutic, resulted in a concentration dependent reduction in fluorescence. No significant DNA binding activity was observed for any of RPA inhibitors (19, 23, 26, 27, 43 and 45) demonstrating that they do not display a high affinity for DNA. In addition, direct binding of 9 derivatives to the target protein was assessed using a differential scan fluorimetry (DSF) assay. This assay assesses the melting profile of a protein at increasing temperatures via fluorescent dye binding. The direct interaction of a small molecule to the target protein can either increase or decrease the melting temperature (Tm) of the target depending on the specific protein and their interactions. As the denaturation profile of full-length heterotrimeric RPA has been demonstrated to be fairly complex and considering our data demonstrating binding to the AB domain, we performed the analysis with the DNA RPA70 AB domain construct. Heparin sulfate, a known RPA interacting molecule often used in the purification of the protein was used as a control. The data demonstrate that heparin induces a decrease in Tm of 1.2° C. (data not shown). Vehicle controls shows no change as compared to buffer alone while compound 43 increased Tm by 0.6° C. (FIG. 1B).

Differential Scanning Fluorimetry (DSF).

The interaction of compound 43 with RPA-AB constructs was performed by differential scanning fluorimetry using GloMelt™ Dye (Biotum). Briefly, the indicated concentration of compounds was incubated with 5 μg of RPA-AB in a volume of 20 μL containing 20 mM HEPES pH 7.8, 0.001% NP-40, 50 mM NaCl and 1 mM DTT. Reactions were run in an ABI 7500 real time PCR machine with temperature increasing from 25° C. to 99° C. at a 2% ramp (~40 minutes) and fluorescence of the reporter was measured on the SYBR® Green setting. ROX dye was included as a passive reference. Data was uploaded to TSA-CRAFT software and Tm calculated as described by Lee et al. Heparin was employed as a positive control of binding to the AB-box of RPA.

Molecular Docking

We have performed molecular docking studies mainly focusing on the central DNA binding domains A and B of RPA70 by using RPA70$_{181-422}$ X-ray crystal structure and PDB code 1FGU obtained from the Protein Data Bank (PDB) and prepared them using the Protein Preparation Wizard. In this step, force field atom types and bond orders are assigned, missing atoms are added, tautomer/ionization states are assigned, water orientations are sampled, Asn, Gln, and His residues are flipped to optimize the hydrogen bond network, and a constrained energy minimization is performed. RPA inhibitors were drawn in ChemDraw as MDL molfiles and prepared for docking using LigPrep including a minimization with the OPLS3 force field. All chiral centers were retained as specified in the literature. One low energy ring conformation per compound was generated. Ionization states and tautomer forms were enumerated at pH 7.0±2.0 with Epik. RPA inhibitors were flexibly docked into the domain B binding residues using the Glide SP protocol with default settings. Docking poses were evaluated based on visual interrogation and calculated docking score. Potential amino acid interactions were determined based on proximity to each compound as revealed by docking analysis. RPA interactions with small molecules were viewed using Pymol using cartoon, surface, and compounds interaction views. All the molecular modeling within this study was performed using Maestro software, version 11 (Schrödinger), operating in a Linux environment.

Figure 2A:
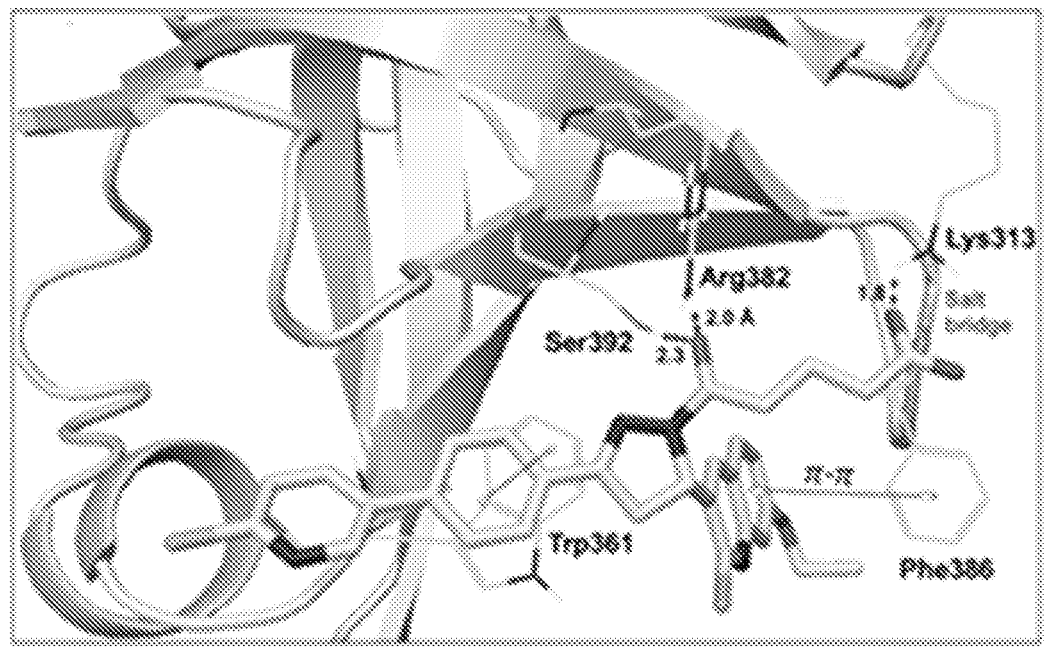
FIGS. 2A-D show molecular docking studies (PDB code: 1FGU)
Figure 2B:
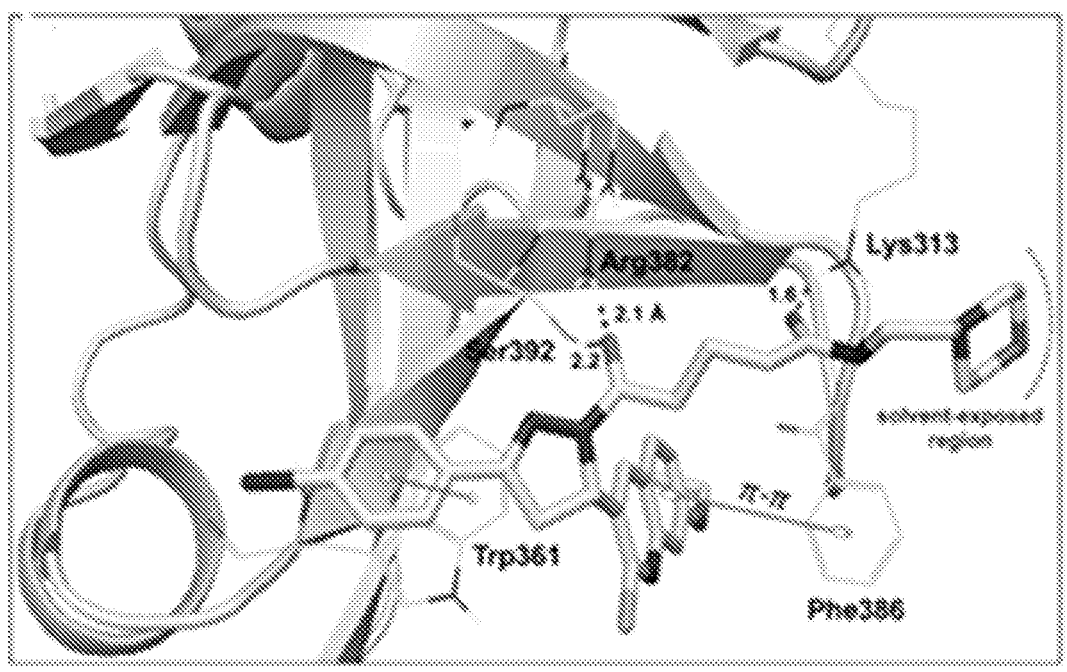
Figure 2C:
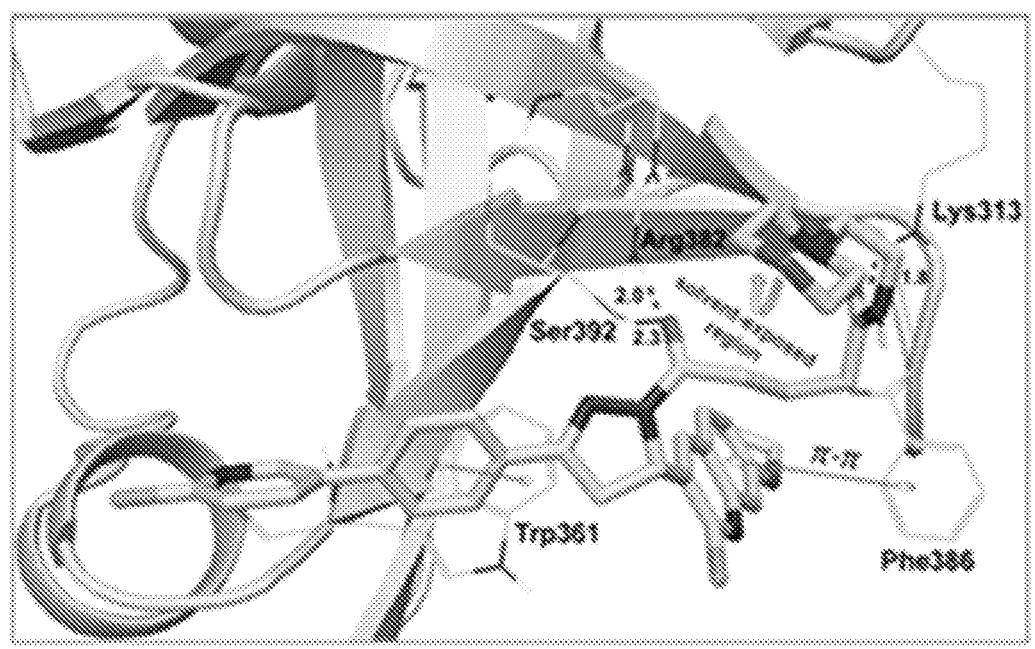
Figure 2D:
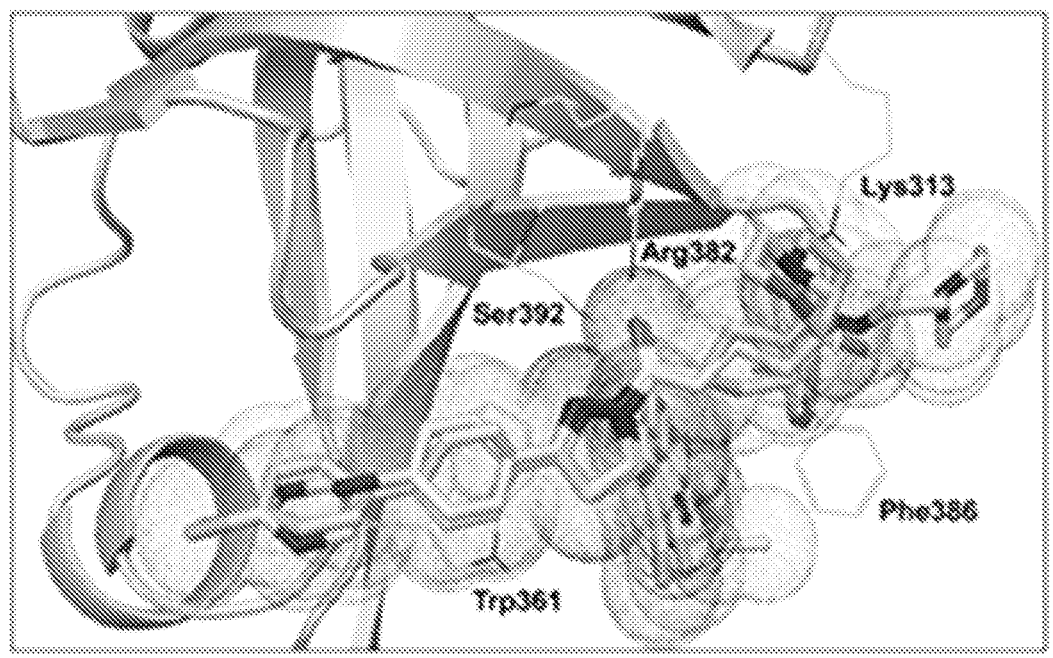

To delineate the key interactions and to understand the SAR, the structures of RPA inhibitors were flexibly docked mainly focusing on the central DNA binding domains A and B of RPA70 by using RPA70$_{181-422}$ X-ray crystal structure (PDB code: 1FGU). Molecular docking studies with compound 8 and 9 revealed a high affinity for domain B and the interdomain (ID) region, whereas modest affinity for domain A was observed. Compounds to domain B active site were used to optimize the parameters of the docking program and also to validate the selected active site (See FIGS. 2A-D). Docking of compound 9 derivatives (Table 1 and 2) suggests that the heteroaromatic or biphenyl heteroaromatic substitution at Ring A can also be accommodated inside the pocket in a manner similar to that in the phenyl ring of parent compound 9 maintaining the π-π/hydrophobic contacts, even though all groups differ in their overall shape. Initial docking studies revealed that terminal carboxylic group appeared to orient towards the solvent-exposed region of the protein and therefore we employed morpholinoethane (compound 42) and morpholinopropane (compound 43-47) to enhance the physicochemical properties of our compounds. Docking with compound 42-47 exhibited that alkyl morpholino group at the terminal carboxylic acid is well fitted and tolerated as its extending out of the RPA binding region into a solvent exposed region (FIG. 2B-C). FIG. 2A-D shows the binding orientation and molecular interactions of compound 26, 42 and 45 within the RPA domain B region. The molecular interaction of 26, 42, and 45 (FIG. 2A-C respectively) 2C) is largely ascribed to various electrostatic interactions. These include the amide carbonyl in compound 42 and 45 making hydrogen bond contacts with the ε-amine of Lys313 while the terminal carboxylic acid of 26 makes salt-bridge interactions with the Lys313. In addition, the amide carbonyl (attached to pyrazole ring) of all three compounds make strong hydrogen bond contacts with the hydroxyl group of Ser392 as well as with the amine group of Arg382 and the π-π stacking interactions between the phenyl moiety (Ring A) and the aromatic ring of Trp361 in all three compounds. In addition, all three compounds quinoline moiety is may make 71-7 stacking interactions with Phe386. Finally, the terminal alkyl morpholino side chain can fit and locate as its extending out of the RPA binding region into a solvent exposed region. Docking studies predicted a stronger affinity of the compound 26 than other series of compounds including compound 42 and 45, in fact compound 26 also showed potent RPA inhibition than other series of compounds in in-vitro EMSA assay (Table 1).

Solubility Analysis.

Aqueous solubility was determined by suspending compound in un-buffered water with stirring. Insoluble material was removed by sedimentation or filtration and soluble compound quantified by absorbance spectroscopy and LC/MS. pH dependence was determined by suspending compound in 10 mM citrate buffer at pH 4.0 or 10 mM phosphate buffer at pH 7 and 9.5 as described above in the description.

TABLE 4

Solubility of compound 9 and 43 as a function of pH.

| | Aqueous solubility pH | | |
|---|---|---|---|
| | 4 | 7 | 9.5 |
| Compound 9 | 0.76 ± 0.35 µM | 3.31 ± 0.36 µM | 112.53 ± 0.74 µM |
| Compound 43 | 21.43 ± 5.49 µM | 5.72 ± 2.79 µM | 3.62 ± 2.22 µM |

Cellular Uptake Measurement.

All cells were grown as monolayers at 37° C. with 5% $CO_2$ in media containing 20% fetal bovine serum and 0.1% pen/strep. Cellular uptake was assessed in both H460 NSCLC and SKGT4 esophageal adenocarcinoma cells. Briefly, cells were plated in 35 mm dishes at $1\times10^6$ cells well and incubated overnight. Compounds were added to the medium at a concentration of 20 µM incubation continued for 4 hours. Media was removed and cells washed 3× with PBS. 1 mL of methanol was added per well and cells agitated overnight at 4° C. The methanol was collected, wells washed with an additional 1 ml of methanol and pooled. The compounds were dried under vacuum, suspended in methanol and quantified by LC/MS.

Figure 3A:
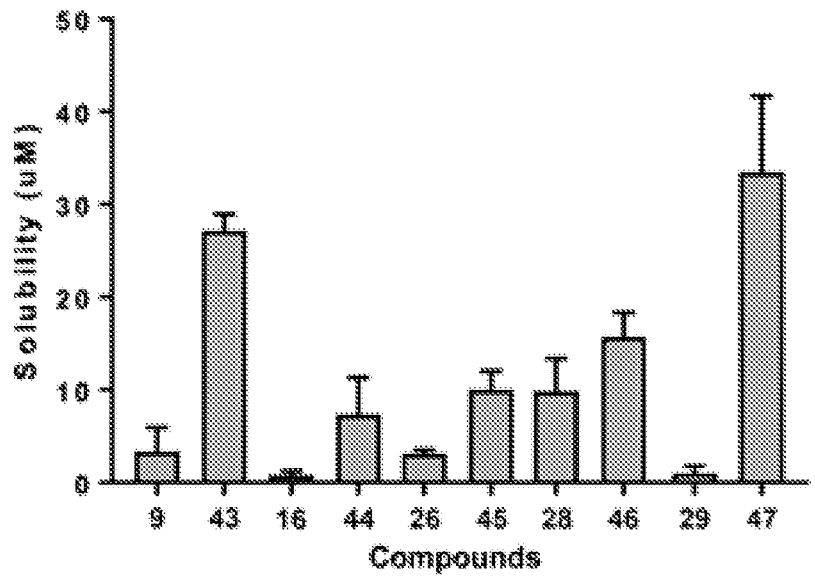
FIGS. 3A-B show solubility analysis and cellular uptake of RPA inhibitors.

FIG. 3A shows data obtained with assessing aqueous solubility in unbuffered $H_2O$ at pH 4. The data reveal a general trend of the morpholino modified compounds displaying increased solubility compared to their carboxylic acid counterparts (Compare compound 9, 16, 26, 28, 29 Vs 43, 44, 45, 46, 47, respectively). The morpholine ring is commonly introduced into solvent exposed regions as a privileged solubilizing group to improve solubility or pharmacokinetic properties including metabolic stability of a prospective drug scaffold which is exemplified by many FDA approved drugs. Modifications on Ring A had less of an effect than the morpholino modifications at the alkyl carboxylic acid side chain. To determine the effect of pH on solubility, we prepared solution at 1 mM in citrate buffer at pH 4, phosphate buffer at pH 7 and carbonate buffer at pH 9.5. The analysis of compound 9 and 43 at various pH demonstrate a dramatic increase in aqueous solubility of the carboxylic acid containing compound 9 at higher pH value while the morpholino containing compound 43 displayed the greater solubility at lower pH value (Table 4).

Figure 3B:
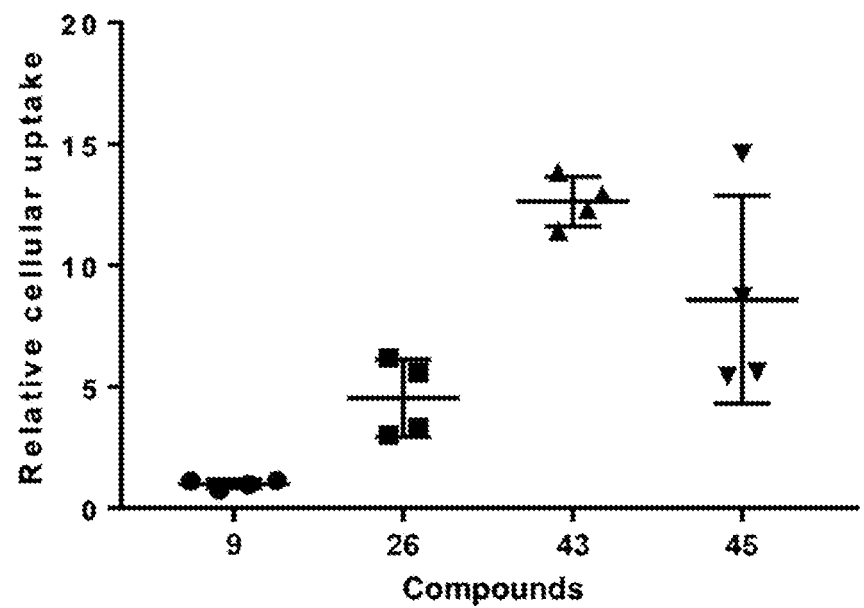

Cellular uptake of our compounds in H460 NSCLC cells was analyzed (FIG. 3B). Initially, compounds were first solubilized in 100% DMSO then diluted in aqueous buffer of media to achieve the desired concentrations, the final DMSO concentration was 1% or less in all experiments. Cells were treated with a fixed concentration (20 µM) for 4 hours at 37° C. The intracellular drug concentrations were determined following extraction with ice cold MeOH and analysis via LC and LC/MS. The data in FIG. 3B demonstrate that as expected that compound 9 has relatively poor uptake while compound 26 showed increased uptake even with the carboxylic acid moiety. The morpholino derivatives of both these compounds demonstrated considerably superior uptake with the compound 43 having the best correlation with cellular activity in cancer cell models. Similar uptake data was also obtained in the SKGT4 esophageal adenocarcinoma cell line.

Cell Survival Assays.

Cell survival was determined by CCK-8 viability assay and/or clonogenic survival assay in 96 well plates or 24 well plates, respectively and combination index (CI) analysis of drug-drug interactions determined by Chou-Talalay analysis as we have previously described.

1) CCK-8 metabolic assay: Cells were plated (2500 cells/well) in 96-well plate and allowed to grow for at least 18 hours in at 37° C. in the presence of 5% $CO_2$ before treatment with inhibitor for 48 hours. CCK-8 solution (Dojindo) was added to 10% of the total media volume and after 1-4 hours of incubation absorbance at 450 nm was determined using BioTek® Synergy™ H1 hybrid multi-mode microplate reader
2) Clonogenic survival assay: Cells were plated in a 24 well (20,000 cells/well) plate, incubated for at least 18 hours and then treated with inhibitor. After 48 hours of treatment, the cells are re-plated in 10 cm dishes (500 cells/dish) and incubated for 8-10 days to allow colony formation. Plates are washed with PBS, fixed with glutaraldehyde and stained with crystal violet. Images of the stained colonies were captured with a Fuji LAS-3000 CCD system then counted using OpenCFU software. Viability is determined as a percent of vehicle controls and plotted versus drug concentration.

3) Assessment of synergy via combination index (CI): In the combination index studies, cells (H460 or SKGT4) were treated with RPA inhibitor and Pt/etoposide/bleomycin/taxol/DDR inhibitor alone as well as the combination of both—the inhibitor and the DNA damaging chemotherapeutic agent/DDR inhibitor. The range of treatment was dependent on the $IC_{50}$ of each inhibitor/drug. If the $IC_{50}$ was X, then the cells were treated at a range of 0.04× to 5× concentration in a CCK-8 metabolic assay. The kill curves from both the single agent treatments as well as the combination treatment were used in a Chou-Talalay based method to determine the combination index (CI) at different fractions of cells affected.[40] A CI>1.0 indicates antagonism between the two agents, while a CI<1.0 indicates synergy. A CI of 1.0 demonstrates an additive effect.

Figure 4A:
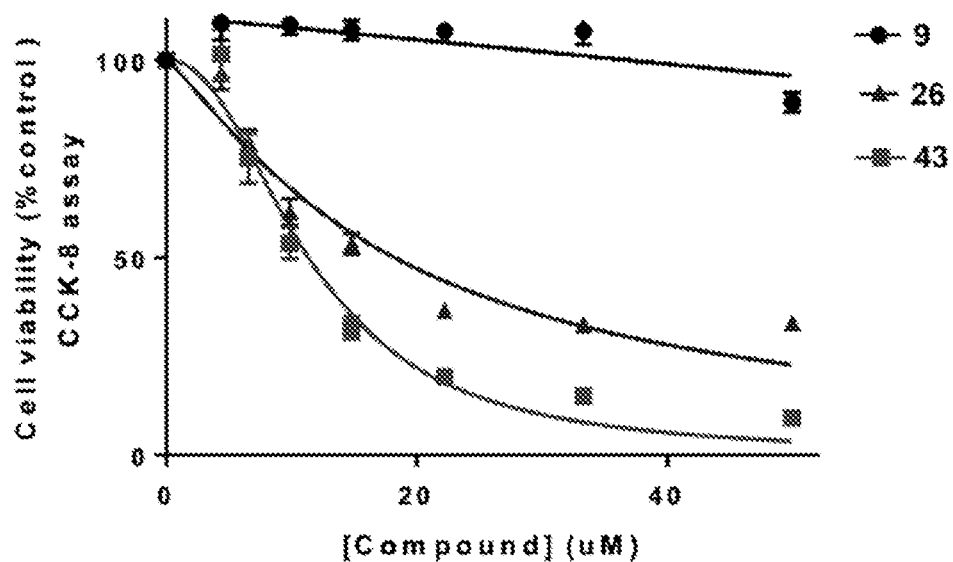
FIGS. 4A-D shows data for representative compounds.
Figure 4B:
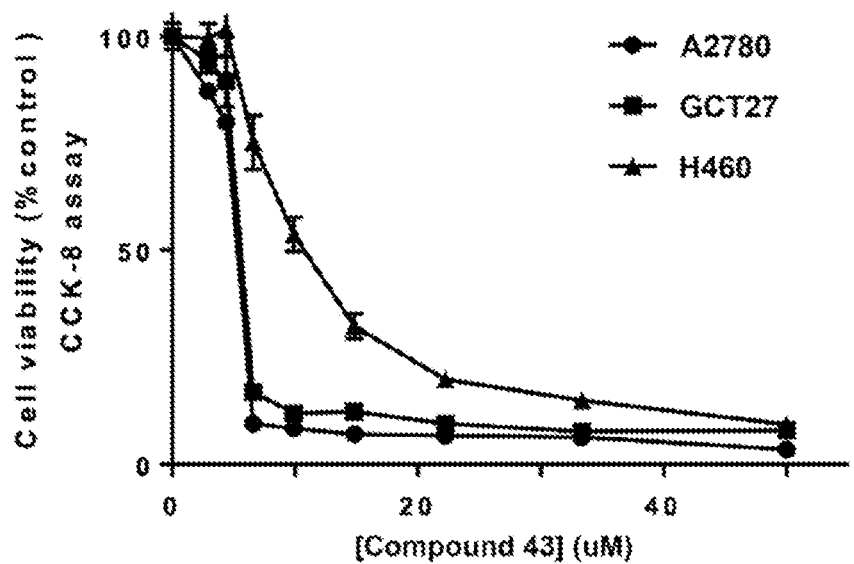

Cellular activity in H460 NSCLC cells. Compared to compound 9, the increases uptake, potency and solubility resulted in a increase in cellular anticancer activity observed with compound 26 and 43 (FIG. 4A). Compound 43 showed increased cytotoxicity against A2780 epithelial ovarian cancer (EOC) and GCT27 testicular cancer cells (FIG. 4B) as compared to H460 NSCLC cells.

Figure 4C:
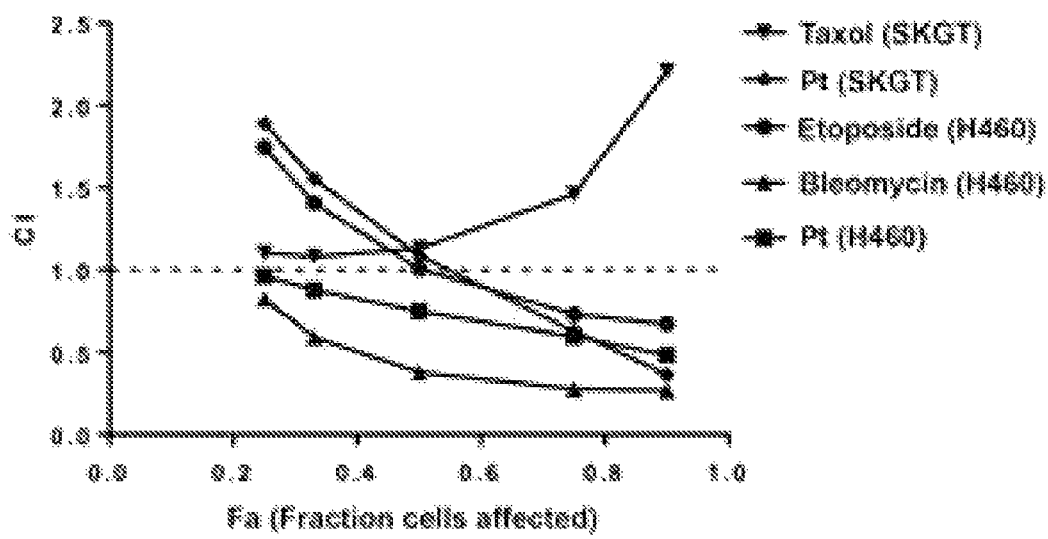
Figure 4D:
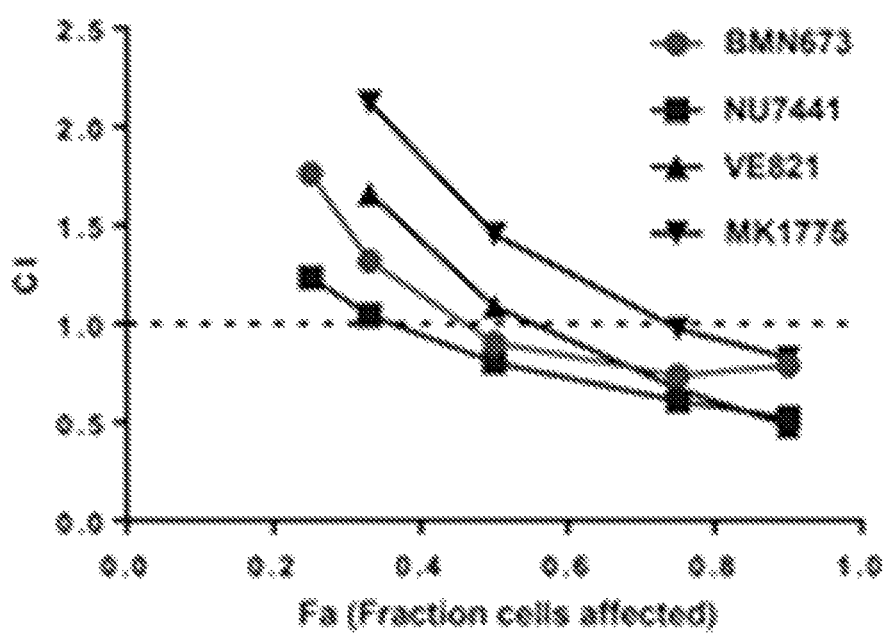

Inhibiting RPA can act synergistically with DNA damaging therapeutics including cisplatin and etoposide (FIG. 4C). In these studies, we used the Chou-Talalay method, which provides a combination index (CI) that quantifies synergistic activity for each drug combination. CI values of <1.0 indicate synergistic effect with smaller numbers exhibiting stronger synergy while CI values 1.0 and >1.0, indicate additive and antagonistic effects, respectively. Analysis of 9 showed synergy but not as robust of activity as compound 8. Analysis of compound 43 revealed even greater synergy than either of its predecessors and interestingly, stronger synergy was also observed with bleomycin, a radiomimetic agent that induces cell death predominantly via the formation of DNA double strand breaks (DSBs). A similar level of synergy was observed in SKGT-4 EAC cells with compound 43 and cisplatin. The synergistic activity of compounds described herein with DNA damaging agents may be explained by RPA's role in the DNA damage response and signaling. The data with taxol demonstrated an additive interaction and displayed no synergy in the SKGT-4 EAC model (FIG. 4C). FIG. 4D demonstrates that RPA inhibition effectively synergizes with a number of agents including PARP, DNA-PK, ATR, and WEE1 inhibitors in the EAC cancel cell model.

In Vivo Tumor Xenograft Model

Figure 5A:
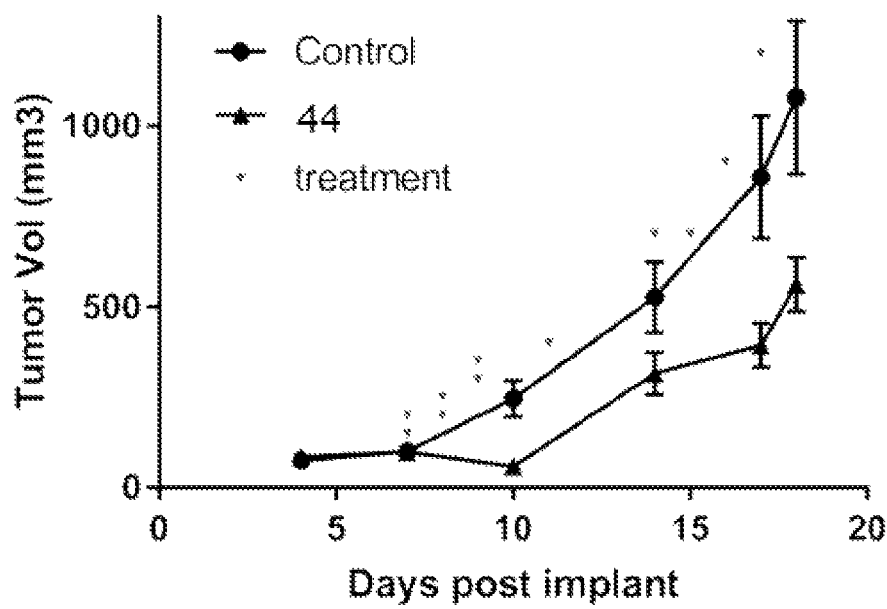
FIGS. 5A-D are charts showing the treatment of mice bearing H460 NSCLC tumors with compound 44 or control (a.k.a vehicle) (5A and 5B), and mice bearing A549 human lung carcinoma with compound 45 or control (5C and 5D).
Figure 5B:
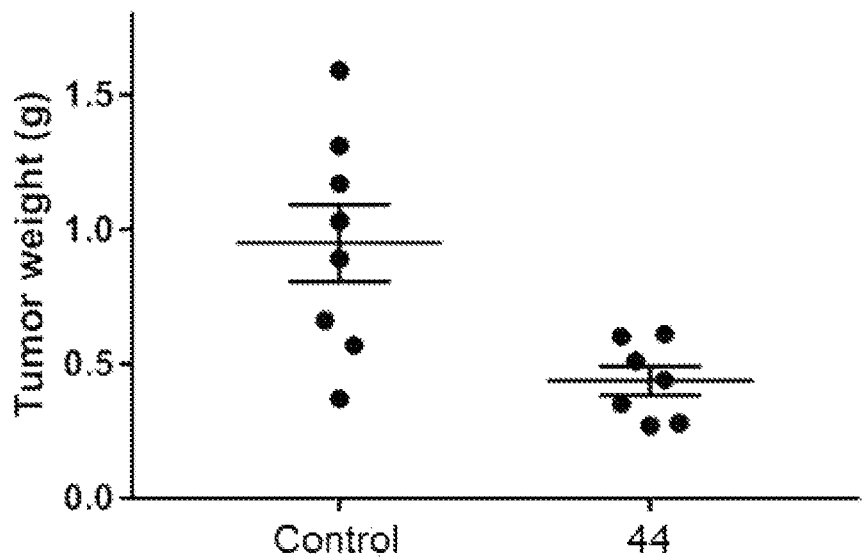
Figure 5C:
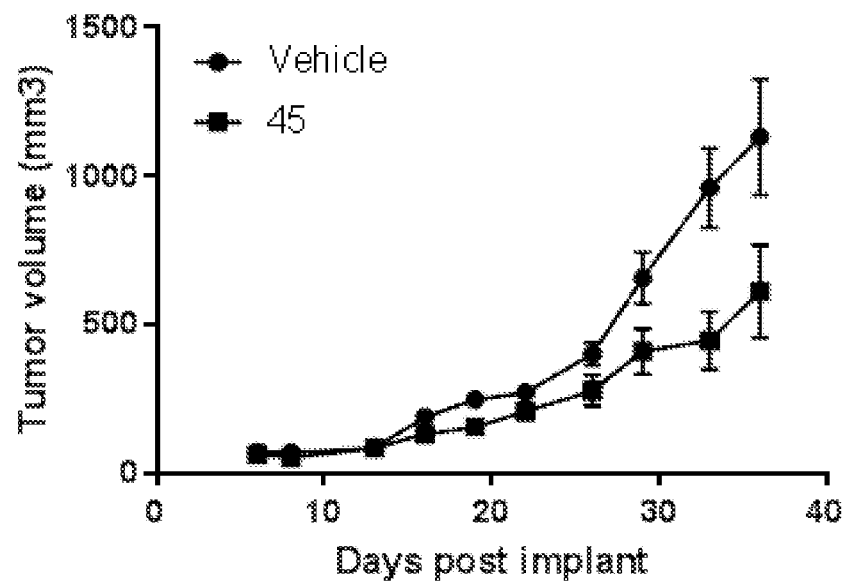
Figure 5D:
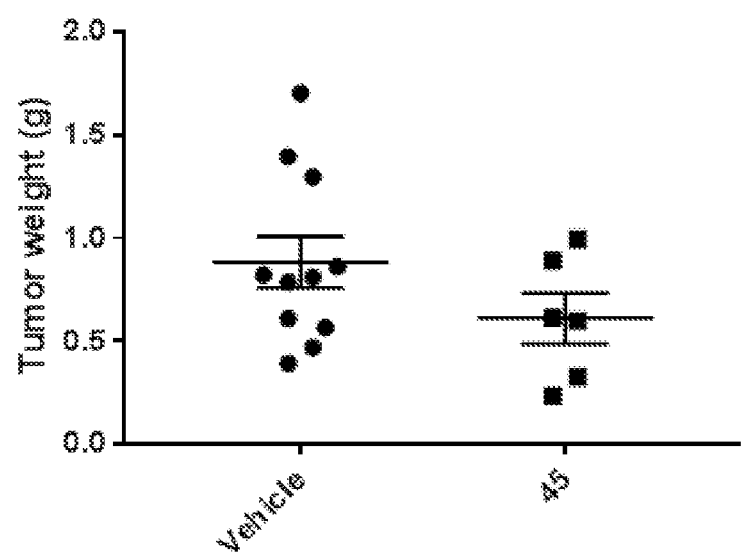

H460 and A549 cells were implanted subcutaneously in NSG mice and allow to grow until ~100 mm³ in size. Mice were randomized into to arms, vehicle control and the indicated Compound. Treatment with compound 44 is indicated by the triangles. SID for two days followed by BID as indicated at 50 mg/dose. Compound 45 was delivered IP at 200. mg BID for two cycles at 5 days/week. Tumor volume was measured by calipers (FIG. 5A and FIG. 5C) and tumor weight measured (panel FIG. 5B and FIG. 5D) after termination of the experiment.

Compound 43 Induces Apoptosis

Figure 6:
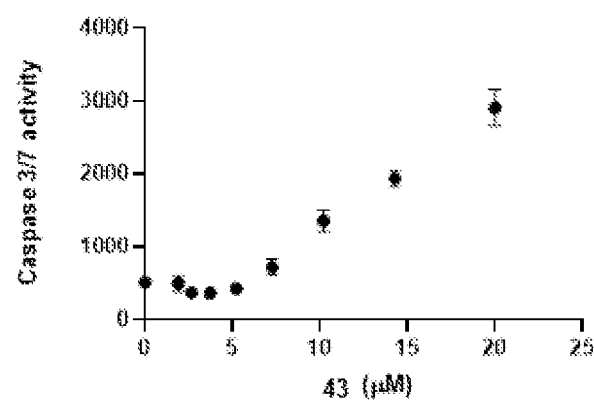
FIG. 6 shows caspase 3/7 activity as a function of the concentration of compound 43.

Apoptosis induction was determined by activation of Caspase 3 and 7 using the CellEvent™ Caspase-3/7 Green Detection Reagent (Invitrogen). H460 cells were plated at 5×10¹ cells/well in black 96 well plates with clear bottoms (Costar) and incubated for 24 hours prior to treatments. Cells were treated with the indicated concentration of compound 43 or cisplatin for 24 hours. The vehicle (DMSO) concentration was held constant at 1% for compound 43 treatments. For caspase 3/7 detection, media was removed and replaced with PBS containing 5% FBS and 2 µM CellEvent™ Caspase-3/7 Green Detection Reagent. Cells were incubated at 37° C./5% $CO_2$ for 1 hour and fluorescence intensity was measured in a BioTek Synergy H1 plate reader (excitation/emission 485/528). Images were captured with an Evos FL2 Auto microscope (Invitrogen) using a 10× objective. Compound 43 potently activates caspase 3 and 7, indicating an activation of the apoptosis pathway as a mechanism of cell death (FIG. 6).

Identification of DDR Genes that Increase the Anticancer Activity of Compound 43

To determine if specific genes when mutated or reduced in expression or activity would increase the anticancer activity of compound 43, a CRISPR screen of 230 individual genes was conducted. A549 cells stably expressing Cas9 (Geneocopia) were plated at 5×10⁵ cells/well in 96 well plates and incubated at 37° C., 5% $CO_2$ for 24 hours. Cells were transfected 0.2 µL/well Dharmafect1 in Opti-MEM (Gibco) with Edit-R crRNA:tracrRNA complexes (Horizon) at a final concentration of 25 nM. 230 individual genes were screened. Each gene had four different crRNAs directed against it and each of those four were tested in triplicate. Twenty-four hours after transfection, cells were treated with 2 µM compound 43 and incubated an additional 48 hours. Viability was assessed by CCK-8 assay (Dojindo). Hits were determined by those wells that had decreased cell viability compared to the average signal of the entire plate. The number of independent hits for each gene were summed with the maximum being 12, triplicate determination of four crRNA for each gene. This allows one to account for different crRNA efficiency and the potential for varied gene disruption as a result.

Figure 7:
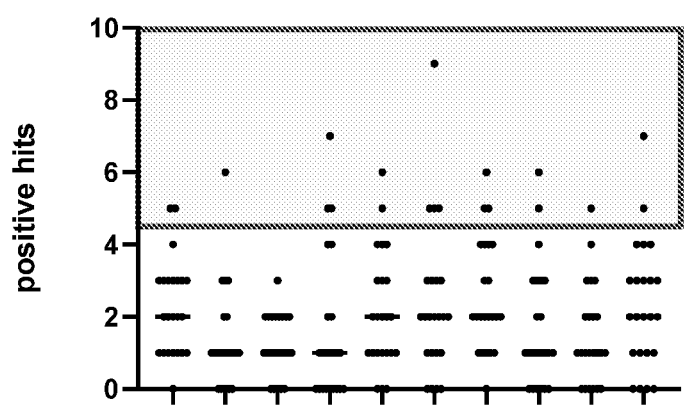
FIG. 7 shows a graph of positive hits.

The 230 genes were selected to include those broadly involved the DNA damage response and repair pathways. Each gene had four different crRNA targeting different sequences to provide a broad range of inactivating mutations. From this analysis, 20 genes were identified that when mutated via CRISPR increases the cellular activity of compound 43 in the A549 adenocarcinoma. The graph of hits is presented in FIG. 7 and the genes are listed in Table 5.

TABLE 5

| Gene | Description | Hits |
| --- | --- | --- |
| FeN1 | Rap Stucture-Specific Endonuclease 1 | 9 |
| APTX | Apataxin | 7 |
| PRKCG | Protein kinase C gamma | 7 |
| POLE2 | DNA polymerase epsilon subunit 2 | 6 |
| XRCCG | Ku 70 | 6 |
| ATRX | ATRX Chromatin Remodeler | 6 |
| TCEA1 | Transcription Elongation Factor A1 | 5 |
| IPεK3 | Inositol Hexakisphosphate Kinase 3 | 5 |
| FANCM | FA Compementaton Group M | 5 |
| XAB2 | XPA binding protein | 5 |
| ERCC2 | XPD | 5 |
| DDB1 | Damage Specific DNA Binding Prolein 1 | 5 |
| RRM2 | Ribonucleotide Reductase Reguratory Subunit M2 | 5 |

TABLE 5-continued

| Gene | Description | Hits |
| --- | --- | --- |
| BRE | BRCA1 complex | 5 |
| PRPF19 | PSO4 | 5 |
| UVRAG | UV Radiation Resistance Associated | 5 |
| DCLRE1C | Artemis | 5 |
| KAT5 | Tip 60 | 5 |
| RNF168 | Ring Finger Prolein 168 | 5 |
| RTEL1 | Regulator Of Telomere Elongation Hellcase 1 | 5 |

What is claimed:

1. A compound of the formula

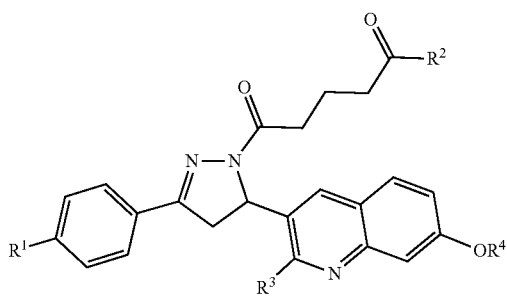

wherein
R¹ is iodo;
R² is —NH(CH$_2$)$_3$-morpholinyl;
R³ is chloro, fluoro, bromo, or iodo; and
R⁴ is C$_1$-C$_6$ alkyl;
or a pharmaceutically acceptable salt thereof.

2. The compound of claim 1, wherein R³ is chloro, bromo, or iodo.

3. The compound of claim 1, wherein R³ is chloro.

4. The compound of claim 1, wherein R⁴ is methyl or ethyl.

5. The compound of claim 1, wherein R⁴ is ethyl.

6. The compound of claim 1, wherein the compound is or a pharmaceutically acceptable salt thereof.

7. A pharmaceutical composition comprising a therapeutically effective amount of a compound of claim 1, and at least one pharmaceutically acceptable carrier, diluent, or excipient.

8. A compound of the formula

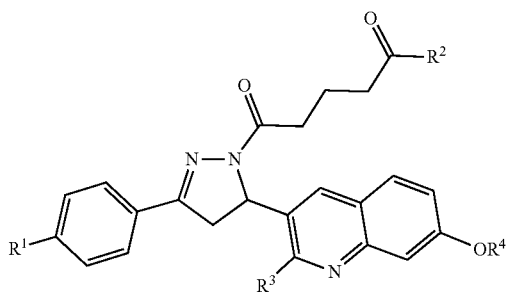

wherein
R¹ is selected from the group consisting of bromo, chloro, and iodo;
R² is —NH(CH$_2$)$_n$-morpholinyl, —NH(CH$_2$)$_n$-piperazinyl, or —NH(CH$_2$)$_n$—(N-methyl-piperazinyl);
R³ is chloro, fluoro, bromo, or iodo; and
R⁴ is C$_1$-C$_6$ alkyl; and
n is 1, 2, 3, or 4;
or a pharmaceutically acceptable salt thereof.

9. The compound of claim 8, wherein R² is —NH(CH$_2$)$_n$-morpholinyl.

10. The compound of claim 8, wherein R² is —NH(CH$_2$)$_3$-morpholinyl.

11. The compound of claim 8, wherein R³ is chloro, bromo, or iodo.

12. The compound of claim 8, wherein R³ is chloro.

13. The compound of claim 8, wherein R⁴ is methyl or ethyl.

14. The compound of claim 8, wherein R⁴ is ethyl.

15. The compound of claim 8, wherein the compound is

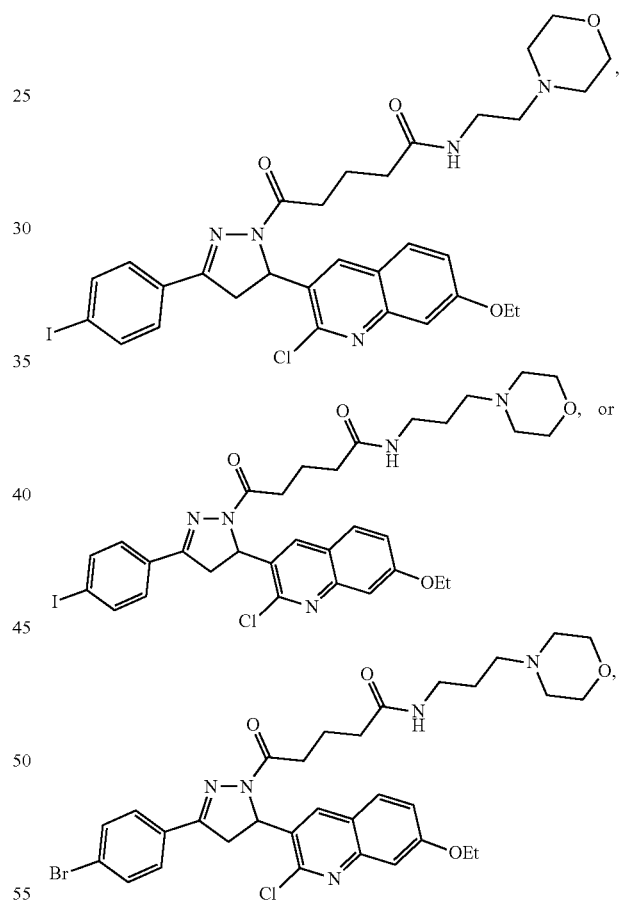

or a pharmaceutically acceptable salt thereof.

16. A pharmaceutical composition comprising a therapeutically effective amount of a compound of claim 8, and at least one pharmaceutically acceptable carrier, diluent, or excipient.

* * * * *